United States Patent
Nishida et al.

(10) Patent No.: US 9,038,598 B2
(45) Date of Patent: May 26, 2015

(54) VEHICLE WITH MIXED GAS GENERATING SYSTEM AND VEHICLE WITH FUEL PRODUCING SYSTEM

(75) Inventors: Hideyuki Nishida, Suntou-gun (JP); Masaki Shitara, Susuno (JP); Yasushi Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 13/996,368

(22) PCT Filed: Mar. 8, 2011

(86) PCT No.: PCT/JP2011/055366
§ 371 (c)(1),
(2), (4) Date: Jun. 20, 2013

(87) PCT Pub. No.: WO2012/120641
PCT Pub. Date: Sep. 13, 2012

(65) Prior Publication Data
US 2013/0333638 A1  Dec. 19, 2013

(51) Int. Cl.
*F02P 5/00*   (2006.01)
*F02D 41/00*  (2006.01)
*F02B 43/00*  (2006.01)
(Continued)

(52) U.S. Cl.
CPC ............. *F02B 43/00* (2013.01); *F02M 27/02* (2013.01); *F02M 31/00* (2013.01); *F02M 23/00* (2013.01); *F02M 25/10* (2013.01); *F02M 21/0227* (2013.01); *F02M 25/12* (2013.01); *Y02T 10/121* (2013.01); *Y02T 10/32* (2013.01); *F02M 21/0206* (2013.01); *F02D 19/021* (2013.01); *C25B 15/08* (2013.01); *C25B 1/02* (2013.01); *C25B 9/08* (2013.01); *C10G 2/32* (2013.01)

(58) Field of Classification Search
CPC ... F02M 21/0206; F02M 21/02; F02M 31/00; F02M 25/00; F02M 43/00; F02M 23/00; F02M 25/10; F02M 27/02
USPC .................. 123/3, 217, 406.45, 406.48, 698, 123/568.11
See application file for complete search history.

(56) References Cited

U.S. PATENT DOCUMENTS 7,213,567 B2 *  5/2007  Cracknell ...................... 123/304
8,413,420 B1 *  4/2013  Zaromb .......................... 60/274
(Continued)

FOREIGN PATENT DOCUMENTS

FR   2941499 A1   7/2010
JP   A-9-85044    3/1997
(Continued)

*Primary Examiner* — Lindsay Low
*Assistant Examiner* — Syed O Hasan
(74) *Attorney, Agent, or Firm* — Oliff PLC

(57) ABSTRACT

A vehicle is provided with an engine, an $H_2$ and CO tank, a $CO_2$ reclaimer, an electrolytic solution tank, an electrolyzer, a water tank and the like. During operation of the engine, an exhaust gas is introduced into an absorbing liquid in the $CO_2$ reclaimer so as to recover $CO_2$ in the exhaust gas and to store the same in the electrolytic solution tank. While supplying the absorbing liquid having absorbed $CO_2$ and water to the electrolyzer from the electrolytic solution tank and the water tank, respectively, electric power is supplied to the electrolyzer. As a result, a mixed gas composed of CO and $H_2$ from $CO_2$ and water. The generated mixed gas is temporarily stored in the $H_2$ and CO tank and is supplied to the engine.

12 Claims, 47 Drawing Sheets

(51) Int. Cl.
| | |
|---|---|
| *F02B 47/08* | (2006.01) |
| *F02B 53/04* | (2006.01) |
| *F02M 27/02* | (2006.01) |
| *F02M 23/00* | (2006.01) |
| *F02M 25/10* | (2006.01) |
| *F02M 21/02* | (2006.01) |
| *F02M 25/12* | (2006.01) |
| *F02D 19/02* | (2006.01) |
| *C25B 15/08* | (2006.01) |
| *C25B 1/02* | (2006.01) |
| *C25B 9/08* | (2006.01) |
| *C10G 2/00* | (2006.01) |
| *F02M 31/00* | (2006.01) |

(56) References Cited

U.S. PATENT DOCUMENTS

2005/0229872 A1\* 10/2005 Lange ............................. 123/3
2009/0217641 A1\* 9/2009 Lloyd et al. .................. 60/39.12

FOREIGN PATENT DOCUMENTS

| | | |
|---|---|---|
| JP | A-2006-509149 | 3/2006 |
| JP | A-2007-231859 | 9/2007 |
| JP | A-2009-540219 | 11/2009 |
| JP | A-2010-533784 | 10/2010 |
| JP | A-2011-42554 | 3/2011 |
| WO | WO 2004/051060 A1 | 6/2004 |
| WO | 2007/133174 A1 | 11/2007 |
| WO | WO 2007/147008 A2 | 12/2007 |
| WO | WO 2009/012154 A2 | 1/2009 |

\* cited by examiner

VEHICLE WITH MIXED GAS GENERATING SYSTEM AND VEHICLE WITH FUEL PRODUCING SYSTEM

TECHNICAL FIELD

The present invention relates to a vehicle with a mixed gas generating system and a vehicle with a fuel producing system. More particularly, the present invention relates to a vehicle with a mixed gas generating system for generating a mixed gas consisting of $H_2$ and CO generated by electrolysis and a vehicle with a fuel producing system for converting this mixed gas to a fuel.

BACKGROUND ART

Patent Literature 1 discloses, for example, a vehicle on which an internal combustion engine which can use an $H_2$ containing gas as an engine fuel, a reforming device for generating an $H_2$ containing gas from alcohol, and a supply device for supplying this $H_2$ containing gas to the internal combustion engine are mounted. Moreover, Patent Literature 1 discloses that the above-described $H_2$ containing gas can be used with gasoline as an engine fuel.

Moreover, Patent Literature 2 discloses that methane is synthesized by supplying CO and $H_2$ to a cell and is re-used as an energy source, wherein CO and $H_2$ are generated by electrolysis while supplying $CO_2$, which is generated by combustion of a fossil fuel, and water to a cell different from the above-described cell.

CITATION LIST

Patent Literature

Patent Literature 1: National Publication of International Patent Application No. 2009-540219

Patent Literature 2 Japanese Patent Laid-Open No, 9-85044

SUMMARY OF INVENTION

Problem to be Solved by the Invention

In the vehicle of the above-described Patent Literature 1, exhaust heat of the internal combustion engine is used for heating a reforming catalyst in the reforming device. Thus, when operated only with the $H_2$ containing gas, it is likely that temperature rise of the reforming catalyst at the start of the engine is not sufficient, and thus the $H_2$ containing gas cannot be sufficiently generated. If the $H_2$ containing gas cannot be sufficiently generated, the $H_2$ containing gas is not supplied to the internal combustion engine, and an operation state becomes unstable. On the other hand, if gasoline can be used with the $H_2$ containing gas, the temperature of the reforming catalyst can be raised by combusting gasoline at the start of the engine. However, in this case, alcohol and gasoline need to be mounted on the vehicle and they need to be replenished periodically. Thus, a labor and a distribution cost will become necessary for replenishing alcohol or gasoline to the vehicle.

In this regard, the technology in Patent Literature 2 uses $CO_2$ generated by combustion of gasoline to generate $H_2$, and the above-described problem does not occur. However, the technology in the above-described Patent Literature 2 places an emphasis on recycling of $CO_2$ as a resource and does not disclose a specific configuration when it is mounted on a vehicle.

The present invention was made in order to solve the above-described problems. That is, the present invention has an object to provide a vehicle with a mixed gas generating system for supplying $H_2$ and CO generated by electrolysis, or a fuel obtained by synthesizing these $H_2$ and CO to the internal combustion engine and a vehicle with a fuel producing system.

Means for Solving the Problem

To achieve the above-mentioned purpose, a first aspect of the present invention is a vehicle with a mixed gas generating system comprising:

an internal combustion engine capable of using a mixed gas composed of carbon monoxide and hydrogen as an engine fuel;

mixed gas generating means for generating said mixed gas by electrolyzing carbon dioxide contained in an exhaust from said internal combustion engine and/or atmospheric air and water, respectively; and mixed gas supply means connected to said mixed gas generating means and supplying said mixed gas to said internal combustion engine.

A second aspect of the present invention is the vehicle with a mixed gas generating system according to the first aspect, wherein said mixed gas generating means is provided with:

carbon dioxide absorbing means containing an absorbing liquid having a carbon dioxide absorbing characteristic;

an electrolytic bath connected to said carbon dioxide absorbing means and containing the same type of solution as said absorbing liquid; and absorbing liquid circulating means for circulating said absorbing liquid in said carbon dioxide absorbing means through said electrolytic bath and back to said carbon dioxide absorbing means.

A third aspect of the present invention is the vehicle with a mixed gas generating system according to the second aspect, wherein said carbon dioxide absorbing means is provided in a bypass passage bypassing a part of an exhaust passage of said internal combustion engine.

A forth aspect of the present invention is the vehicle with a mixed gas generating system according to the third aspect, further comprising:

absorbing liquid storing means provided between said carbon dioxide absorbing means and said electrolytic bath and temporarily storing said absorbing liquid sent from said carbon dioxide absorbing means;

exhaust pressure obtaining means for obtaining, an exhaust pressure flowing through said bypass passage; and liquid sending amount control means for controlling an amount of said absorbing liquid to be sent to said absorbing liquid storing means from said carbon dioxide absorbing means in accordance with said exhaust pressure.

A fifth aspect of the present invention is the vehicle with a mixed gas generating system according to the third aspect or the forth aspect, further comprising:

exhaust pressure adjusting means provided in said exhaust passage on the downstream side of said bypass passage and capable of adjusting said exhaust pressure.

A sixth aspect of the present invention is the vehicle with a mixed gas generating system according to the second aspect, wherein said mixed gas generating means is further provided with atmospheric air introducing means for introducing atmospheric air into said carbon dioxide absorbing means.

A seventh aspect of the present invention is the vehicle with a mixed gas generating system according to the sixth aspect, further comprising:

absorbing liquid storing means provided between said carbon dioxide absorbing means and said electrolytic bath and temporarily storing said absorbing liquid sent from said carbon dioxide absorbing means;

vehicle speed obtaining means for obtaining a vehicle speed; and liquid sending amount control means for controlling an amount of said absorbing liquid to be sent to said absorbing liquid storing means from said carbon dioxide absorbing means in accordance with said vehicle speed.

An eighth aspect of the present invention is the vehicle with a mixed gas generating system according to the sixth aspect, further comprising:

absorbing liquid storing means provided between said carbon dioxide absorbing means and said electrolytic bath and temporarily storing said absorbing liquid sent from said carbon dioxide absorbing means;

vehicle speed obtaining means for obtaining a vehicle speed;

inter-vehicle distance obtaining means for obtaining an inter-vehicle distance between the vehicle and a preceding vehicle; and liquid sending amount control means for controlling an amount of said absorbing liquid to be sent to said absorbing liquid storing means from said carbon dioxide absorbing means in accordance with said vehicle speed and said inter-vehicle distance.

A ninth aspect of the present invention is the vehicle with a mixed gas generating system according to the sixth aspect, further comprising:

absorbing liquid storing means provided between said carbon dioxide absorbing means and said electrolytic bath and temporarily storing said absorbing liquid sent from said carbon dioxide absorbing means;

vehicle speed obtaining means for obtaining a vehicle speed;

carbon dioxide concentration in atmospheric air obtaining means for obtaining, a carbon dioxide concentration in the atmospheric air; and liquid sending amount control means for controlling an amount of said absorbing liquid to be sent to said absorbing liquid storing means from said carbon dioxide absorbing means in accordance with said vehicle speed and said carbon dioxide concentration in the atmospheric air.

A tenth aspect of the present invention is the vehicle with a mixed gas generating system according to any one of the second to ninth aspects, wherein said mixed gas generating means is further provided with run water supply means for collecting rain water and supplying the rain water to said electrolytic bath.

An eleventh aspect of the present invention is the vehicle with a mixed gas generating system according to any one of the second to ninth aspects, wherein said mixed gas generating means is further provided with exhaust-derived condensed water supply means for condensing steam in an exhaust flowing through said exhaust passage and supplying the condensed water to said electrolytic bath.

A twelfth aspect of the present invention is the vehicle with a mixed gas generating system according to any one of the second to ninth aspects, wherein said mixed gas generating means is further provided with atmospheric-derived condensed water supply means for condensing steam in atmospheric air and supplying the condensed water to said electrolytic bath.

A thirteenth aspect of the present invention is the vehicle with a mixed gas generating system according to any one of the first to twelfth aspects, further comprising:

a generator for generating power by using an output of said internal combustion engine; and a battery capable of storing power of said generator, wherein said mixed gas generating means generates said mixed gas by power fed from said battery.

A fourteenth aspect of the present invention is the vehicle with a mixed gas generating system according to the first to thirteenth aspect, further comprising:

an on-board generating device for converting at least one of solar light, solar heat, exhaust heat, and wind power to electric power, wherein said battery is configured to be capable of storing electric power of said on-board generating device.

To achieve the above-mentioned purpose, a fifteenth aspect of the present invention is a vehicle with a fuel producing system comprising:

an internal combustion engine capable of using, a hydrocarbon synthetic fuel synthesized from a mixed gas composed of carbon monoxide and hydrogen as an engine fuel;

mixed gas generating means for generating said mixed gas by electrolyzing carbon dioxide contained in an exhaust from said internal combustion engine and/or atmospheric air and water, respectively;

fuel synthesizing means containing a Fischer-Tropsch catalyst capable of converting said mixed gas generated by said mixed gas generating means to said synthetic fuel; and synthetic fuel supply means connected to said fuel synthesizing means and supplying said synthetic fuel generated by said fuel synthesizing means to said internal combustion engine.

A sixteenth aspect of the present invention is the vehicle with a fuel producing system according to the fifteenth aspect, wherein said fuel synthesizing means is provided in a bypass passage bypassing a part of an exhaust passage of said internal combustion engine, the vehicle further comprising:

a bypass passage switching valve for switching opening/closing of said bypass passage;

a mixed gas valve for connecting or shutting of said mixed gas generating means and said fuel synthesizing means;

catalyst state determining means for determining whether or not said Fischer-Tropsch catalyst is in a predetermined active state; and valve control means for controlling said bypass passage switching valve so as to open said bypass passage and for controlling said mixed gas valve so as to connect said mixed gas generating means and said fuel synthesizing means when it is determined that said Fischer-Tropsch catalyst is in said predetermined active state.

A seventeenth aspect of the present invention is the vehicle with a fuel producing system according to the fifteenth aspect, wherein said fuel synthesizing means is provided in a bypass passage bypassing a part of an exhaust passage of said internal combustion engine, the vehicle further comprising:

a bypass passage switching valve for switching opening/closing of said bypass passage;

a mixed gas valve for connecting or shutting off said mixed gas generating means and said fuel synthesizing means;

catalyst state determining means for determining whether or not said Fischer-Tropsch catalyst is in a predetermined active state while said internal combustion engine is stopped; and valve control means for controlling said mixed gas valve so as to connect said mixed gas generating means and said fuel synthesizing means when it is determined that said Fischer-Tropsch catalyst is in said predetermined active state.

An eighteenth aspect of the present invention is the vehicle with a fuel producing system according to the fifteenth aspect, wherein said fuel synthesizing means is provided in an EGR passage connecting an intake passage and said exhaust passage of said internal combustion engine, and said synthetic fuel supply means is an EGR passage switching valve for switching opening/closing of said EGR passage, the vehicle further comprising:

a mixed gas valve for connecting or shutting off said mixed gas generating means and said fuel synthesizing means;

operation condition determining means for determining whether or not an operation condition of said internal combustion engine is in a predetermined exhaust reflux area and a predetermined high-exhaust temperature area; and valve control means for controlling said EGR passage switching valve so as to open said EGR passage and for controlling said mixed gas valve so as to connect said mixed gas generating means and said fuel synthesizing means when it is determined that said operation condition is in said predetermined exhaust reflux area and said predetermined high-exhaust temperature area.

A nineteenth aspect of the present invention is the vehicle with a fuel producing system according to any one of the fifteenth to eighteenth aspects, further comprising:

a fuel tank provided between said synthetic fuel generating means and said synthetic fuel supply means and storing said synthetic fuel generated by said synthetic fuel generating means and gasoline; and a heat exchanger provided between said fuel synthesizing means and said fuel tank and performing heat-exchange between said synthetic fuel generated by said synthetic fuel generating means and cooling water for cooling said internal combustion engine.

A twentieth aspect of the present invention is the vehicle with a fuel producing system according to any one of the fifteenth to eighteenth aspects, further comprising:

a gasoline tank for storing gasoline; and a canister provided between said synthetic fuel generating means and said synthetic fuel supply means and also connected to said gasoline tank, the canister storing said synthetic fuel generated by said synthetic fuel generating means and vaporized gasoline vaporized from the gasoline in said gasoline tank.

A twenty-first aspect of the present invention is the vehicle with a fuel producing system according to any one of the fifteenth to twentieth aspects, further comprising:

an exhaust purification catalyst provided in an exhaust passage of said internal combustion engine and purifying exhaust from said internal combustion engine, wherein said synthetic fuel supply means is configured to be capable of adding said synthetic fuel generated by said synthetic fuel generating means to said exhaust passage on the upstream side of said exhaust purification catalyst.

A twenty-second aspect of the present invention is the vehicle with a fuel producing system according to any one of the fifteenth to twenty-first aspects, further comprising:

a generator for generating power using an output of said internal combustion engine; and a battery capable of storing electric power of said generator, wherein by power fed from said battery, said mixed gas generating means generates said mixed gas and said fuel synthesizing means converts said mixed gas to said synthetic fuel, A twenty-third aspect of the present invention is the vehicle with a fuel producing system according to the twenty-second aspects, further comprising:

an on-board generating device for converting at least one of solar light, solar heat, exhaust heat, and wind power to electric power, wherein said battery is configured to be capable of storing electric power of said on-board generating device.

A twenty-fourth aspect of the present invention is the vehicle with a fuel producing system according to the twenty-second aspect or the twenty-third aspect, further comprising:

power receiving means capable of receiving electric power from a power supply outside the vehicle, wherein said battery is configured to be capable of storing electric power received by said power receiving means.

A twenty-fifth aspect of the present invention is the vehicle with a fuel producing system according to any one of the fifteenth to twenty-first aspects, further comprising:

power receiving means capable of receiving electric power from a power supply outside the vehicle, wherein by electric power fed from said power receiving means while the vehicle is stopped, said mixed gas generating means generates said mixed gas and said fuel synthesizing means converts said mixed gas to said synthetic fuel.

A twenty-sixth aspect of the present invention is the vehicle with a fuel producing system according to any one of the twenty-second to twenty-fifth aspects, further comprising:

elapsed time determining means for determining whether or not elapsed time after production of said synthetic fuel exceeds a predetermined allowable time, wherein if said elapsed time exceeds said predetermined allowable time, power fed to said mixed gas generating means and said fuel synthesizing means is prohibited.

A twenty-seventh aspect of the present invention is the vehicle with a fuel producing system according to any one of the fifteenth to twenty-first aspects, further comprising:

a generator for generating electric power by using an output of said internal combustion engine;

power receiving means capable of receiving electric power from a power supply outside the vehicle;

a battery capable of storing electric power of said generator and electric power received by said power receiving means;

mode switching means for switching a mode between a battery storing mode for storing electric power received by said power receiving means in said battery and a fuel production mode for feeding electric power received by said power receiving means to said mixed gas generating means and said fuel synthesizing means; and mode switching control means for controlling said mode switching means so as to switch to said battery storing mode if a stored power amount of said battery is smaller than a predetermined amount, and to said fuel production mode if said stored power amount is larger than the predetermined amount.

Advantageous Effects of Invention

According to the first invention, the mixed gas composed of CO and $H_2$ can be generated by electrolyzing $CO_2$ contained in exhaust gas from the internal combustion engine and/or atmospheric air and water by the mixed as generating means, respectively. Moreover, the generated mixed gas can be supplied to the internal combustion engine by the mixed gas supplying means. Therefore, $H_2$ and CO generated by electrolysis can be supplied to the internal combustion engine in the vehicle.

According to the second invention, the absorbing liquid can be circulated between the carbon dioxide absorbing means and the electrolytic bath by the absorbing liquid circulating means. In the electrolytic bath, the $CO_2$ concentration in the absorbing liquid decreases with the generation of CO. In this regard, by returning the absorbing liquid again from the electrolytic bath to the carbon dioxide absorbing means, $CO_2$ can be replenished by the carbon dioxide absorbing means. Therefore, since the absorbing liquid with the substantially constant $CO_2$ concentration can be supplied to the electrolytic bath, CO can be generated stably.

According to the third invention, since the carbon dioxide absorbing means is provided in the bypass passage bypassing a part of the exhaust passage of the internal combustion engine, $CO_2$ can be introduced into the absorbing liquid in the carbon dioxide absorbing means by using the exhaust gas pressure. Therefore, since the power for introducing $CO_2$ to the carbon dioxide absorbing means can be omitted, energy efficiency and fuel efficiency can be improved.

The $CO_2$ concentration in the absorbing liquid and pressure of the exhaust gas flowing through the bypass passage are correlated to each other, and if the exhaust gas pressure is high, the $CO_2$ concentration in the absorbing liquid in the carbon dioxide absorbing means increases. According to the fourth invention, the amount of the absorbing liquid to be sent to the absorbing liquid storing means can be controlled in accordance with the exhaust gas pressure. Thus, such an adjustment is made possible that if the exhaust gas pressure is high, the liquid sending amount is increased, while if the exhaust gas pressure is low, the liquid sending amount is decreased. Therefore, the absorbing liquid with the substantially constant $CO_2$ concentration can be sent to the absorbing liquid storing means.

As described above, if the exhaust gas pressure is high, the $CO_2$ concentration in the absorbing liquid in the carbon dioxide absorbing means increases. According to the fifth invention, since the exhaust gas pressure can be adjusted by the exhaust as pressure adjusting means, the $CO_2$ concentration can be increased even in an area where a requested air amount is small such as idling or a low-rotation and light-load area. Therefore, even in an area where the requested air amount is small, the absorbing liquid with the substantially constant $CO_2$ concentration can be sent to the absorbing liquid storing means.

According to the sixth invention, atmospheric air can be introduced into the carbon dioxide absorbing means by the atmospheric air introducing means. Therefore, $CO_2$ can be introduced into the absorbing liquid in the carbon dioxide absorbing means by using a ram pressure during running of a vehicle. Therefore, since the power for introducing $CO_2$ into the carbon dioxide absorbing means can be omitted, energy efficiency and fuel efficiency can be improved.

A vehicle speed and the ram pressure are correlated to each other, and the $CO_2$ concentration in the absorbing liquid in the carbon dioxide absorbing means and the ram pressure are correlated to each other. Specifically, if the vehicle speed is high, the ram pressure is high, and if the ram pressure high, the $CO_2$ concentration in the absorbing liquid in the carbon dioxide absorbing means increases. According to the seventh invention, the amount of the absorbing liquid to be sent to the absorbing liquid storing means can be controlled in accordance with the vehicle speed. Thus, such an adjustment of the liquid sending amount can be made that if the vehicle speed is high, the liquid sending amount is increased, while if the vehicle speed is low, the liquid sending amount is decreased. Therefore, the absorbing liquid with the substantially constant $CO_2$ concentration can be sent to the absorbing liquid storing means.

The correlation with the $CO_2$ concentration in the absorbing liquid is not limited to the above-described ram pressure. That is, a combination between the inter-vehicle distance between the own vehicle and the preceding vehicle and the ram pressure or the combination between the $CO_2$ concentration in the atmospheric air and the ram pressure is also correlated with the $CO_2$ concentration in the absorbing liquid. According to the eighth and ninth invention, the amount of the absorbing liquid to be sent to the absorbing liquid storing means can be controlled by using such correlations. Therefore, the absorbing liquid with the substantially constant $CO_2$ concentration can be sent to the absorbing liquid storing means.

In the electrolytic bath, water is consumed with generation of $H_2$. Thus, in order to continuously generate $H_2$, periodic replenishment of water is needed. In this regard, according to the tenth invention, water can be automatically collected by the rainwater supply means. Moreover, according to the eleventh invention, vapor in the exhaust gas can be condensed and collected by the exhaust-derived condensed water supply means. Moreover, according to the twelfth invention, vapor in atmospheric air can be condensed and collected by the atmosphere-derived condensed water supply means. Therefore, since water can be collected automatically, periodic water replenishment can be omitted.

According to the thirteenth invention, by storing power of the generator in the battery, the mixed gas can be generated by power fed from this battery. Moreover, according to the fourteenth invention, power of the on-board power generating device can be supplied to the battery. Therefore, power required for generation of the mixed gas can be sufficiently borne. Moreover, the on-board power generating device can generate power even while the vehicle is stopped, and the mixed gas can be generated and stored while the vehicle is stopped.

According to the fifteenth invention, the mixed gas composed of CO and $H_2$ can be generated by electrolyzing $CO_2$ contained in the exhaust gas from the internal combustion engine and/or atmospheric air and water by the mixed gas generating means, respectively. Moreover, the mixed gas can be converted to a synthetic fuel by the Fischer-Tropsch catalyst (hereinafter also referred to as an "FT catalyst") in the fuel synthesizing means. Furthermore, the synthetic fuel can be supplied to the internal combustion engine by the synthetic fuel supply means. Therefore, in the vehicle, the fuel obtained by synthesizing $H_2$ and CO can be supplied to the internal combustion engine.

When the mixed gas is to be converted to the synthetic fuel by the FT catalyst, a certain amount of thermal energy is required. According to the sixteenth invention, if it is determined that the FT catalyst is in an active state, the bypass passage switching valve is controlled so that the bypass passage is opened, and the mixed gas valve can be controlled so that the mixed gas generating means and the fuel synthesizing means are connected. By connecting the mixed gas generating means and the fuel synthesizing means, the mixed gas can be introduced from the mixed gas generating means to the fuel synthesizing means. Moreover, by opening the bypass passage, the exhaust gas can be introduced to the fuel synthesizing means side. Therefore, the mixed gas can be converted to the synthetic fuel by using the thermal energy of the exhaust gas.

Even while the internal combustion engine is stopped, if residual heat remains in the exhaust passage, it is likely that the FT catalyst is in the active state and the thermal energy required for the above-described conversion remains. According to the seventeenth invention, the mixed gas can be introduced from the mixed gas generating means to the fuel synthesizing means in such a case. Therefore, the mixed gas can be converted to the synthetic fuel by using the residual heat in the exhaust passage.

According to the eighteenth invention, the mixed gas can be converted to the synthetic fuel by using thermal energy of the exhaust gas flowing through the EGR passage. Moreover, by getting rid of the thermal energy by this conversion, the exhaust gas can be cooled. Therefore, since the fuel synthesizing means can be made to function as an EGR cooler, the system can be simplified.

Since the synthetic fuel immediately after conversion is at a high temperature close to the temperature of the FT catalyst, most of it is present in a gas state. According to the nineteenth invention, the synthetic fuel in the gas state can be heat-exchanged with cooling water for cooling the internal combustion engine. Therefore, since the high-temperature synthetic fuel can be cooled and liquefied, the synthetic fuel can be stored in the fuel tank together with gasoline.

As described above, since the synthetic fuel immediately after conversion is at a high temperature close to the temperature of the FT catalyst, most of it is present in the gas state. According to the twentieth invention, the synthetic fuel still in the gas state and vaporized gasoline can be adsorbed by the canister. Therefore, as in the nineteenth invention, installation of various devices for cooling the synthetic fuel is no longer necessary. Moreover, the synthetic fuel can be supplied with the vaporized gasoline to the internal combustion engine by utilizing an existing purge device.

According to the twenty-first invention, the synthetic fuel can be added to the exhaust passage on the upstream side of the exhaust purification catalyst. Therefore, controls can be made such that, if the temperature of the exhaust purification catalyst is low, for example, the synthetic fuel is added so as to raise the temperature of the exhaust purification catalyst.

According to the twenty-second invention, by storing power generated by the generator in the battery by using an output of the internal combustion engine, power required for generation of the mixed gas or conversion of this mixed gas to the synthetic fuel can be borne by power fed from the battery. Moreover, according to the twenty-third invention, the power from the on-board generating device can be stored in the battery. Therefore, power required for generation of the mixed gas or conversion of this mixed gas to the synthetic fuel can be borne reliably.

According to the twenty-fourth invention, since power from the external power supply can be stored in the battery, a shortage of power required for generation of the mixed gas or conversion of this mixed gas to the synthetic fuel can be favorably suppressed. Moreover, according to the twenty-fifth invention, power required for generation of the mixed gas or conversion of this mixed gas to the synthetic fuel can be borne by power fed from the external power supply while the vehicle is stopped. Therefore, a sufficient amount of the synthetic fuel can be produced. Moreover, while the vehicle is stopped, liquid level oscillation of the electrolytic solution does not occur, and the synthetic fuel can be produced stably.

The synthetic fuel has a nature common to gasoline but also contains coarse components and thus, the synthetic fuel is deteriorated more easily than gasoline. According to the twenty-sixth invention, if an elapsed time after production of the synthetic fuel exceeds a predetermined allowable time, power fed to the fuel synthesizing means can be prohibited. Therefore, since additional production of the synthetic fuel can be prohibited, mixture of the additionally produced synthetic fuel with the synthetic fuel having a long storage period can be prevented.

According to the twenty-seventh invention, the battery charging mode can be realized if the charged amount of the battery is smaller than a predetermined amount, while the fuel production mode can be realized if the charged amount is larger than the predetermined amount by the mode switching control means. Therefore, power received by the power receiving means can be effectively used without waste.

DESCRIPTION OF EMBODIMENTS

Embodiment 1

Description of Configuration of Vehicle

Figure 1:
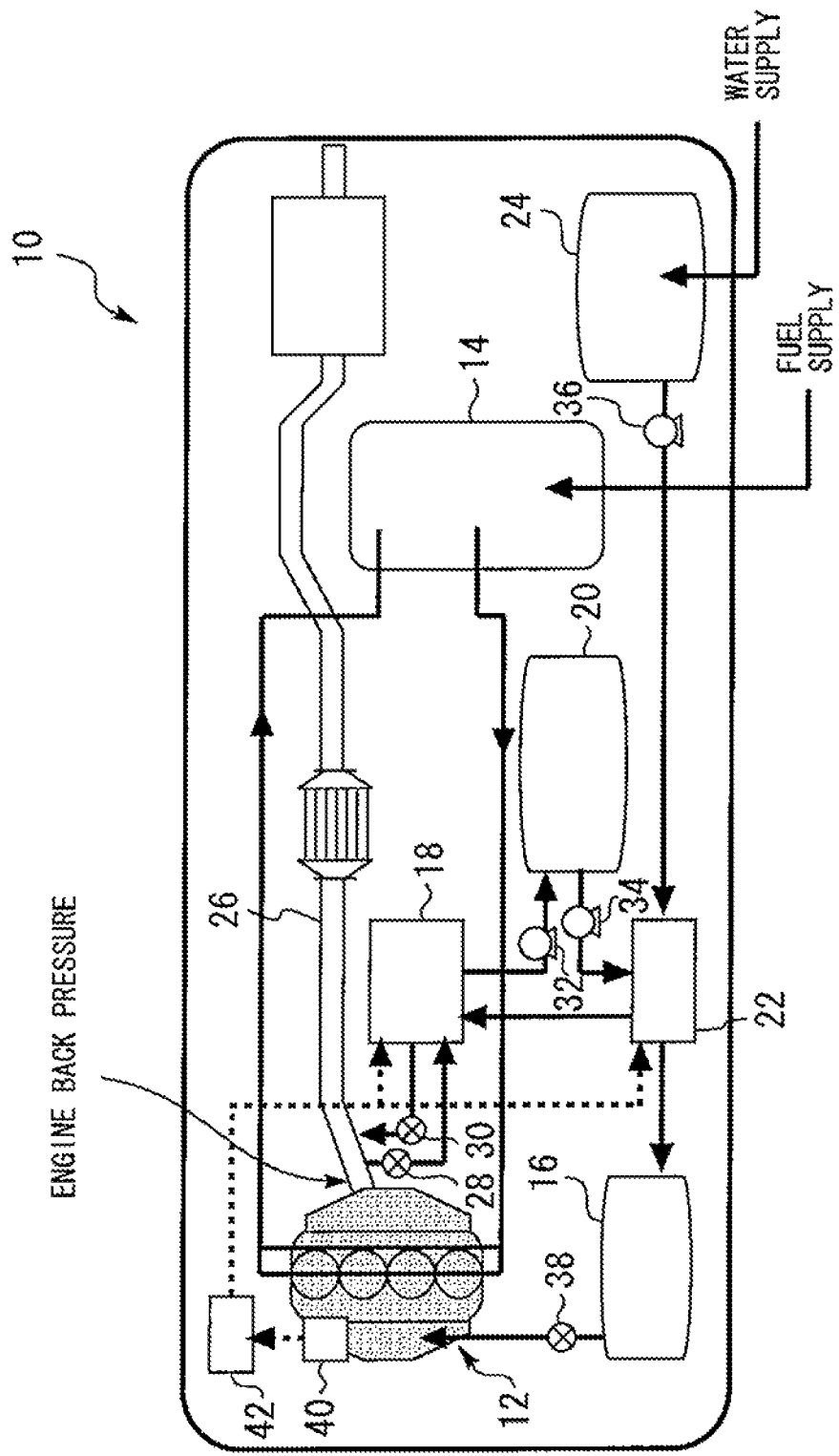
FIG. 1 is an entire configuration diagram illustrating a configuration of a vehicle of a first embodiment.

First, an embodiment 1 of the present invention will be described by referring to FIGS. 1 to 18. FIG. 1 is an entire configuration diagram illustrating a configuration of a vehicle of this embodiment. A vehicle 10 illustrated in FIG. 1 is provided with an engine 12 as an internal combustion engine. The engine 12 is configured capable of using gasoline in a gasoline tank 14 and CO and $H_2$ in an $H_2$ & CO tank 16. The number of cylinders and an arrangement of the cylinders in the present invention are not limited to those of the engine 12 in this embodiment and, for example, the engine may be a 6-cylinder, 8-cylinder or 12-cylinder engine and the arrangement may be a V-type, horizontally opposed type or the like, and various modes can be employed.

Moreover, the vehicle 10 illustrated in FIG. 1 is provided with an $H_2$, CO supply system. In this embodiment, it is assumed that a mixed gas consisting of $H_2$ and CO generated during operation of the engine 12 is stored in the $H_2$ & CO tank 16 and supplied to an intake system (or into a cylinder) of the engine 12. Thus, the $H_2$, CO supply system is provided with a $CO_2$ reclaimer 18, an electrolytic solution tank 20, an electrolyser 22, a water tank 24 and the like in addition to the $H_2$ & CO tank 16.

The $CO_2$ reclaimer 18 stores an electrolytic solution having $CO_2$ absorbing properties therein ($KHCO_3$ aqueous solution or organic salt formed having molecular composition of a cation site and an anion site and not crystallized but melted at a normal temperature (so-called ionic liquid), for example). Moreover, the $CO_2$ reclaimer 18 is provided on a bypass passage bypassing a part of an exhaust passage 26 of the engine 12, and in the bypass passage, a $CO_2$ inlet valve 28 and a $CO_2$ outlet valve 30, each being composed of an electromagnetic valve and the like, are provided, respectively. The $CO_2$ inlet valve 28 is connected to an inlet pipe, not shown, and by opening the $CO_2$ inlet valve 28, an exhaust gas flowing through the exhaust passage 26 makes bubbling introduction into the electrolytic solution in the $CO_2$ reclaimer 18 through this inlet pipe. Moreover, by opening the $CO_2$ outlet valve 30, an excessive exhaust gas in the $CO_2$ reclaimer 18 is returned to the exhaust passage 26.

The electrolytic solution tank 20 is provided on the downstream side of the $CO_2$ reclaimer 18. The electrolytic solution tank 20 is connected to the $CO_2$ reclaimer 18 through an electrolytic solution pump 32 and is provided with the electrolytic solution having absorbed $CO_2$ therein. The electrolytic solution in the $CO_2$ reclaimer 18 is assumed to be introduced into the electrolytic solution tank 20 by driving the electrolytic solution pump 32.

The electrolyser 22 is provided on the downstream side of the electrolytic solution tank 20. The electrolyser 22 is a small-sized on-board electrolyser and is configured to generate H2 and CO from the electrolytic solution in the electrolytic solution tank 20 and the water in the water tank 24. The electrolyser 22 is connected to the electrolytic solution tank 20 through the electrolytic solution pump 34 and is also connected to the water tank 24 through a water pump 36. An impurity removing device tot shown) such as an activated carbon or the like is provided between the water tank 24 and the water pump 36.

Moreover, the electrolyser 22 is connected to the $H_2$ & CO tank 16. The $H_2$ & CO tank 16 is connected to an intake system of the engine 12 through an $H_2$ & CO supply valve 38 composed of an electromagnetic valve or the like. That is, $H_2$ and CO generated by the electrolyser 22 are temporarily stored in the $H_2$ & CO tank 16 and supplied to the intake system of the engine 12 in the mixed gas state by opening the $H_2$ & CO supply valve 38.

Figure 2:
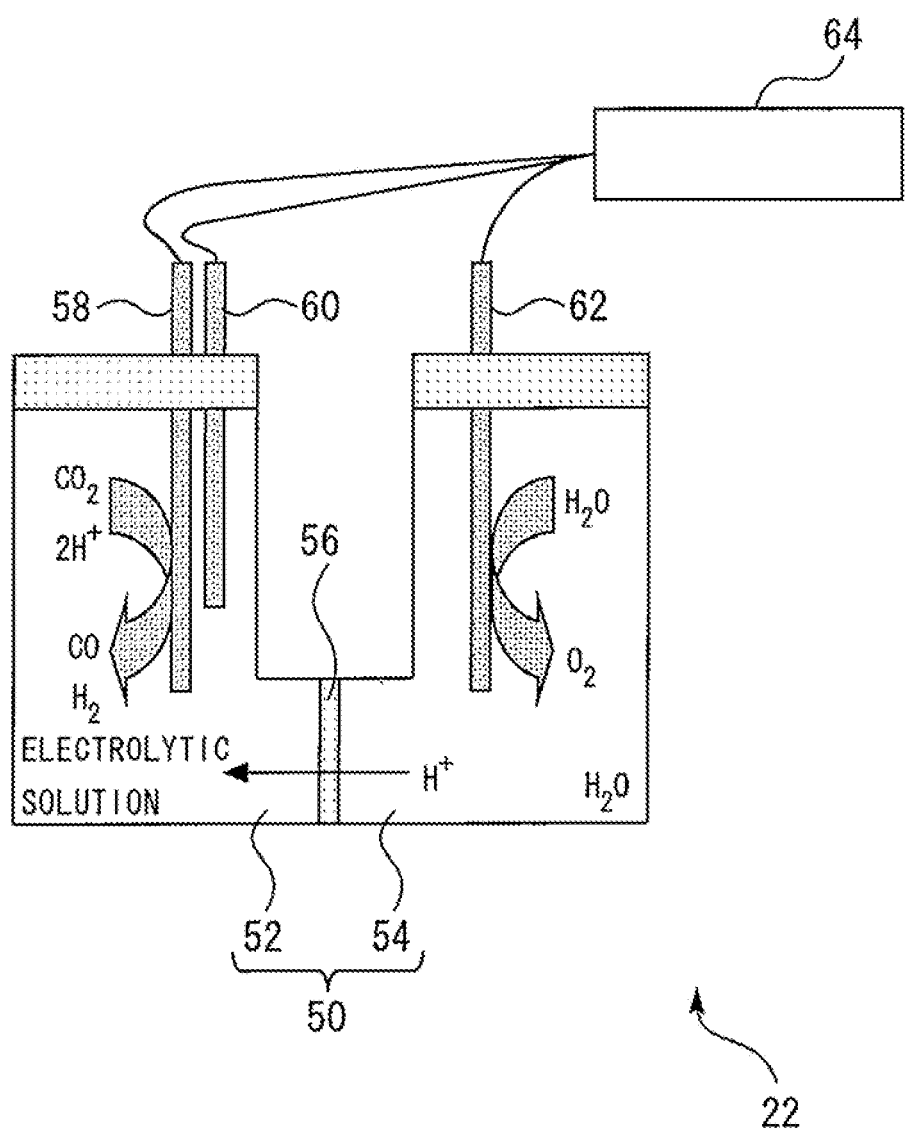
FIG. 2 is an outline diagram of an electrolyser 22 in FIG. 1.

Here, a detailed configuration of the electrolyser 22 will be described by referring to FIG. 2. FIG. 2 is an outline diagram of the electrolyser 22 in FIG. 1. The electrolyser 22 is provided with a 3-electrode type electrolytic bath 50. The electrolytic bath 50 is provided with a cathode chamber 52 filled with the electrolytic solution, an anode chamber 54 filled with water, and a diaphragm 56 partitioning the bath into the cathode chamber 52 and the anode chamber 54.

To the cathode chamber 52, the $H_2$ & CO tank 16 and the electrolytic solution tank 20 in FIG. 1 are connected. Moreover, in the cathode chamber 52, a working electrode (WE) 58 and a reference electrode (RE) 60 are arranged. The WE 58 corresponds to a cathode of the electrolytic bath 50 and its main body portion is formed of metal (Pt, for example) which is difficult to reduce $CO_2$ during electrolysis. On a part of the surface of this main body portion, a $CO_2$ reduction catalyst for selectively reducing $CO_2$ to CO during electrolysis is provided.

Moreover, to the anode chamber 54, the water tank 24 in FIG. 1 is connected. Moreover, in the anode chamber 54, a counter electrode (CE) 62 is arranged. The CE 62 corresponds to an anode of the electrolytic bath 50 and is formed of metal (Au, Pt, for example) which is not dissolved during electrolysis.

Moreover, the diaphragm 56 has a function of carrying protons from the anode chamber 54 side to the cathode chamber 52 side and is formed of a polymer electrolyte resin such as NAFION (registered trademark), for example.

Moreover, the electrolyser 22 is provided with a potentiostat 64. The potentiostat 64 is connected to the WE 58, the RE 60, and the CE 62. The potentiostat 64 controls a current value to flow between the WE 58 and the CE 62 so that a voltage between the RE 60 and the WE 58 becomes a predetermined value.

Here, the electrolysis in the electrolyser 22 will be described. When an electric current is made to flow between the WE 58 and the CE 62 by controlling the potentiostat 64, an electrochemical reaction in the following formulas (1) to (3) occurs in the WE 58 and the CE 62;

$$WE\ 58: CO_2 + 2H^+ 2e^- \rightarrow CO + H_2O \tag{1}$$

$$2H^+ + 2e^- \rightarrow H_2 \tag{2}$$

$$CE\ 62: 2H_2O \rightarrow O_2 + 4H^+ + 4e^- \tag{3}$$

The reaction in the above-described formula (1) occurs at a spot where the $CO_2$ reduction catalyst on the WE 58 is in contact with the electrolytic solution. Moreover, the reaction in the above-described formula (2) occurs at a spot where the main body portion of the WE 58 is in contact with the electrolytic solution. Furthermore, the reaction in the above-described formula (3) occurs at a spot where the CE 62 is in contact with the water.

By driving the water pump 36 while allowing the current to flow between the WE 58 and the CE 62 and to be supplied to the anode chamber 54, protons can be continuously generated on the CE 62 (the above-described formula (3)). At this time, further by driving the electrolytic solution pump 34 and by supplying the electrolytic solution to the cathode chamber 52, $CO_2$ and protons can be continuously supplied to the cathode chamber 52. Therefore, CO and $H_2$ can be continuously generated on the WE 58 (the above-described formulas (1) and (2)).

As described above, in this embodiment, CO and $H_2$ can be generated by using the electrolyser 22. Moreover, as will be described later, in this embodiment. CO and $H_2$ are generated by applying a voltage as low as approximately 3V between the RE 60 and the WE 58. Thus, the electrolyser 22 is more suitable to be mounted on board than other reacting devices requiring a high temperature condition of several hundreds degree Celsius.

Returning to FIG. 1, the vehicle 10 in this embodiment is provided with an alternator 40. The alternator 40 is a device arranged on a crank shaft (not shown) of the engine 12 and recovering deceleration energy of the vehicle 10 as electric energy. The electric energy recovered by the alternator 40 is assumed to be stored in the battery 42 and to be also supplied to the electrolytic solution pumps 32 and 34, the water pump 36, and the potentiostat 64.

Figure 3:
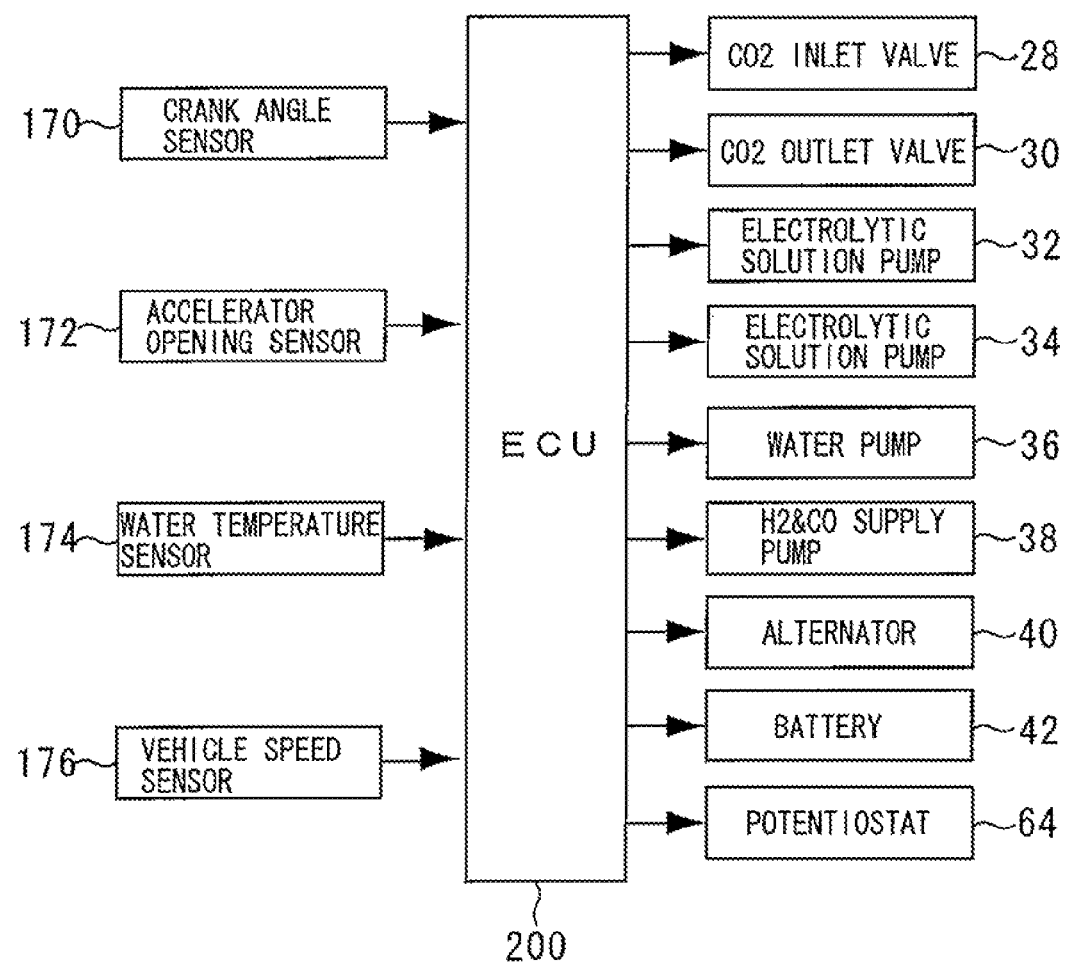
FIG. 3 is a configuration diagram illustrating the control system of the vehicle 10 in the first embodiment.

Subsequently, a control system of the vehicle 10 will be described by referring to FIG. 3. FIG. 3 is a configuration diagram illustrating the control system of the vehicle 10 in this embodiment. As illustrated in FIG. 3, the vehicle 10 of this embodiment is provided with a sensor system including a plurality of sensors 170 to 176 and an ECU (Electronic Control Unit) 200 for controlling an operation state of the engine 12.

First, the sensor system will be described. A crank angle sensor 170 outputs a signal synchronized with rotation of the crank shaft of the engine 12, and the ECU 200 can detect an engine revolution speed on the basis of this output. An accelerator opening sensor 172 detects an accelerator opening degree, and a water temperature sensor 174 detects a temperature of cooling water of the engine. Moreover, a vehicle speed sensor 176 detects a vehicle speed. The sensor system also includes various sensors required for control of the vehicle 10 or the engine 12 (an air/fuel ratio sensor for detecting an exhaust air/fuel ratio, a throttle sensor for detecting an opening degree of a throttle valve and the like, for example) other than the above-described sensors 170 to 176, and these sensors are connected to the input side of the ECU 200.

On the other hand, to the output side of the ECU 200, the $CO_2$ inlet valve 28, the $CO_2$ outlet valve 30, the electrolytic solution pumps 32 and 34, the water pump 36 and the like are connected. The ECU 200 detects operation information of the vehicle 10 through the sensor system and drives each actuator on the basis of the detection results so as to execute various controls such as the operation control of the vehicle 10, a $CO_2$ recovery control, a mixed gas generation control and a mixed gas supply control which will be described below.

Operation of Embodiment 1

$CO_2$ Recovery Control

The $CO_2$ recovery control is to send the electrolytic solution in the $CO_2$ reclaimer 18 to the electrolytic solution tank 20 while introducing exhaust gas flowing through the exhaust passage 26 into the $CO_2$ reclaimer 18 during operation of the engine 12. In the $CO_2$ recovery control, the exhaust gas ($CO_2$ source) is subjected to bubbling introduction into the electrolytic solution in the $CO_2$ reclaimer 18 by using the exhaust gas pressure (hereinafter also referred to as an "engine back pressure") in the exhaust passage 26. Thus, by executing the $CO_2$ recovery control, power for introducing the $CO_2$ source into the reclaimer (pump power, for example) can be omitted and thus, energy efficiency and fuel efficiency can be improved.

Figure 4:
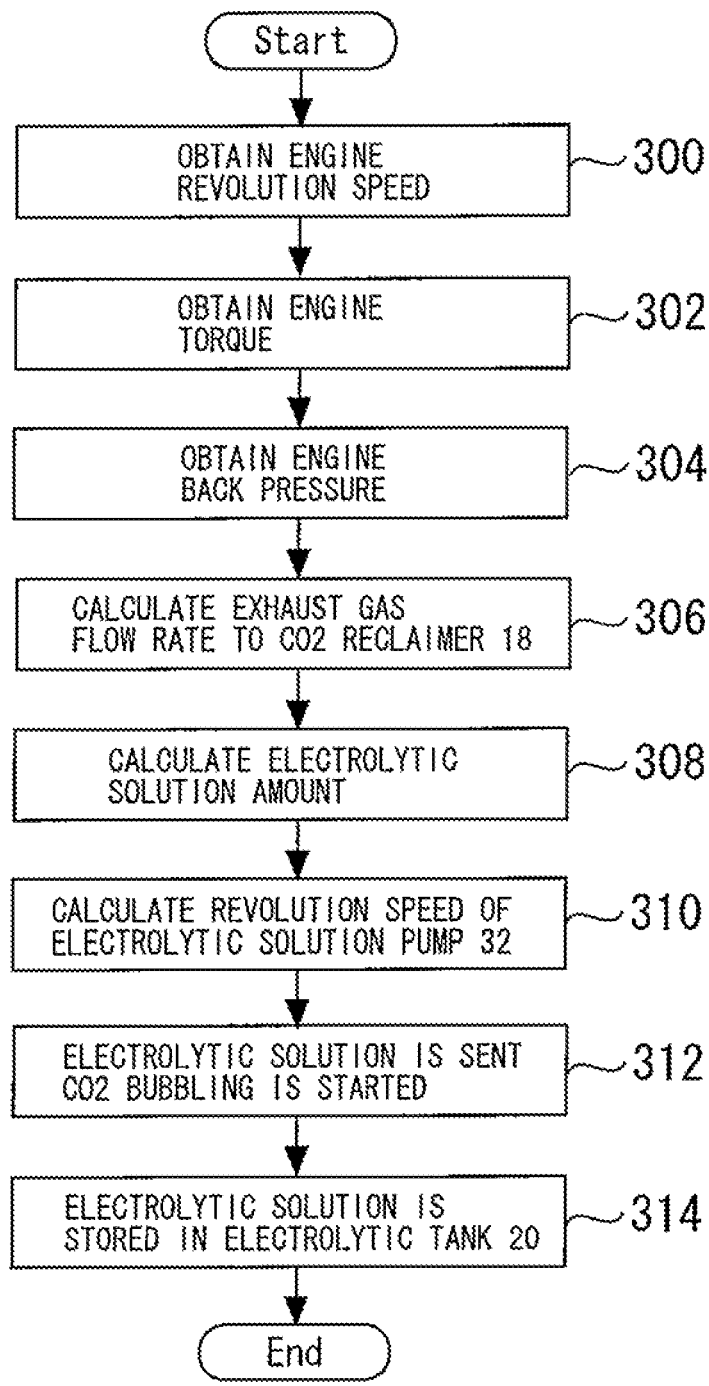
FIG. 4 is a flowchart illustrating the $CO_2$ recovery control executed by the ECU 200 in the first embodiment.

This $CO_2$ recovery control will be described by referring to FIGS. 4 to 8. FIG. 4 is a flowchart illustrating the $CO_2$ recovery control executed by the ECU 200 in this embodiment. A routine illustrated in FIG. 4 is repeatedly executed during operation of the engine 12.

Figure 5:
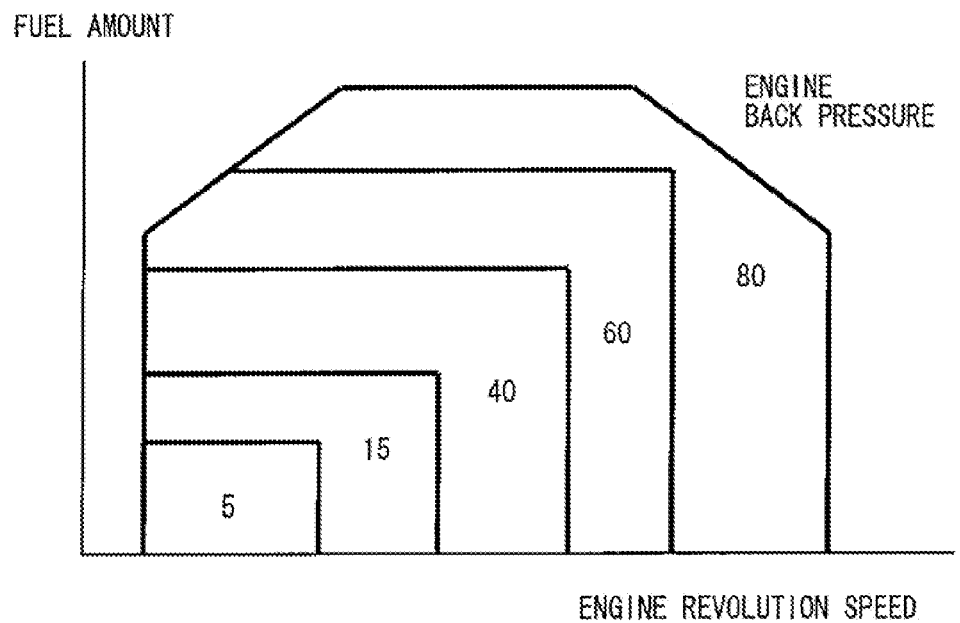
FIG. 5 is a characteristic diagram illustrating a relationship between a combination of the engine revolution speed and the engine torque and the engine back pressure.

In the routine illustrated in FIG. 4, first, the ECU 200 obtains a revolution speed of the engine 12 by the crank angle sensor 170 (Step 300) and obtains an engine torque (fuel injection amount) on the basis of the accelerator opening sensor 172 and the like (Step 302). Subsequently, the ECU 200 obtains an engine back pressure from the engine revolution speed and the engine torque obtained at Steps 300 and 302 (Step 304). FIG. 5 is a characteristic diagram illustrating a relationship between a combination of the engine revolution speed and the engine torque and the engine back pressure. At this Step 304, the engine back pressure is obtained by referring to map data made from the characteristic diagram illustrated in FIG. 5.

Figure 6:
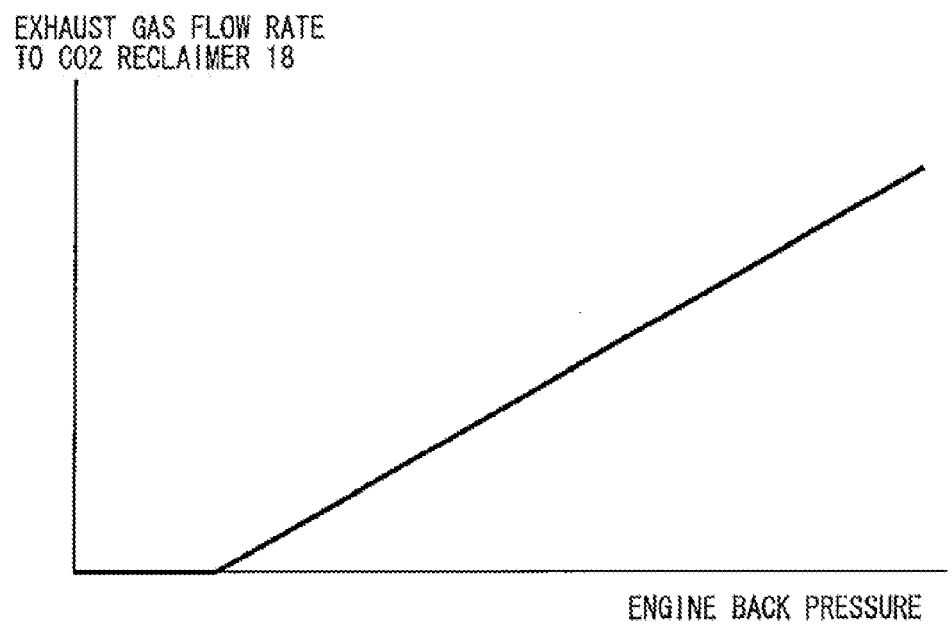
FIG. 6 is a characteristic diagram illustrating a relationship between the engine back pressure and the exhaust gas flow rate flowing into the $CO_2$ reclaimer 18.

Subsequently, the ECU 200 calculates an exhaust gas flow rate flowing into the $CO_2$ reclaimer 18 from the engine back pressure obtained at Step 304 (Step 306). FIG. 6 is a characteristic diagram illustrating a relationship between the engine back pressure and the exhaust gas flow rate flowing into the $CO_2$ reclaimer 18. In FIG. 6, the exhaust gas flow rate becomes zero in a low engine back pressure area because a pressure loss is considered. At this Step 306, the exhaust gas flow rate to the $CO_2$ reclaimer 18 is calculated by referring to map data made from the characteristic diagram illustrated in FIG. 6.

Figure 7:
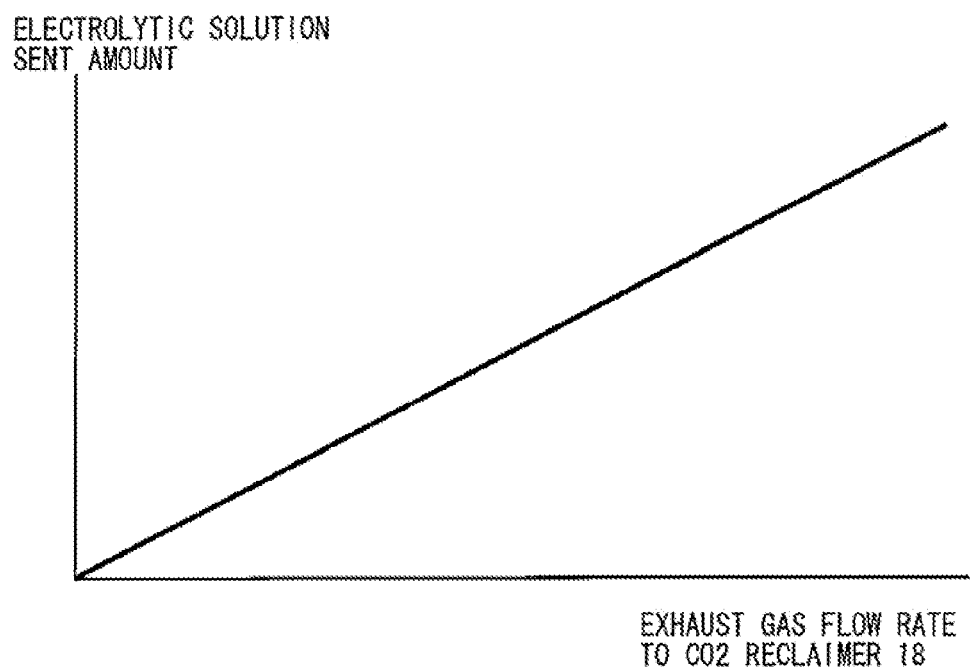
FIG. 7 is a characteristic diagram illustrating a relationship between the exhaust gas flow rate to the $CO_2$ reclaimer 18 and the electrolytic solution sent amount.

Subsequently, the ECU 200 calculates an electrolytic solution amount to be sent to the electrolytic solution tank 20 from the exhaust gas flow rate calculated at Step 306 (Step 308). FIG. 7 is a characteristic diagram illustrating a relationship between the exhaust gas flow rate to the $CO_2$ reclaimer 18 and the electrolytic solution sent amount. At this Step 308, the exhaust gas flow rate to the $CO_2$ reclaimer 18 is calculated by referring to map data made from the characteristic diagram illustrated in FIG. 7.

Figure 8:
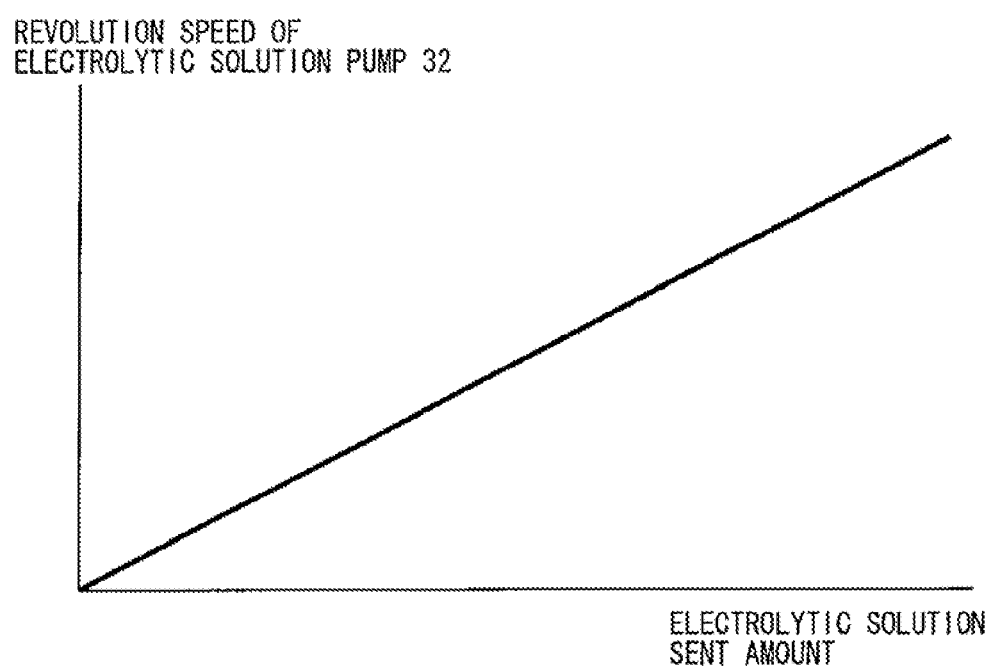
FIG. 8 is a characteristic diagram illustrating a relationship between the electrolytic solution sent amount and the motor revolution speed of the electrolytic solution pump 32.

Subsequently, the ECU 200 calculates a motor revolution speed of the electrolytic solution pump 32 (motor application voltage) from the electrolytic solution sent amount calculated at Step 308 (Step 310). FIG. 8 is a characteristic diagram illustrating a relationship between the electrolytic solution sent amount and the motor revolution speed of the electrolytic solution pump 32. At this Step 310, the motor revolution speed of the electrolytic solution pump 32 is calculated by referring to map data made from the characteristic diagram illustrated in FIG. 8.

Subsequently, the ECU 200 opens the $CO_2$ inlet valve 28 and the $CO_2$ outlet valve 30 and drives the electrolytic solution pump 32 at the motor revolution speed calculated at Step 310 (Step 312). As a result, the exhaust gas flowing through the exhaust passage 26 is absorbed by the electrolytic solution in the $CO_2$ reclaimer 18, and the electrolytic solution having absorbed $CO_2$ in the exhaust gas is sent to the electrolytic solution tank 20 from the $CO_2$ reclaimer 18 (Step 314).

(Mixed Gas Generation Control)

Figure 9:
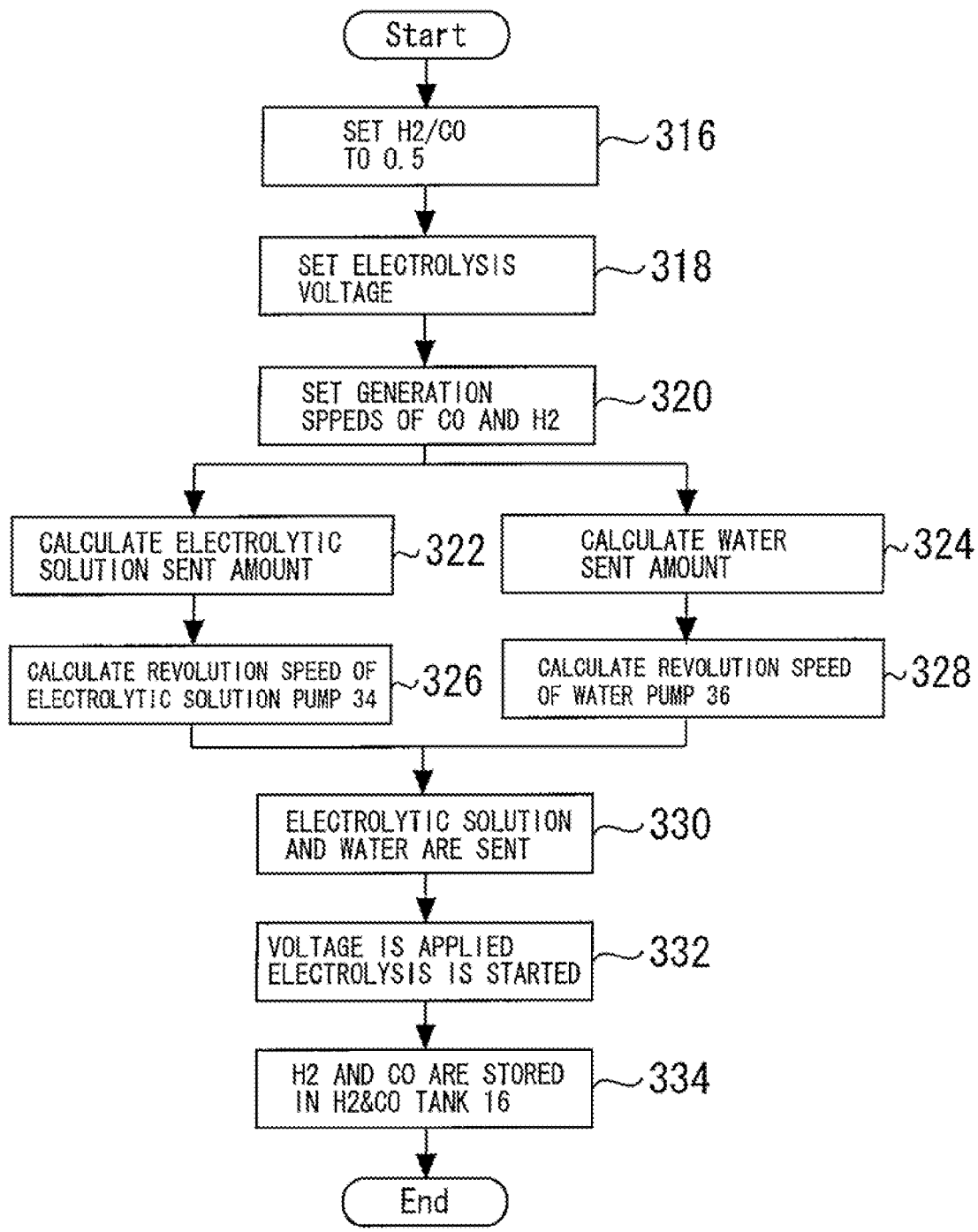
FIG. 9 is a flowchart illustrating the mixed gas generation control executed by the ECU 200 in the first embodiment.

The mixed gas generation control is to generate a mixed gas composed of CO and $H_2$ on the WE 58 by supplying the electrolytic solution in the electrolytic solution tank 20 and the water in the water tank 24 to the electrolytic bath 50 while controlling the potentiostat 64 during operation of the engine 12. This mixed gas generation control will be described by referring to FIGS. 9 to 14. FIG. 9 is a flowchart illustrating the mixed gas generation control executed by the ECU 200 in this embodiment. A routine illustrated in FIG. 9 is repeatedly executed during operation of the engine 12 similarly to the routine illustrated in FIG. 4.

Figure 10:
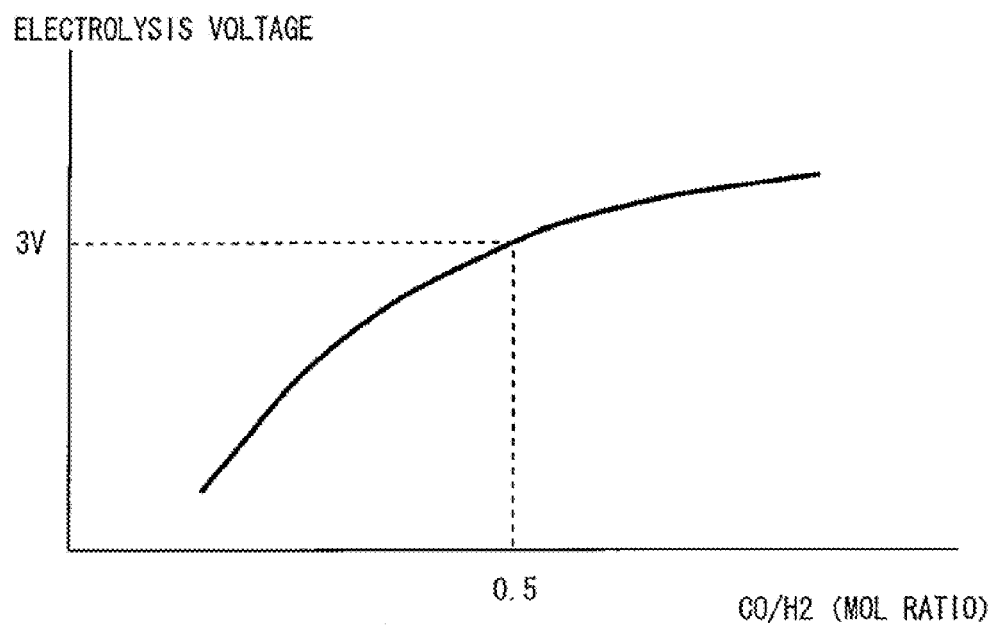
FIG. 10 is a characteristic diagram illustrating a relationship between $CO/H_2$ and the voltage between the RE 60 and the WE 58.

In the routine illustrated in FIG. 9, first, the ECU 200 sets a generation ratio of CO and $H_2$ generated on the WE 58 (hereinafter also referred to as "$CO/H_2$") (Step 316). In this embodiment, it is set to $CO/H_2=1/2$ but it may be set to a neighborhood value of $CO/H_2=1/2$ ($CO/H_2=5/9$, for example) or to a value other than these. Subsequently, the ECU 200 sets an electrolysis voltage, that is, a voltage between the RE 60 and the WE 58 (current value made to flow between the WE 58 and the CE 62) from $CO/H_2$ set at Step 316 (Step 318). FIG. 10 is a characteristic diagram illustrating a relationship between $CO/H_2$ and the voltage between the RE 60 and the WE 58. At this Step 318, the electrolysis voltage is set to 3V, for example, by referring to map data made from the characteristic diagram illustrated in FIG. 10.

Figure 11:
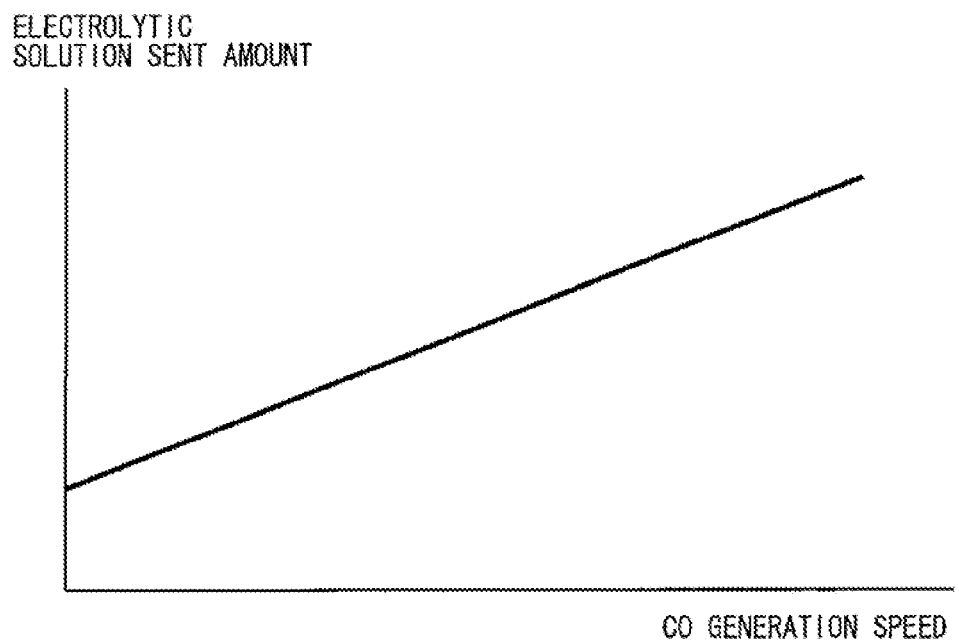
FIG. 11 is a characteristic diagram illustrating a relationship between the generation speed of CO and the electrolytic solution sent amount.
Figure 12:
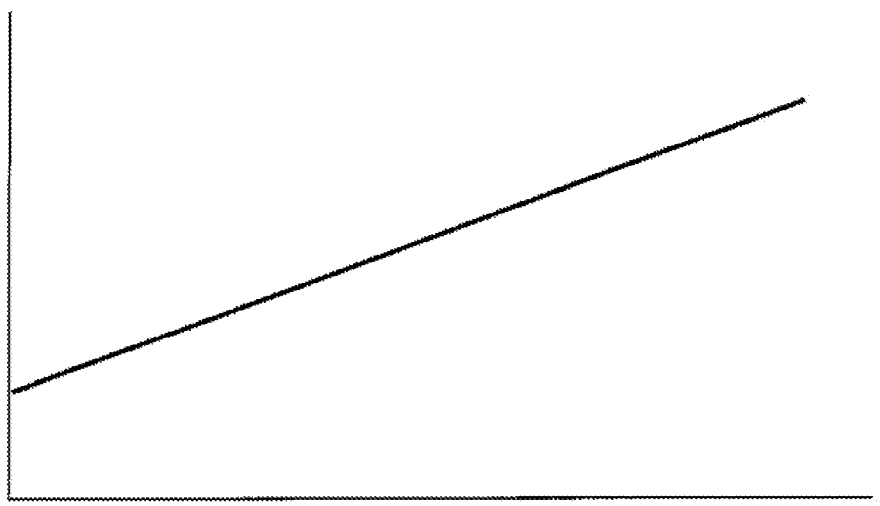
FIG. 12 is a characteristic diagram illustrating a relationship between the generation speed of $H_2$ and the water sent amount.

Subsequently, the ECU 200 sets generation speeds of CO and $H_2$ generated on the WE 58 (Step 320) and calculates the electrolytic solution amount and the water amount to be sent to the electrolytic bath 50 from the set speeds, respectively (Steps 322 and 324). FIG. 11 is a characteristic diagram illustrating a relationship between the generation speed of CO and the electrolytic solution sent amount. Moreover, FIG. 12 is a characteristic diagram illustrating a relationship between the generation speed of $H_2$ and the water sent amount. At Steps 322 and 324, the electrolytic solution, amount and the water amount to be sent to the electrolytic bath 50 are calculated by referring to map data made from the characteristic diagrams illustrated in FIGS. 11 and 12, respectively.

Figure 13:
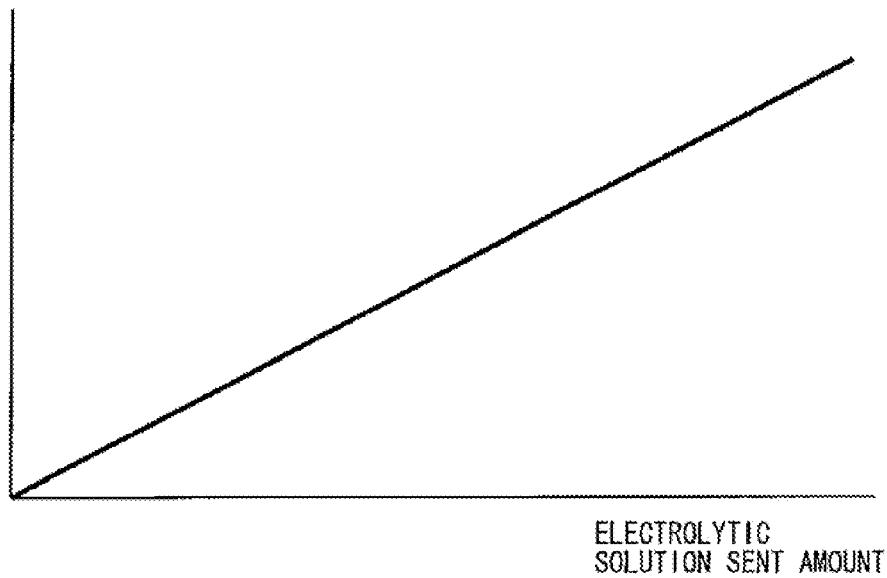
FIG. 13 is a characteristic diagram illustrating a relationship between the electrolytic solution sent amount and the motor revolution speed of the electrolytic solution pump 34.
Figure 14:
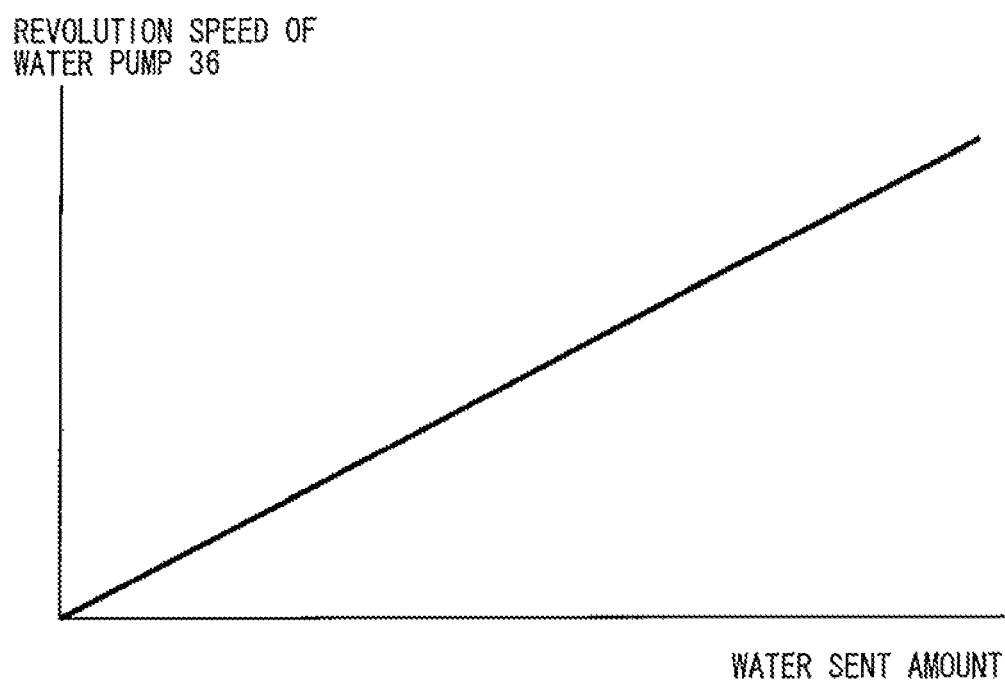
FIG. 14 is a characteristic diagram illustrating a relationship between the water sent amount and the motor revolution speed of the water pump 36.

Subsequently, the ECU 200 calculates the motor revolution speed of the electrolytic solution pump 34 from the electrolytic solution sent amount calculated at Step 322 (Step 326). FIG. 13 is a characteristic diagram illustrating a relationship between the electrolytic solution sent amount and the motor revolution speed of the electrolytic solution pump 34. At this Step 326, the motor revolution speed of the electrolytic solution pump 34 is calculated by referring to map data made from the characteristic diagram illustrated in FIG. 13. Similarly, the ECU 200 calculates the motor revolution speed of the water pump 36 from the water sent amount calculated at Step 324 (Step 328). FIG. 14 is a characteristic diagram illustrating a relationship between the water sent amount and the motor revolution speed of the water pump 36. At this Step 328, the motor revolution speed of the water pump 36 is calculated by referring to map data made from the characteristic diagram illustrated in FIG. 14.

Subsequently, the ECU 200 drives the electrolytic solution pump 34 and the water pump 36 at the motor revolution speeds calculated at Steps 326 and 328 (Step 330). As a result, the electrolytic solution in the electrolytic solution tank 20 and the water in the water tank 26 are sent to the electrolyser 22, respectively.

Subsequently, the ECU 200 controls the potentiostat 64 so that the electrolysis voltage set at Step 318 is applied between the RE 60 and the WE 58 (Step 332). As a result, CO and $H_2$ are generated on the WE 58. The generated CO and $H_2$ are stored in the $H_2$ & CO tank 16 (Step 334).

(Mixed Gas Supply Control)

Figure 15:
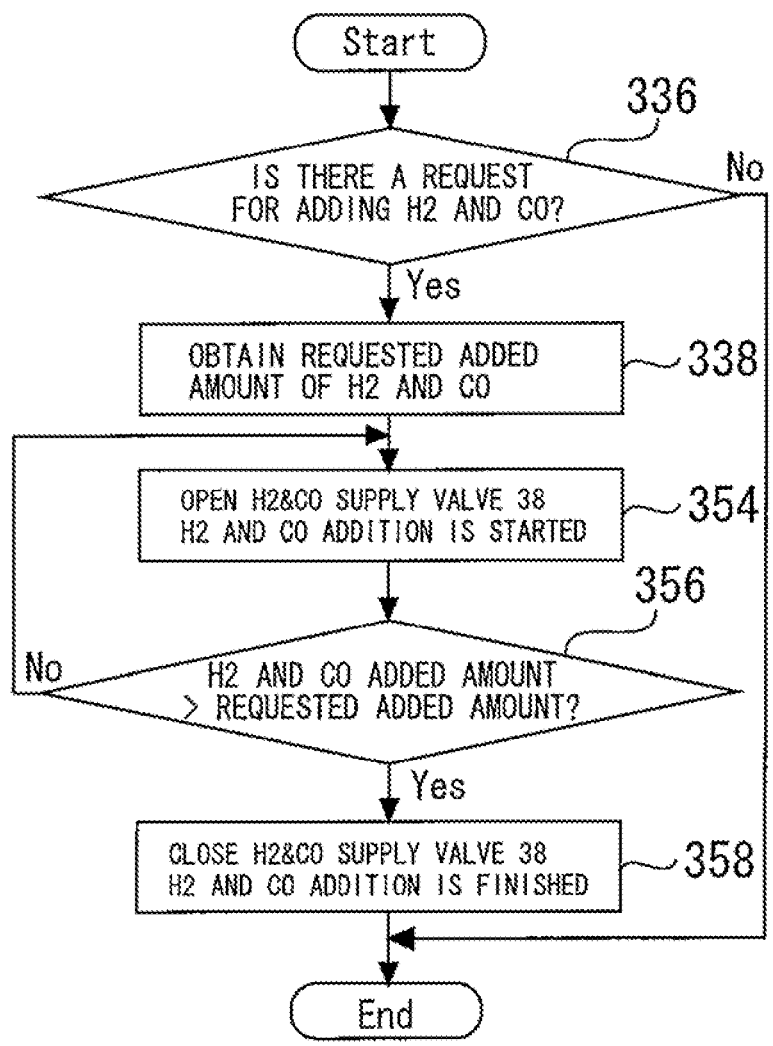
FIG. 15 is a flowchart illustrating a main routine of the mixed gas supply control executed by the ECU 200 in the first embodiment.
Figure 16:
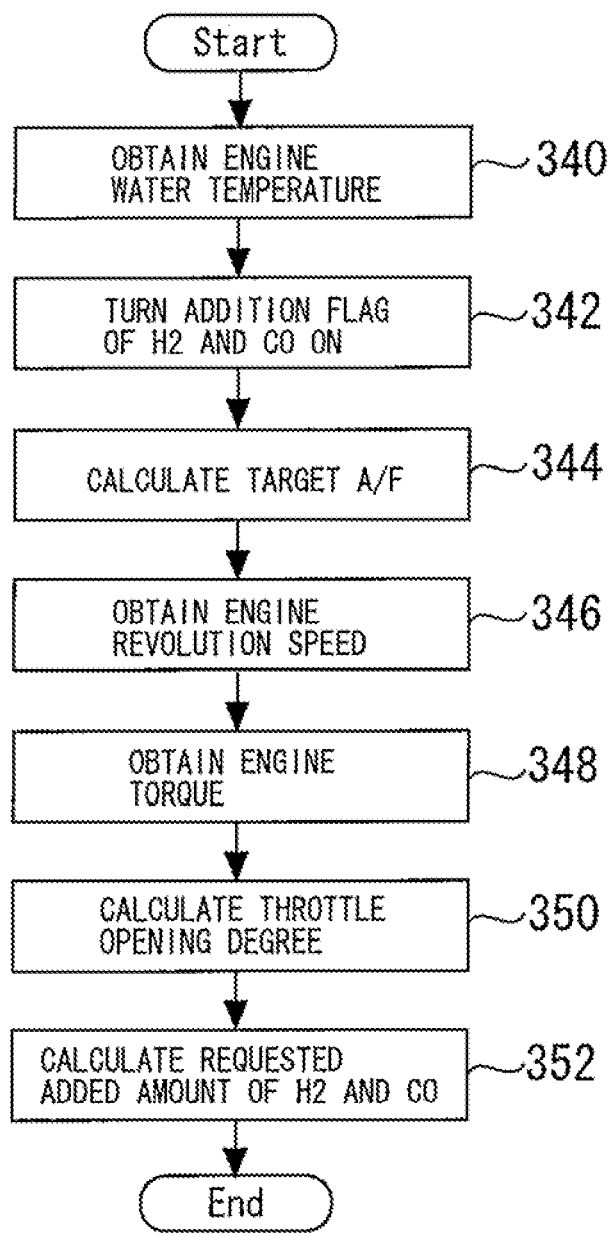
FIG. 16 is a flowchart illustrating a sub routine executed in parallel at the same time as the main routine in FIG. 15.

The mixed gas supply control is to supply the mixed gas in the $H_2$ & CO tank 16 to the intake system of the engine 12 during operation of the engine 12. This mixed gas supply control will be described by referring to FIGS. 15 to 18. FIG. 15 is a flowchart illustrating a main routine of the mixed gas supply control executed by the ECU 200 in this embodiment. The routine illustrated in FIG. 15 is assumed to be repeatedly executed during operation of the engine 12 similarly to the routine illustrated in FIG. 4.

In the routine illustrated in FIG. 15, first, the ECU 200 determines whether a request to add the mixed gas has been made or not by processing executed separately in the ECU 200 (Step 336). If the addition request has been made, the routine proceeds to Step 338, while if no addition request has been made, the routine proceeds to Step 358 and this routine is finished.

At Step 338, a requested added amount of the mixed gas is obtained. This requested added amount is calculated by a sub routine in FIG. 16 executed in parallel at the same time as this main routine. In the sub routine illustrated in FIG. 16, first, the ECU 200 obtains the engine water temperature by the water temperature sensor 174 (Step 340) and turns ON an addition request flag of the mixed gas (Step 342).

Figure 17:
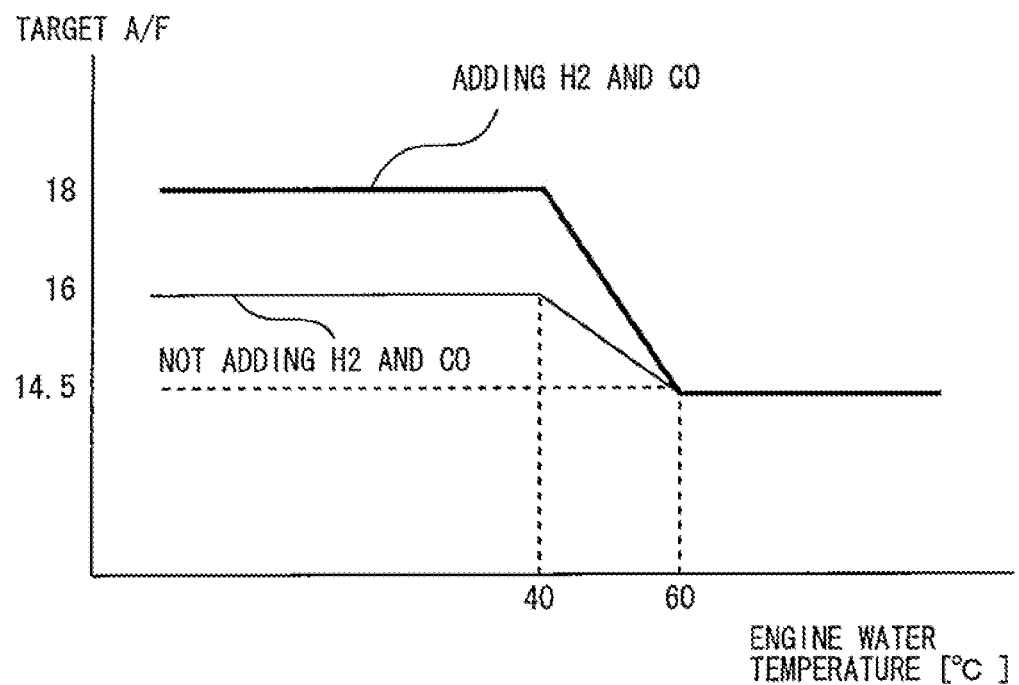
FIG. 17 is a characteristic diagram illustrating a relationship between the engine water temperature and the target air/fuel ratio.

Subsequently, the ECU 200 calculates a target air/fuel ratio from the engine water temperature obtained at Step 340 (Step 342), FIG. 17 is a characteristic diagram illustrating a relationship between the engine water temperature and the target air/fuel ratio. As illustrated in FIG. 17, in an area where the engine water temperature is low, the target air/fuel ratio is set to the side leaner than that for an area where the engine water temperature is high. Moreover, if the mixed gas is to be added in the area where the water temperature is low, the target air/fuel ratio is set to the side leaner than that for the case of no addition. At this Step 342, since the addition request flag of the mixed gas has been turned ON at Step 342, the ECU 200 calculates the target air/fuel ratio when the mixed gas is to be added from map data made from the characteristic diagram illustrated in FIG. 17.

Subsequently, the ECU 200 obtains a revolution speed of the engine 12 (Step 344) and obtains an engine torque (Step 346). Processing at Steps 344 and 346 is the same as that at Steps 300 and 302 in FIG. 4. Subsequently, the ECU 200 calculates a throttle opening degree from the engine torque obtained at Step 346 (Step 350).

Figure 18:
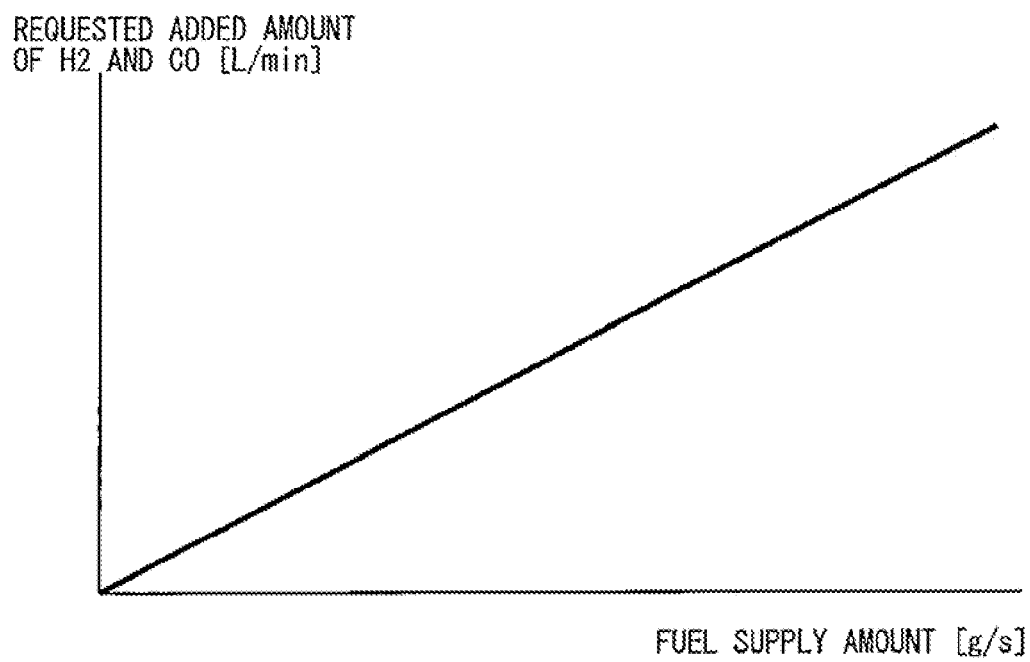
FIG. 18 is a characteristic diagram illustrating a relationship between the fuel supply amount and the added amount of the mixed gas.

Subsequently, the ECU 200 calculates a fuel (that is, gasoline and the mixed gas) supply amount from the target air/fuel ratio calculated at Step 342 and the throttle opening degree calculated at Step 350 and calculates the added amount of the mixed gas from this fuel supply amount (Step 352). FIG. 18 is a characteristic diagram illustrating a relationship between the fuel supply amount and the added amount of the mixed gas. At this Step 352, the requested added amount of the mixed gas is calculated by referring to map data made from the characteristic diagram illustrated in FIG. 18.

Returning to the main routine illustrated in FIG. 15, the ECU 200 opens the $H_2$ & CO supply valve 38 (Step 354). As a result, the mixed gas in the $H_2$ & CO tank 16 is supplied to the intake system of the engine 12. Subsequently, the total amount of the mixed gas injected from the $H_2$ & CO supply valve 38 is compared with the requested added amount of the mixed gas calculated at Step 352 (Step 356). If the total amount is smaller than the requested added amount, the routine returns to Step 356 again. On the other hand, if the total amount exceeds the requested added amount, $H_2$ & CO supply valve 38 is closed, and this routine is finished (Step 358).

As described above, according to the routine illustrated in FIGS. 4, 9, and 15, since the $CO_2$ recovery control, the mixed gas generation control, and the mixed gas supply control can be executed, a desired amount of the mixed gas can be added to the intake system of the engine 12 during operation of the engine 12. $H_2$ and CO constituting the mixed gas have combustibility higher than $O_2$. Therefore, if the desired amount of the mixed gas can be added to the intake system of the engine 12, the lean area can be expanded, and effects of an improvement of the fuel efficiency and reductions of an HC emission amount during cooling down and an NOx emission amount during warming up can be obtained. Moreover, effects of a reduction of torque fluctuation during large-amount EGR, an improvement of engine performance through improvement of knocking resistance, an improvement of thermal efficiency through improvement of compression ratio and the like cart be also obtained.

In this embodiment, the voltage between the RE 60 and the WE 58 is controlled by the potentiostat 64 by using the three-electrode type electrolytic bath 50, but a two-electrode type electrolytic bath in which the CE 62 also serves as the RE 60 may be used instead of the three-electrode type electrolytic bath 50. That is, if it is configured such that a voltage to be applied between the WE 58 and the CE 62 can be controlled, the configuration can be applied as a variation of the electrolyser 22 of this embodiment. Moreover, in this embodiment, the diaphragm 56 is used between the cathode chamber 52 and the anode chamber 54, but the diaphragm 56 may be omitted. These variations can be similarly applied in embodiments which will be described later.

In this embodiment, the $CO_2$ reclaimer 18, the electrolytic solution tank 20, the electrolyser 22, the water tank 24, the $CO_2$ inlet valve 28, the $CO_2$ outlet valve 30, the electrolytic solution pumps 32 and 34, and the water pump 36 correspond to the "mixed gas generating means" in the above-described first invention and the $H_2$ & CO tank 16 and the $H_2$ & CO supply valve 38 correspond to the "mixed gas supply means" in the above-described first invention, respectively.

Moreover, in this embodiment, the $CO_2$ reclaimer 18 and the electrolytic solution tank 20 correspond to the "carbon dioxide absorbing means" in the above-described second invention, the electrolytic bath 50 corresponds to the "electrolytic bath" in the above-described first invention, and the electrolytic solution pumps 32 and 34 correspond to the "absorbing liquid circulating means" in the above-described second invention, respectively.

Moreover, in this embodiment, the $CO_2$ reclaimer 18 corresponds to the "carbon dioxide absorbing means" in the above-described third invention.

Furthermore, in this embodiment, the electrolytic solution tank 20 corresponds to the "absorbing liquid storing means" in the above-described fourth invention. Moreover, the "exhaust pressure obtaining means" in the above-described fourth invention is realized by execution of the processing at Step 304 in FIG. 4 by the ECU 200 and the "solution sent amount control means" in the above-described fourth invention is realized by execution of the processing at Steps 306 and 308 in the same figure, respectively.

Embodiment 2

Subsequently, an embodiment 2 of the present invention will be described by referring to FIGS. 19 to 22. In this embodiment, differences from the above-described embodiment 1 will be mainly described, and explanations of similar matters will be simplified or omitted.

[Description of Configuration of Vehicle]

Figure 19:
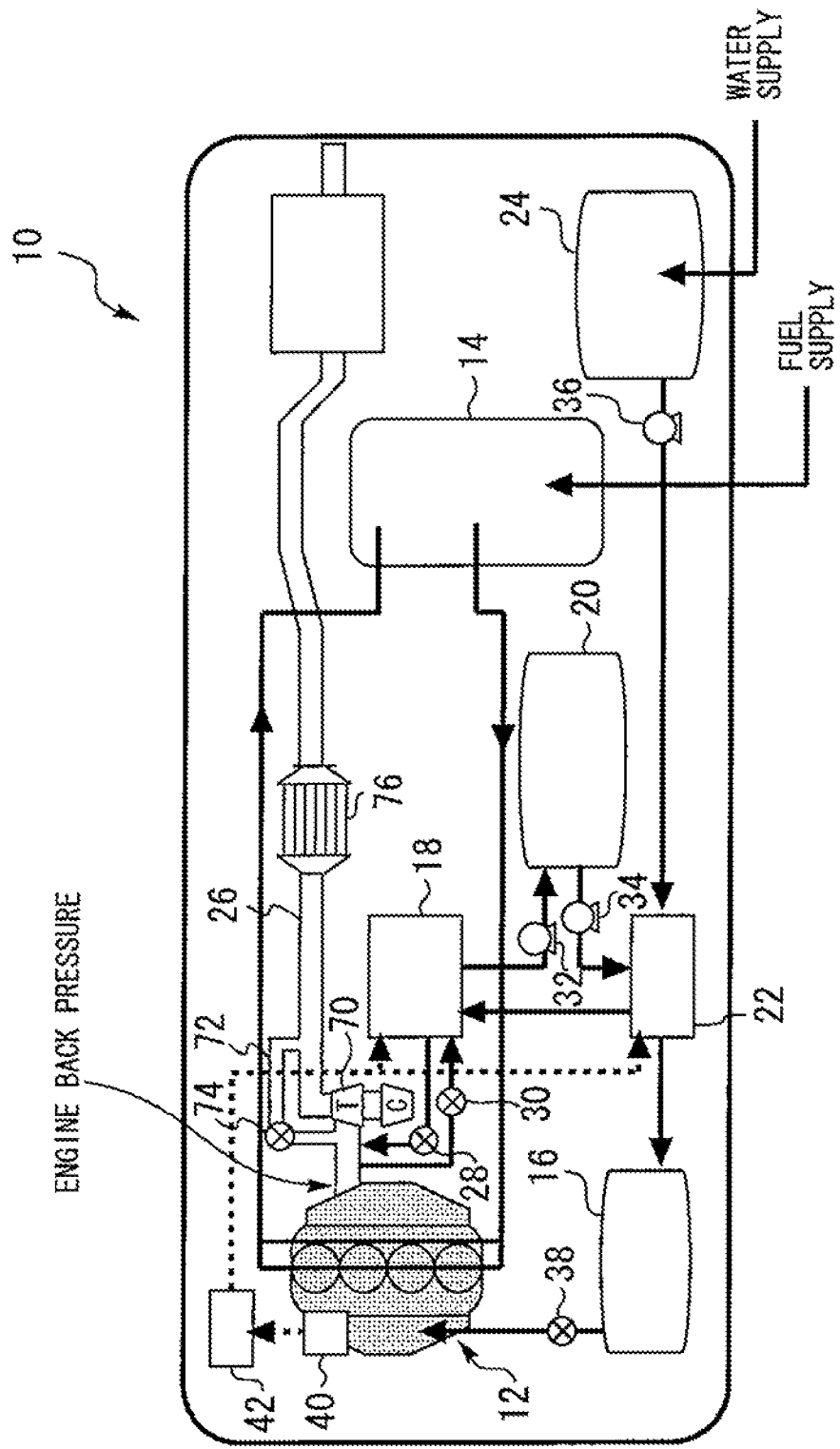
FIG. 19 is an entire configuration diagram illustrating a configuration of a vehicle of a second embodiment.

FIG. 19 is an entire configuration diagram illustrating a configuration of a vehicle of this embodiment. The vehicle 10 illustrated in FIG. 19 is provided with a turbine 70 operated (rotated) by energy of the exhaust gas of the engine 12 in the middle of the exhaust passage 26. The turbine 70 is provided with a plurality of rotatable nozzle vanes (not shown) and is configured such that an opening degree of a turbine nozzle formed between these nozzle vanes, that is, an area can be changed. Such a turbine nozzle is called a variable nozzle (VN). Moreover, the vehicle 10 is provided with a bypass passage 72 bypassing the turbine 70 and a waste gate valve 74 for adjusting an exhaust gas flow rate to this bypass passage 72 in the middle of the exhaust passage 26. Moreover, in the exhaust passage 26 on the downstream side from the turbine 70, an exhaust purification catalyst 76 for purifying the exhaust gas is provided.

Features of Embodiment 2

In the above-described embodiment 1, $CO_2$ is recovered by introducing the exhaust gas to the $CO_2$ reclaimer 18 by using the engine back pressure in the $CO_2$ recovery control. However, in an area where a requested air amount is small such as in idling or a low-revolution light-load area, an engine back pressure is low and it is likely that the $CO_2$ recovery amount becomes insufficient. If the $CO_2$ recovery amount is insufficient, a CO production amount on the WE 58 lowers. Thus, at the start of the engine, for example, it is likely that the mixed gas to be supplied to the engine 12 might be insufficient. Thus, in this embodiment, in the $CO_2$ recovery control, the engine back pressure is controlled by changing the opening degree of the turbine nozzle.

Operation of Embodiment 2

$CO_2$ Recovery Control

Figure 20:
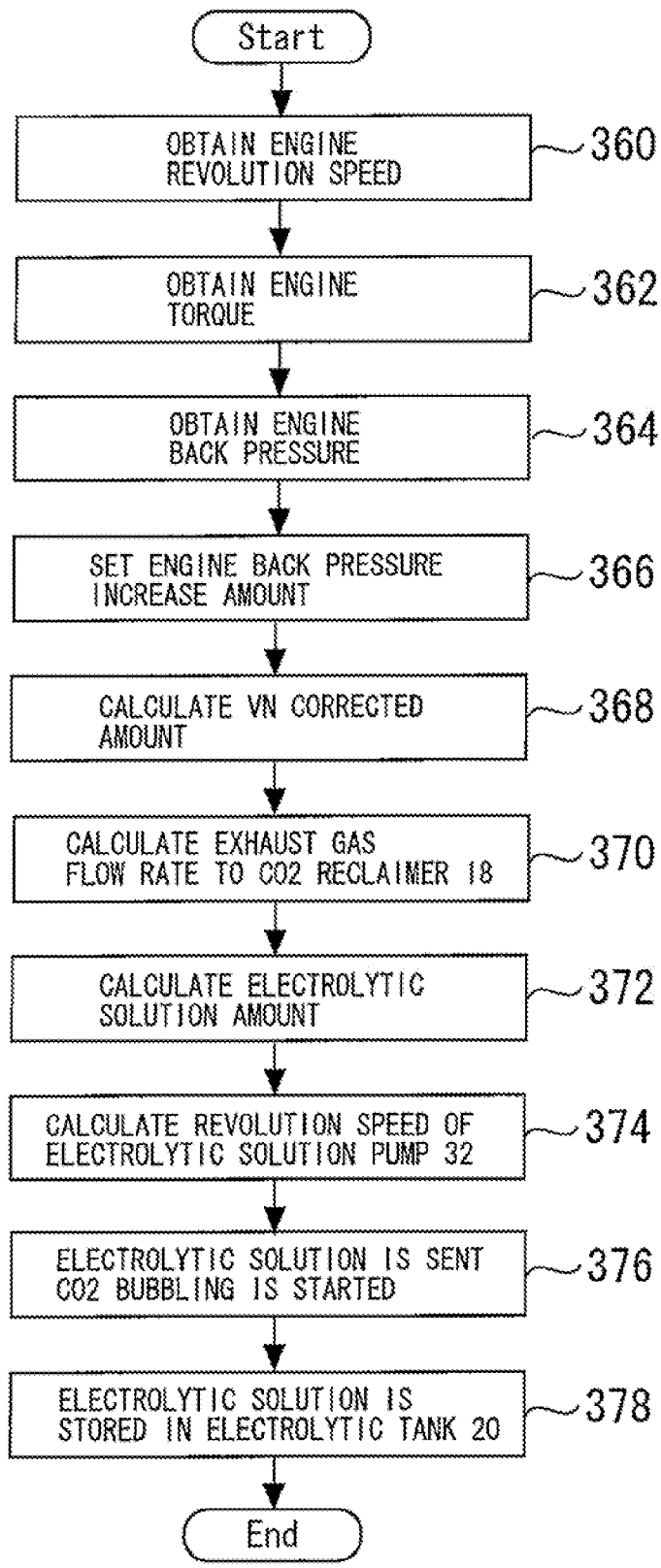
FIG. 20 is a flowchart illustrating the CO₂ recovery control executed by the ECU 200 in the second embodiment.

FIG. 20 is a flowchart illustrating the $CO_2$ recovery control executed by the ECU 200 in this embodiment. A routine illustrated in FIG. 20 is assumed to be repeatedly executed during operation of the engine 12.

Figure 21:
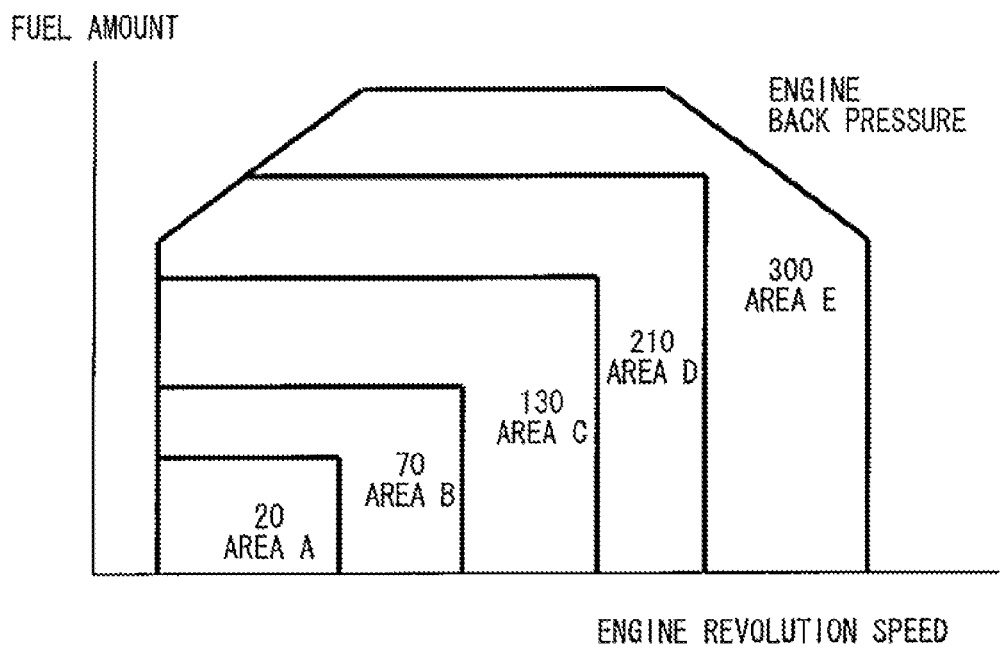
FIG. 21 is a characteristic diagram illustrating a relationship between the combination of the engine revolution speed and the engine torque and the engine back pressure.

In the routine illustrated in FIG. 20, the ECU 200 obtains a revolution speed of the engine 12 (Step 360) and obtains an engine torque (Step 362). The processing at Steps 360 and 362 is the same as that at Steps 300 and 302 in FIG. 4. Subsequently, the ECU 200 obtains an engine back pressure from the engine revolution speed and the engine torque obtained at Steps 360 and 362 (Step 364). FIG. 21 is a characteristic diagram illustrating a relationship between the combination of the engine revolution speed and the engine torque and the engine back pressure. At this Step 364, the engine back pressure is obtained by referring to map data made from the characteristic diagram illustrated in FIG. 21.

Subsequently, the ECU 200 sets engine back pressure increase amount (Step 366). The engine back pressure increase amount is set in accordance with a temperature of the exhaust purification catalyst 76, for example, and this temperature is estimated by the operation state (load and revolution speed) of the engine 12. The temperature of the exhaust purification catalyst 76 can be estimated by using a known estimating method.

Figure 22:
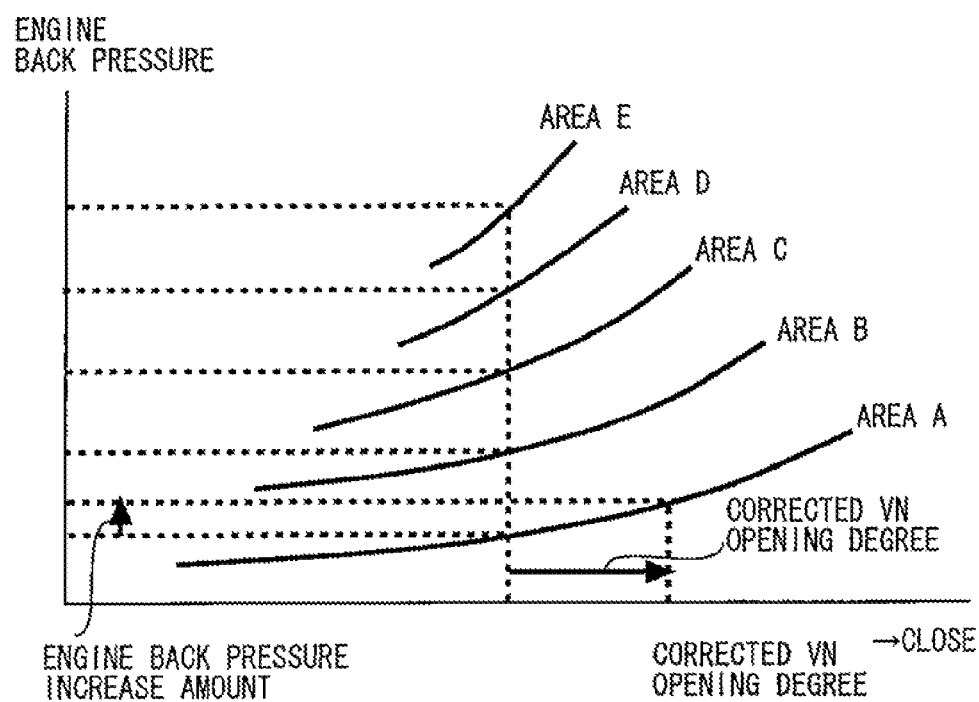
FIG. 22 is a characteristic diagram illustrating a relationship between the corrected opening degree (corrected VN opening degree) of the variable nozzle and the engine back pressure.

Subsequently, the ECU 200 calculates a corrected opening degree of the variable nozzle from the engine back pressure obtained at Step 364 and the engine back pressure increase amount set at Step 366 (Step 368), FIG. 22 is a characteristic diagram illustrating a relationship between the corrected opening degree (corrected VN opening degree) of the variable nozzle and the engine back pressure. Characteristic lines A to E in FIG. 22 correspond to areas A to E in FIG. 21, respectively. That is, if the engine back pressure obtained at Step 364 belongs to the area A in FIG. 21, the corrected VN opening degree is calculated from the characteristic line A in FIG. 22.

The case where the characteristic line A is used will be described as an example. During normal operation of the engine 12, the corrected VN opening degree is set to zero. By setting the engine back pressure increase amount at Step 366, the engine back pressure is added by the increase portion and thus, the corrected VN opening degree is shifted to the right side. As a result, the variable nozzle is changed to a direction of closing. At this Step 368, the corrected opening degree of the variable nozzle is calculated by referring to map data made from the characteristic diagram illustrated in FIG. 22.

Subsequently, an exhaust gas flow rate to the $CO_2$ reclaimer 18 is calculated from the engine back pressure obtained by adding the engine back pressure increase amount set at Step 366 to the engine back pressure used by the ECU 200 at Step 368, that is, the engine back pressure obtained at Step 364 (Step 370). The processing at this Step 370 is the same as the processing at Step 306 in FIG. 4. That is, at this Step 370, the exhaust gas flow rate to the $CO_2$ reclaimer 18 is calculated by referring to map data made from the characteristic diagram illustrated in FIG. 6.

Subsequently, the ECU 200 calculates an electrolytic solution amount to be sent to the electrolytic solution tank 20 from the exhaust gas flow rate calculated at Step 370 (Step 372) and calculates a motor revolution speed of the electrolytic solution pump 32 from the electrolytic solution sent amount calculated at Step 372 (Step 374). Subsequently, the ECU 200 opens the $CO_2$ inlet valve 28 and the $CO_2$ outlet valve 30 and drives the electrolytic solution pump 32 at the motor revolution speed calculated at Step 374 (Step 376). The processing at Steps 372 to 376 is the same as the processing at Steps 308 to 312 in FIG. 4. By executing the processing at Steps 372 to 376, the exhaust gas flowing through the exhaust passage 26 is absorbed by the electrolytic solution in the $CO_2$ reclaimer 18, and the electrolytic solution having absorbed $CO_2$ in the exhaust gas is sent to the electrolytic solution tank 20 from the $CO_2$ reclaimer 18 (Step 378).

As described above, according to the routine illustrated in FIG. 20, since the $CO_2$ recovery control can be executed while the engine back pressure is controlled, CO can be generated stably even in an area where the requested air amount is small. Therefore, particularly at the start of the engine, the mixed gas can be supplied stably.

In this embodiment, the engine back pressure is controlled by changing the opening degree of the variable nozzle but the engine back pressure may be controlled by changing the opening degree of the waste gate valve 74 instead of the opening degree of the variable nozzle. By closing the waste gate valve 74, the engine back pressure can be raised, while by opening the waste gate valve 74, the engine back pressure can be lowered. Thus, by changing the opening degree so as to close the waste gate valve 74 in accordance with the engine back pressure increase amount set at Step 366, the engine back pressure can be raised similarly to the case where the variable nozzle is closed. Moreover, by providing an opening/closing type hack pressure control valve on the exhaust passage 26 between a connection port on the exhaust inflow side of the bypass passage in which the $CO_2$ reclaimer 18 is provided and a connection port on the exhaust outflow side of the bypass passage 72, the engine back pressure may be controlled by changing the opening degree of this back pressure control valve instead of the opening degree of the variable nozzle.

In this embodiment, the execution of the processing at Steps 366 and 368 in FIG. 20 by the ECU 200 realizes the "exhaust pressure adjusting means" in the above-described fifth invention.

Embodiment 3

Features of Embodiment 3

Figure 23:
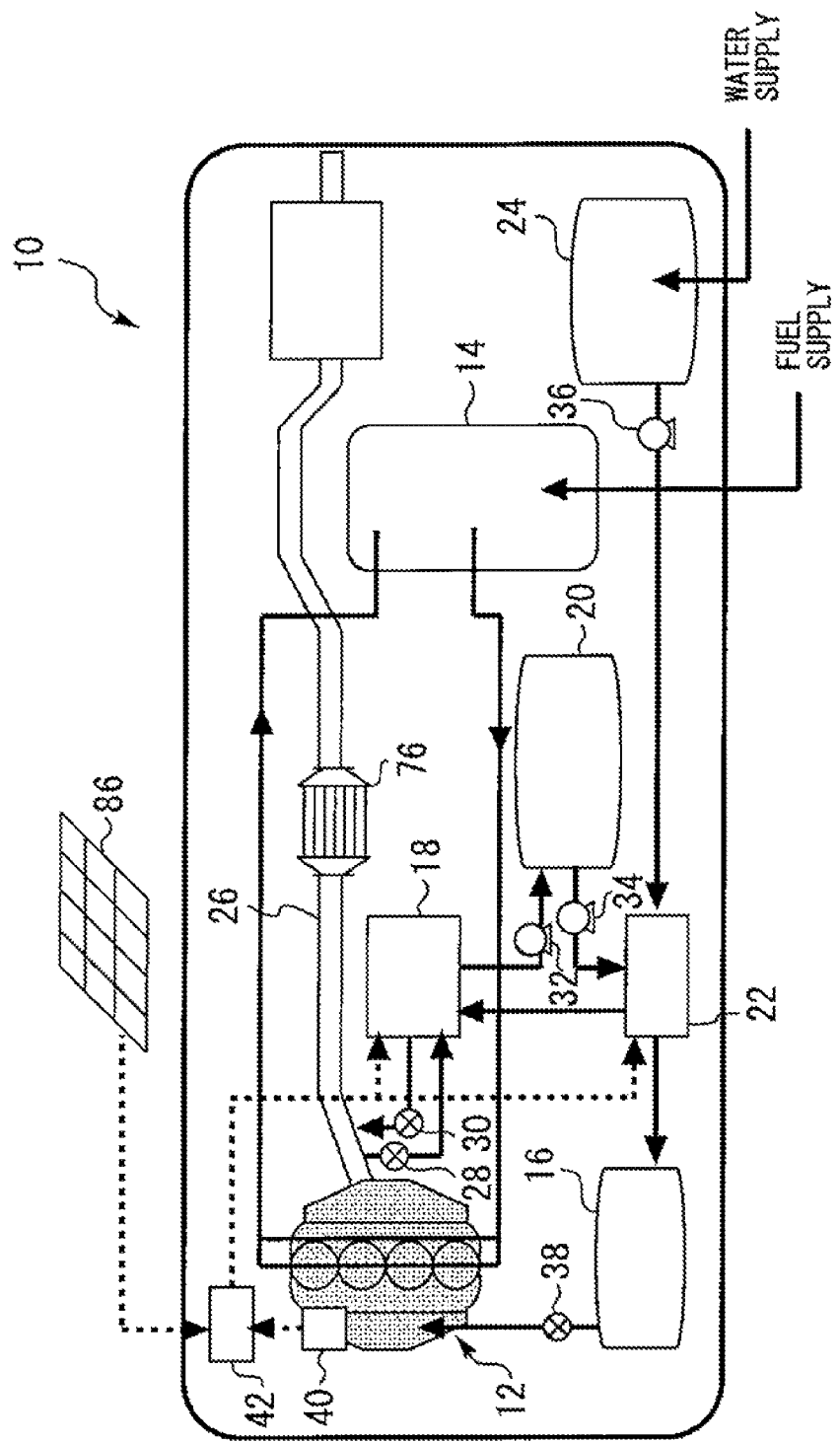
FIG. 23 is an entire configuration diagram illustrating a configuration of a vehicle of a third embodiment.

Subsequently, an embodiment 3 of the present invention will be described by referring to FIGS. 23 and 24. As illustrated in FIG. 23, a solar cell 86 generating power according to an irradiation amount of sunlight is mounted on the vehicle 10, and an execution of the mixed gas generation control by power generated by the solar cell 86 is the feature in this embodiment. Thus, in the following, differences from the above-described embodiment 1 will be mainly described, and explanations of the similar matters will be simplified or omitted.

In the above-described embodiment 1, the mixed gas generation control is executed by supplying power from the alternator 40 to the electrolytic solution pumps 32 and 34 and the potentiostat 64 during operation of the engine 12. However, if the power from the alternator 40 falls under power required for electrolysis, the power cannot meet the requested added amount of the mixed gas, and it is likely that usable time of the mixed gas is limited short. Thus, in this embodiment, the mixed as generation control is executed by using generated power from the solar cell 86. As a result, since a shortage of the requested added amount of the mixed gas can be prevented, the above-described various combustion improvement effects can be reliably obtained. Particularly, the solar cell 86 is capable of power generation even while the vehicle 10 is stopped. Thus, the mixed gas can be generated and stored while the vehicle 10 is stopped.

Operation of Embodiment 3

Mixed Gas Generation Control

Subsequently, the mixed gas generation control in this embodiment will be described by referring to FIG. 24. FIG. 24 is a flowchart illustrating the mixed gas generation control executed by the ECU 200 in this embodiment. A routine illustrated in FIG. 24 is assumed to be executed in parallel at the same time as the routine illustrated in FIG. 9.

Figure 24:
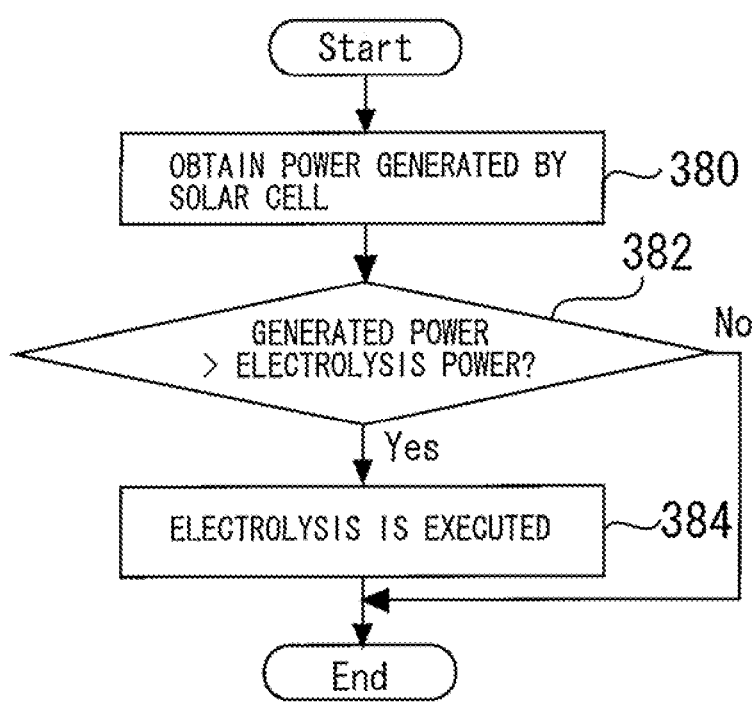
FIG. 24 is a flowchart illustrating the mixed gas generation control execs by the ECU 200 in the third embodiment.

In the routine illustrated in FIG. 24, first, the ECU 200 obtains power generated by the solar cell 86 (Step 380). A power conversion portion (not shown) constituted by an inverter and the like is provided between the solar cell 86 and the battery 42, and the ECU 200 obtains the generated power in the solar cell 86 from this power conversion portion.

Subsequently, the ECU 200 compares the generated power obtained at Step 380 with electrolysis power (Step 382). The electrolysis power is the total sum of power required for execution of the mixed gas generation control such as power for driving the electrolytic solution pumps 32 and 34 and the water pump 36, power to be supplied to the potentiostat 64 and the like and can be calculated by executing the processing at Steps 316 to 328 in FIG. 9, for example. At this Step 382, if the generated power from the solar cell 86 exceeds the electrolysis power, the ECU 200 uses the generated power from the solar cell 86 (Step 384). On the other and, if the generated power from the solar cell 86 falls short of the electrolysis power, this routine is finished.

As described above, according to the routine illustrated in FIG. 24, the mixed gas generation control can be executed by using the generated power from the solar cell 86. Therefore, the shortage of the requested added amount of the mixed gas can be prevented, and the above-described various combustion improvement effects can be reliably obtained.

In this embodiment, the generated power from the solar cell 86 is used, but other types of generated power that can be provided on board may be used. For example, by providing a thermo-electric device capable of taking out thermal energy as electric energy in the exhaust passage 26, the mixed gas generation control may be executed by using the generated power from residual heat of the exhaust passage 26. Moreover, the mixed gas generation control may be executed by using generated power from an on-board wind turbine generator, for example. Furthermore, the mixed gas generation control may be executed by combining these types of generated power.

Embodiment 4

Features of Embodiment 4

Figure 25:
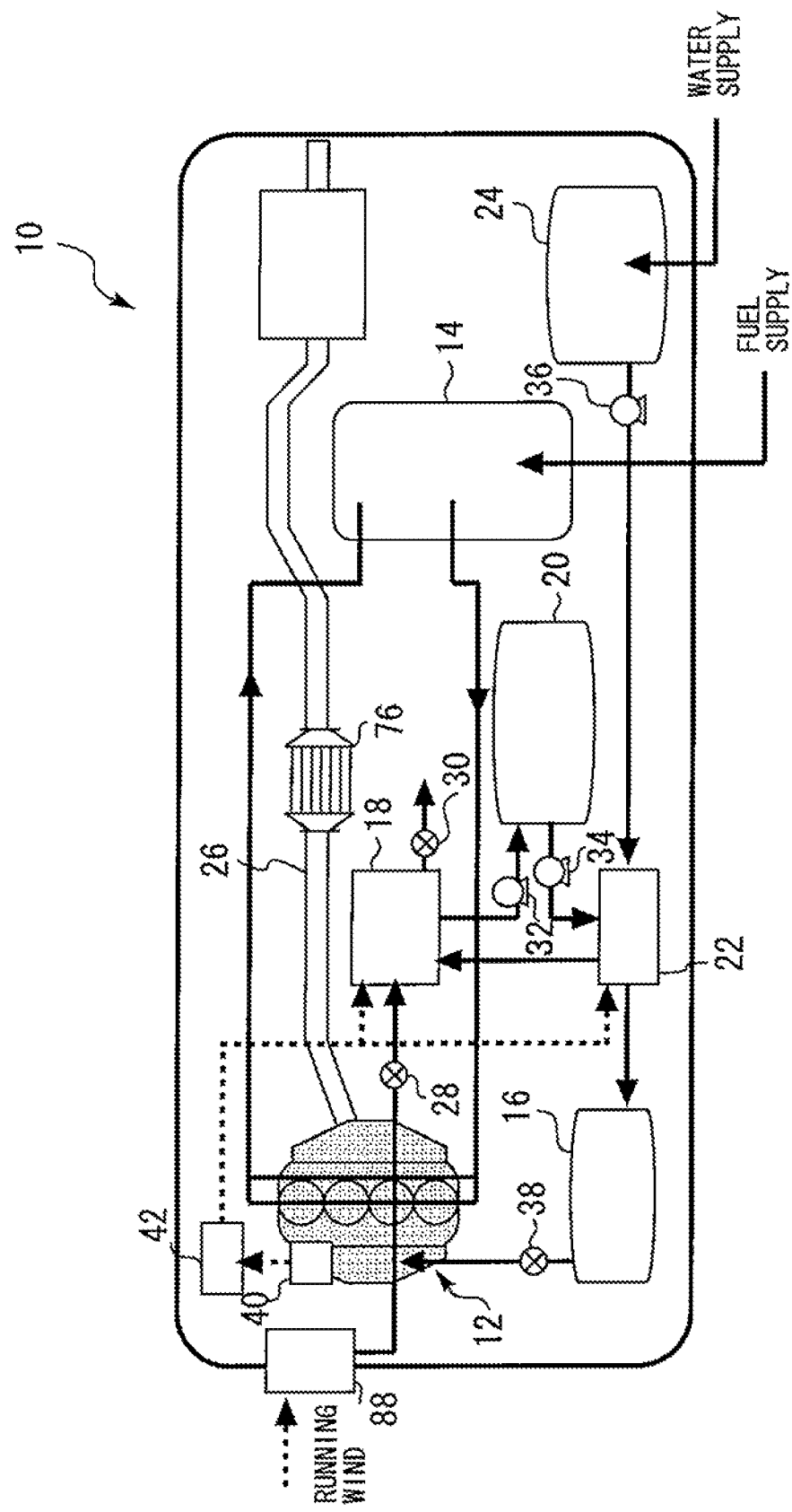
FIG. 25 is an entire configuration diagram illustrating a configuration of a vehicle of a fourth embodiment.
Figure 26:
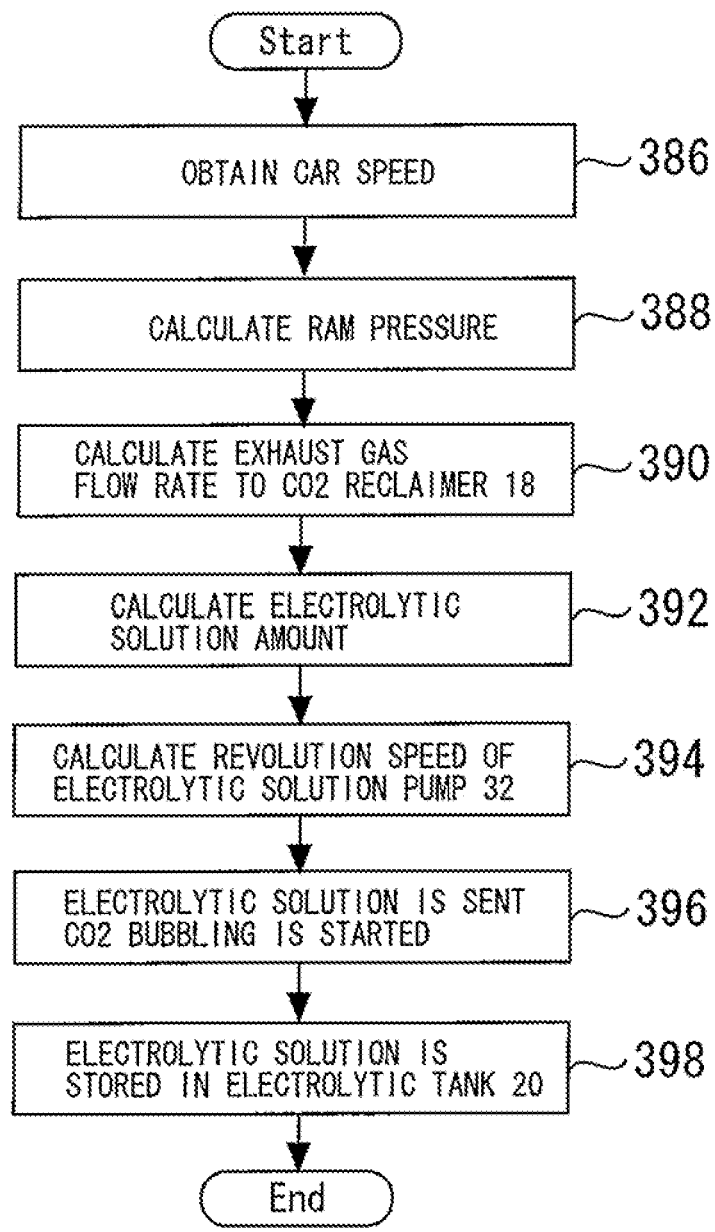
FIG. 26 is a flowchart illustrating the CO₂ recovery control executed by the ECU 200 in the fourth embodiment.

Subsequently, an embodiment 4 of the present invention will be described by referring to FIGS. 25 to 28. As illustrated in FIG. 25, in a configuration in which an atmospheric air inlet 88 for sucking atmospheric air is provided on the front of the vehicle 10 or on a bonnet or a roof of the vehicle 10, and this atmospheric air inlet 88 is connected to the $CO_2$ reclaimer 18, an execution of the $CO_2$ recovery control illustrated in FIG. 26 is the feature in this embodiment. Thus, in the following, differences from the above-described embodiment 1 will be mainly described, and explanation of the similar matters will be simplified or omitted.

In the above-described embodiment 1, the exhaust gas is subjected to bubbling introduction into the electrolytic solution in the $CO_2$ reclaimer 18 by using the engine back pressure during operation of the engine 12. However, the exhaust gas might contain particulate matters (PM), soluble organic fractions (SOF), sulfates and the like derived from unburned fuel or engine oil. Thus, if they are in an unprocessed state, the life of the electrolytic solution becomes short, and as a result, such a problem is caused that replacement frequency of the electrolytic solution increases. Moreover, the exhaust gas on the upstream side of the exhaust purification catalyst 76 might contain Sox or NOx. The electrolytic solution in the $CO_2$ reclaimer 18 (particularly, an ionic liquid) also has a characteristic of absorbing SOx and NOx. Thus, if the exhaust gas on the upstream side of the exhaust purification catalyst 76 is introduced into the electrolytic solution, it is likely that the absorbing efficiency or recovery efficiency of $CO_2$ might be lowered by the portion absorbing SOx and NOx.

Thus, in this embodiment, atmospheric air is used instead of the exhaust gas. Since the atmospheric air is cleaner than the exhaust gas, it can suppress pollution of the electrolytic solution and can minimize the replacement frequency of the electrolytic solution. Moreover, a contribution can be made to reduction of $CO_2$ in the atmospheric air. Moreover, in this embodiment, the atmospheric air is introduced into the electrolytic solution in the $CO_2$ reclaimer 18 by using a ram pressure caused by running wind of the vehicle 10. Therefore, since power for introducing the $CO_2$ source to the reclaimer can be omitted, energy efficiency and fuel efficiency can be improved.

Operation of Embodiment 4

$CO_2$ Recovery Control

Subsequently, the $CO_2$ recovery control in this embodiment will be described by referring to FIG. 26. FIG. 26 is a flowchart illustrating the $CO_2$ recovery control executed by the ECU 200 in this embodiment. A routine illustrated in FIG. 26 is assumed to be repeatedly executed during operation of the engine 12 instead of the routine illustrated in FIG. 4.

Figure 27:
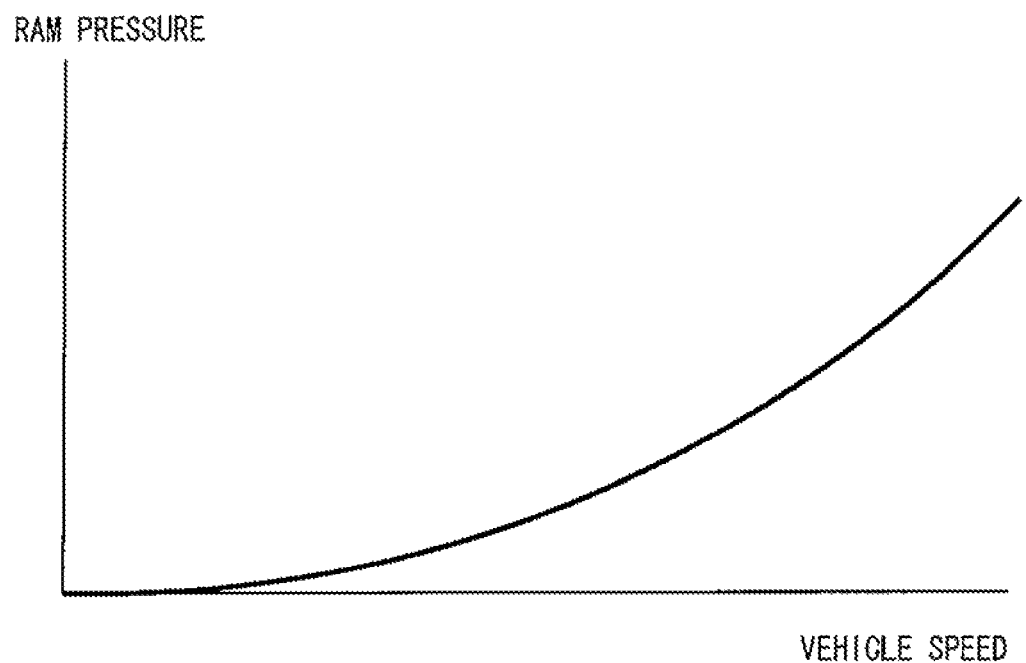
FIG. 27 is a characteristic diagram illustrating a relationship between the vehicle speed and the ram pressure.

In the routine illustrated in FIG. 26, the ECU 200 obtains a vehicle speed by the vehicle speed sensor 176 (Step 386) and calculates a ram pressure on the basis of the obtained vehicle speed (Step 388). FIG. 27 is a characteristic diagram illustrating a relationship between the vehicle speed and the ram pressure. At this Step 388, the ram pressure is calculated by referring to map data made from the characteristic diagram illustrated in FIG. 27.

Figure 28:
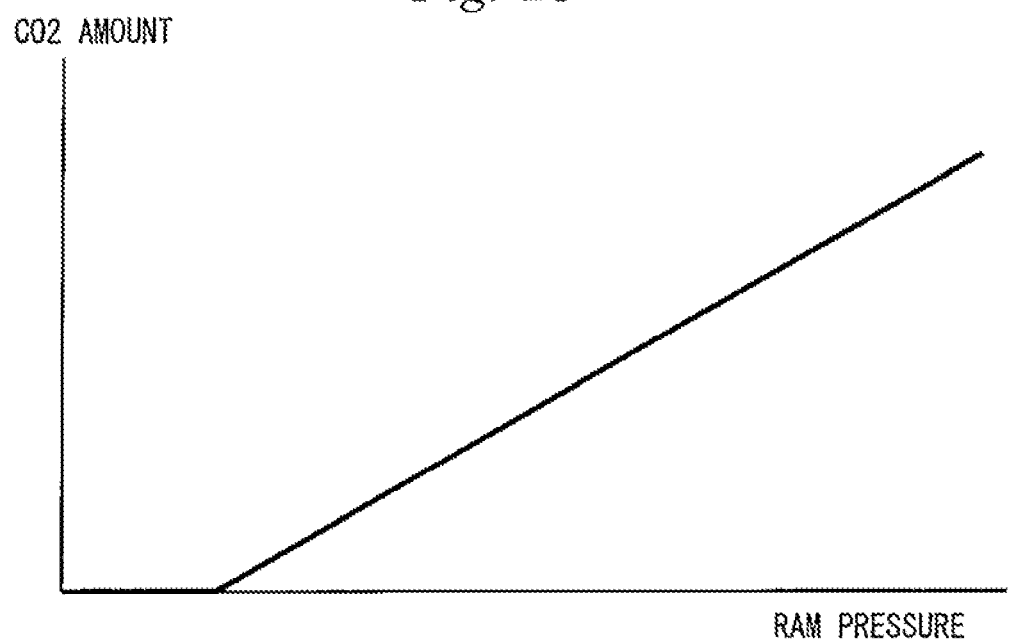
FIG. 28 is a characteristic diagram illustrating a relationship between the ram pressure and the CO₂ amount per unit time flowing into the CO₂ reclaimer 18.

Subsequently, the ECU 200 calculates a $CO_2$ amount per unit time flowing into the $CO_2$ reclaimer 18 from the ram pressure calculated at Step 388 (Step 390). FIG. 28 is a characteristic diagram illustrating a relationship between the ram pressure and the $CO_2$ amount per unit time flowing into the $CO_2$ reclaimer 18. In FIG. 28, the gas flow rate becomes zero in an area where the ram pressure is low because a pressure loss is considered. At this Step 390, the $CO_2$ amount flowing into the $CO_2$ reclaimer 18 is calculated by referring to map data made from the characteristic diagram illustrated in FIG. 28.

Subsequently, the ECU 200 calculates an electrolytic solution amount to be sent to the electrolytic solution tank 20 from the $CO_2$ amount calculated at Step 390 (Step 392). Subsequently, the ECU 200 executes the same processing as that at Steps 310 and 312 in FIG. 4 (Steps 394 and 396). As a result, the atmospheric air sucked through the atmospheric air inlet 88 is introduced into the electrolytic solution in the $CO_2$ reels 18, and the electrolytic solution having absorbed $CO_2$ in the atmospheric air is sent from the $CO_2$ reclaimer 18 to the electrolytic solution tank 20 (Step 398).

As described above, according to the routine illustrated in FIG. 26, since the $CO_2$ recovery control using the ram pressure can be executed, $CO_2$ can be recovered from the atmospheric air while the vehicle 10 is running. Therefore, as compared with the recovery of $CO_2$ from the exhaust gas before purification, pollution of the electrolytic solution can be suppressed, and the replacement frequency of the electrolytic solution can be minimized. Moreover, since power for introducing the $CO_2$ source to the reclaimer can be omitted, energy efficiency and fuel efficiency can be improved.

In this embodiment, the $CO_2$ inlet valve 28 and the atmospheric air inlet 88 correspond to the "atmospheric air introducing means" in the above-described sixth invention.

Moreover, in this embodiment, the electrolytic solution tank 20 corresponds to the "absorbing liquid storing means" in the above-described seventh invention. Moreover, the "liquid sent amount control means" in the above-described seventh invention is realized by execution of the processing at Steps 390 and 392 in FIG. 26 by the ECU 200.

Embodiment 5

Figure 29:
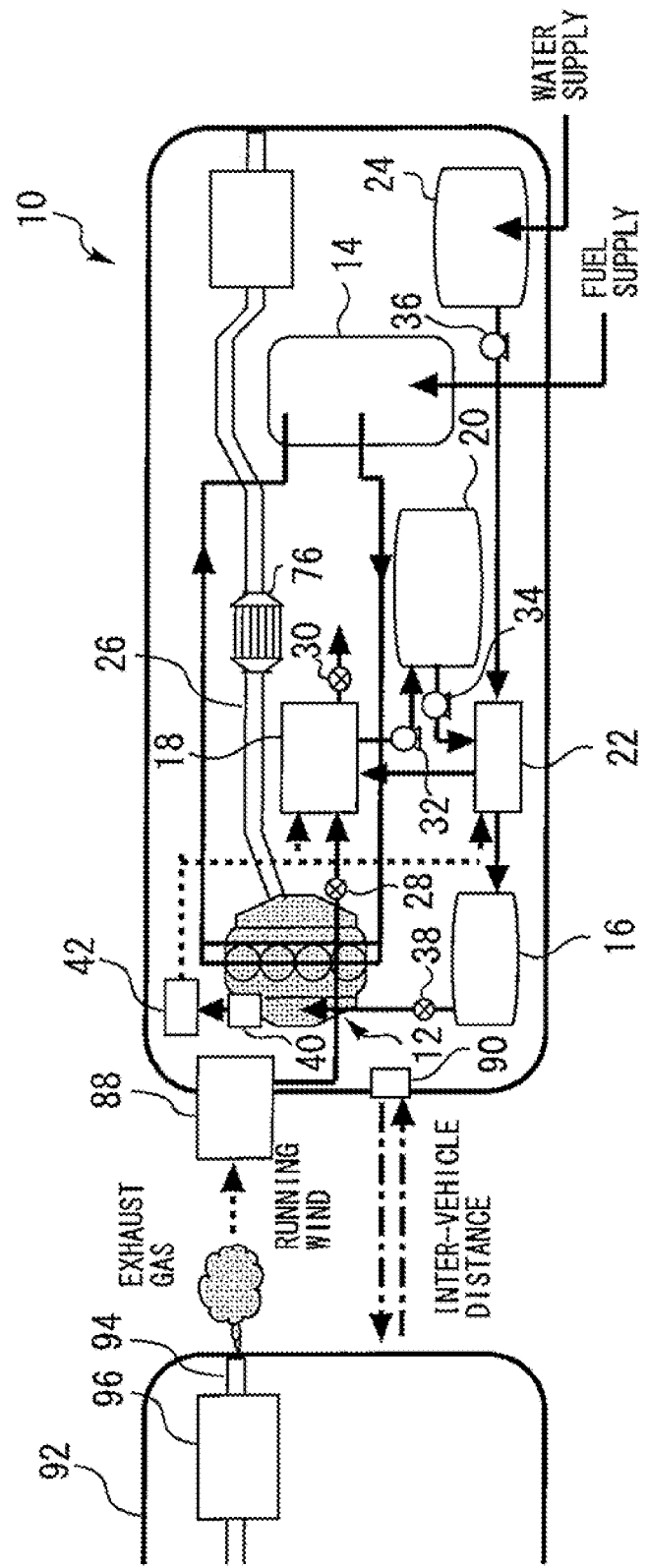
FIG. 29 is an entire configuration diagram illustrating a configuration of a vehicle of a fifth embodiment.

Subsequently, an embodiment 5 of the present invention will be described by referring to FIGS. 29 to 31. In this embodiment, differences from the above-described embodiment 4 will be mainly described, and explanations of the similar matters will be simplified or omitted.

Features of Embodiment 5

In the above-described embodiment 4, in the configuration in which the atmospheric air inlet 88 is provided in the vehicle 10, $CO_2$ in the atmospheric air is recovered by executing the $CO_2$ recovery control illustrated in FIG. 26. On the other hand, in this embodiment, as illustrated in FIG. 29, in a configuration in which a radar 90 for measuring a distance from a preceding vehicle 92 is further provided in addition to the atmospheric air inlet 88, the $CO_2$ recovery control illustrated in FIG. 30 is executed as the feature.

As described in the above-described embodiment 4, since the exhaust gas on the upstream side of the exhaust purification catalyst 76 contains PM, SOF, sulfate and the like, if they are introduced into the $CO_2$ reclaimer 18 in an unprocessed state, there is a problem that the life of the electrolytic solution becomes short. In this regard, as illustrated in FIG. 29, the exhaust gas from a tail pipe 94 is purified by going through a processing device 96 including a PM filter, an exhaust purification catalyst and the like. Thus, even if the exhaust gas from the tail pipe 94 is used, the effects similar to the above-described embodiment 4 can be obtained.

Moreover, since the exhaust gas from the tail pipe 94 contains high-concentration $CO_2$, if this exhaust gas can be introduced into the $CO_2$ reclaimer 18, recovery efficiency of $CO_2$ can be improved. However, $CO_2$ diffuses into atmospheric air immediately after emission from the tail pipe 94, and the farther the distance from the preceding vehicle 92 is, the lower the $CO_2$ concentration in the atmospheric air becomes. Thus, in this embodiment, an inter-vehicle distance is measured by using the radar 90, and the $CO_2$ recovery control is executed on the basis of the measured inter-vehicle distance. The radar 90 is assumed to be connected to the input side of the ECU 200. Moreover, in a general vehicle, since the tail pipe is provided on the rear right of the vehicle, the atmospheric air inlet 88 is preferably provided on front right of the vehicle 10 in this embodiment.

Operation of Embodiment 5

$CO_2$ Recovery Control

The $CO_2$ recovery control of this embodiment will be described by referring to FIG. 30. FIG. 30 is a flowchart illustrating the $CO_2$ recovery control executed by the ECU 200 in this embodiment. A routine illustrated in FIG. 30 is assumed to be repeatedly executed during operation of the engine 12 instead of the routine illustrated in FIG. 26.

Figure 30:
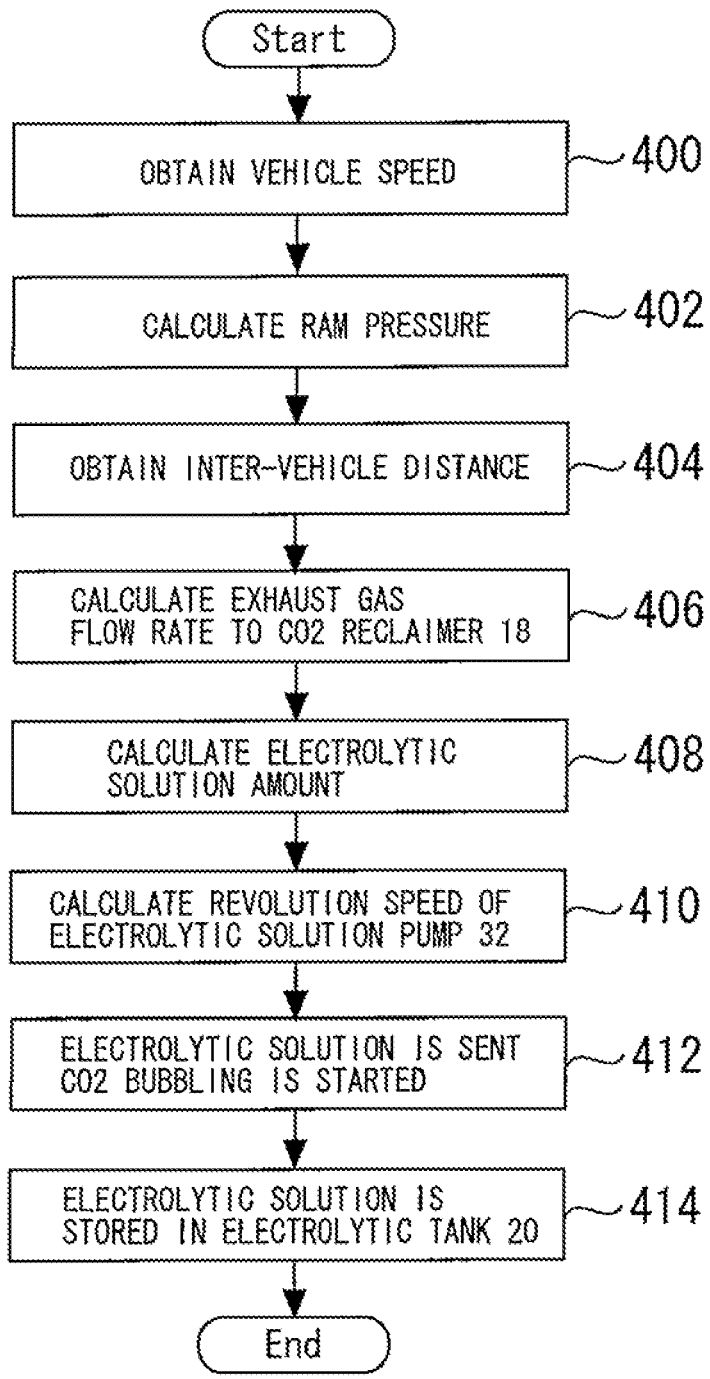
FIG. 30 is a flowchart illustrating the CO₂ recovery control executed by the ECU 200 in the fifth embodiment.
Figure 31:
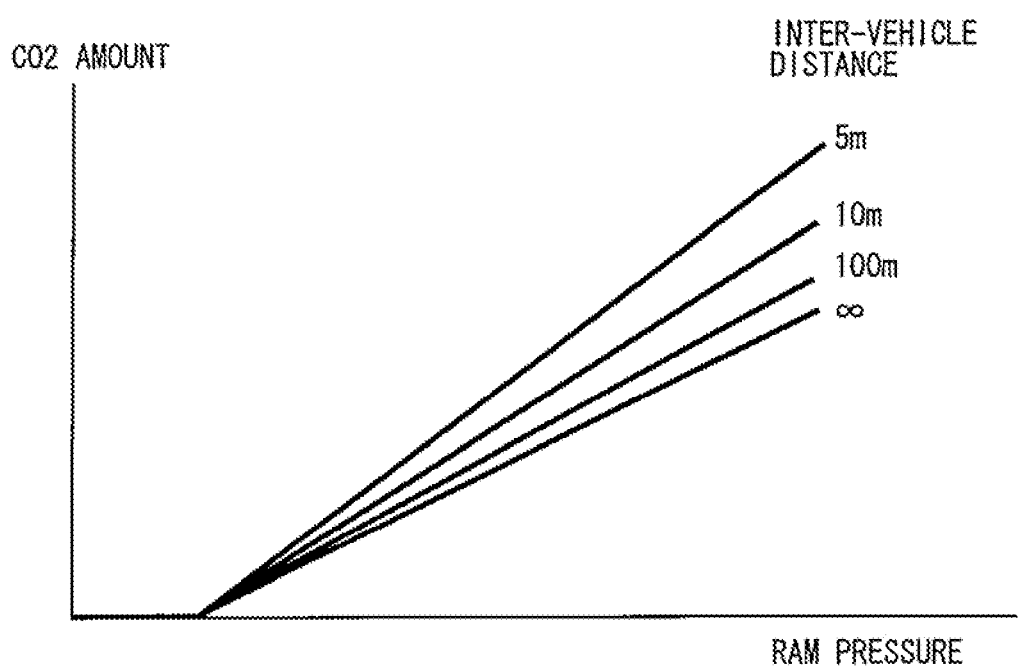
FIG. 31 is a characteristic diagram illustrating a relationship between the ram pressure and the CO₂ amount per unit time flowing into the CO₂ reclaimer 18 for each inter-vehicle distance.

In the routine illustrated in FIG. 30, the ECU 200 obtains a vehicle speed by the vehicle speed sensor 176 (Step 400) and calculates a ram pressure on the basis of the obtained vehicle speed (Step 402). The processing at Steps 400 and 402 is the same as that at Steps 386 and 388 in FIG. 26.

Subsequently, the ECU 200 obtains an inter-vehicle distance between the vehicle 10 and the preceding vehicle 92 by the radar 90 (Step 404). Subsequently, the ECU 200 calculates a $CO_2$ amount per unit time flowing into the $CO_2$ reclaimer 18 from the ram pressure calculated at Step 402 and the inter-vehicle distance obtained at Step 404 (Step 406). FIG. 31 is a characteristic diagram illustrating a relationship between the ram pressure and the $CO_2$ amount per unit time flowing into the $CO_2$ reclaimer 18 for each inter-vehicle distance. In FIG. 31, the above-described $CO_2$ amount becomes zero in a low ram pressure area because a pressure loss is considered. At this Step 406, the $CO_2$ amount per unit time flowing into the $CO_2$ reclaimer 18 is calculated by referring to map data made from the characteristic diagram illustrated in FIG. 31.

Subsequently, the ECU 200 calculates an electrolytic solution amount to be sent to the electrolytic solution tank 20 from the $CO_2$ amount calculated at Step 406 (Step 408). Subsequently, the ECU 200 executes the same processing as Steps 394 and 396 in FIG. 26 (Steps 410 and 412). As a result, the atmospheric air sucked through the atmospheric air inlet 88 is introduced into the electrolytic solution in the $CO_2$ reclaimer 18, and the electrolytic solution having absorbed $CO_2$ in the atmospheric air is sent to the electrolytic solution tank 20 from the $CO_2$ reclaimer 18 (Step 414).

As described above, according to the routine illustrated in FIG. 30, the $CO_2$ recovery control using the ram pressure can be executed while the inter-vehicle distance between the vehicle 10 and the preceding vehicle 92 is measured. Therefore, if there is the preceding vehicle 92, the effect that $CO_2$ can be efficiently recovered can be also obtained in addition to the effects similar to the above-described embodiment 4.

In this embodiment, the electrolytic solution tank 20 corresponds to the "absorbing liquid storing means" in the above-described eighth invention, and the radar 90 corresponds to the "inter-vehicle distance obtaining means" in the eighth invention, respectively. Moreover, in this embodiment, the "liquid sent amount control means" in the above-described eighth invention is realized by executing the processing at Steps 406 and 408 in FIG. 30 by the ECU 200.

Embodiment 6

Figure 32:
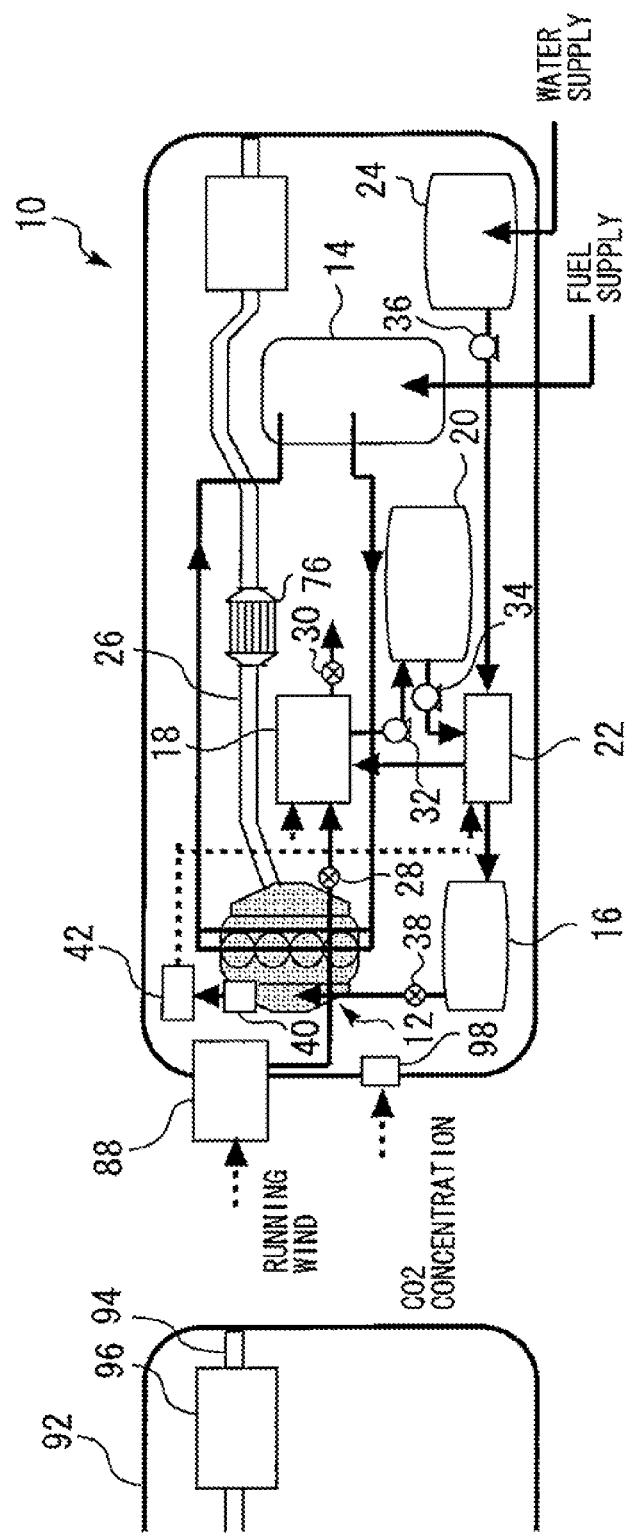
FIG. 32 is an entire configuration diagram illustrating a configuration of a vehicle of a sixth embodiment.

Subsequently, an embodiment 6 of the present invention will be described by referring to FIGS. 32 to 34. In this embodiment, differences from the above-described embodiment 5 will be mainly described, and explanations of the similar matters will be simplified or omitted.

Features of Embodiment 6

In the above-described embodiment 5, in the configuration in which the atmospheric air inlet 88 and the radar 90 are provided in the vehicle 10, $CO_2$ in the atmospheric air is recovered by executing the $CO_2$ recovery control illustrated in FIG. 30. On the other hand, in this embodiment, as illustrated in FIG. 32, in a configuration in which a $CO_2$ sensor 98 for measuring $CO_2$ concentration in the atmospheric air is provided instead of the radar 90, the $CO_2$ recovery control illustrated in FIG. 33 is executed as the feature. The $CO_2$ sensor 98 is assumed to be connected to the input side of the ECU 200 similarly to the radar 90.

In the case of the $CO_2$ recovery control in the above-described embodiment 5, it is effective when the vehicle 10 and the preceding vehicle 92 are tandem driving linearly in a no-wind state. However, if a lateral wind is blowing or these vehicles are running on a curve or the like, the $CO_2$ concentration often fluctuates due to factors other than the inter-vehicle distance. Thus, it is likely that a divergence occurs between a predicted value of the $CO_2$ amount per unit time flowing into the $CO_2$ reclaimer 18 and an actual value. If such a divergence occurs, the electrolytic solution in a state where $CO_2$ is not sufficiently absorbed is sent to the electrolytic solution tank 20 or the electrolyser 22. Thus, in this embodiment, the $CO_2$ concentration in the atmospheric air is directly measured by the $CO_2$ sensor 98, and the $CO_2$ recovery control is executed.

Operation of Embodiment 6

$CO_2$ Recovery Control

The $CO_2$ recovery control of this embodiment will be described by referring to FIG. 33. FIG. 33 is a flowchart illustrating the $CO_2$ recovery control executed by the ECU 200 in this embodiment. A routine illustrated in FIG. 33 is assumed to be repeatedly executed during operation of the engine 12 instead of the routine illustrated in FIG. 30.

Figure 33:
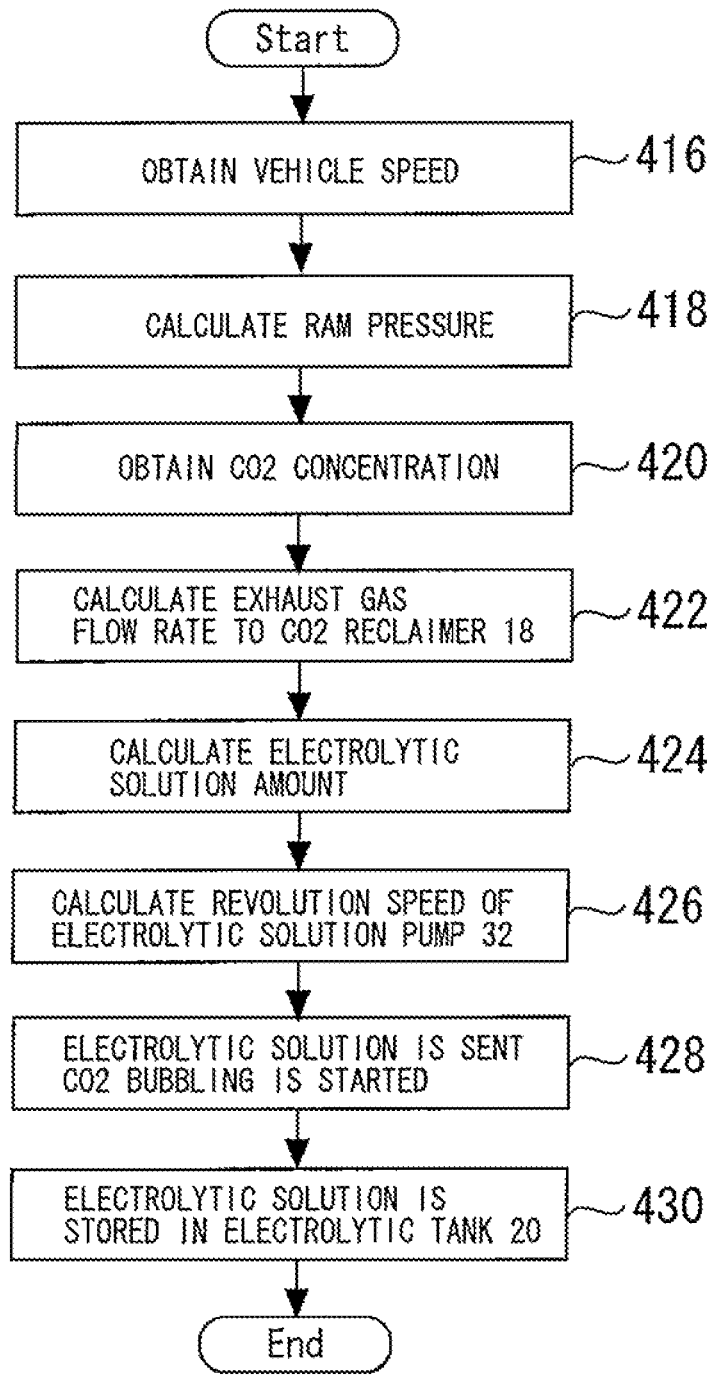
FIG. 33 is a flowchart illustrating the CO₂ recovery control executed by the ECU 200 in the sixth embodiment.
Figure 34:
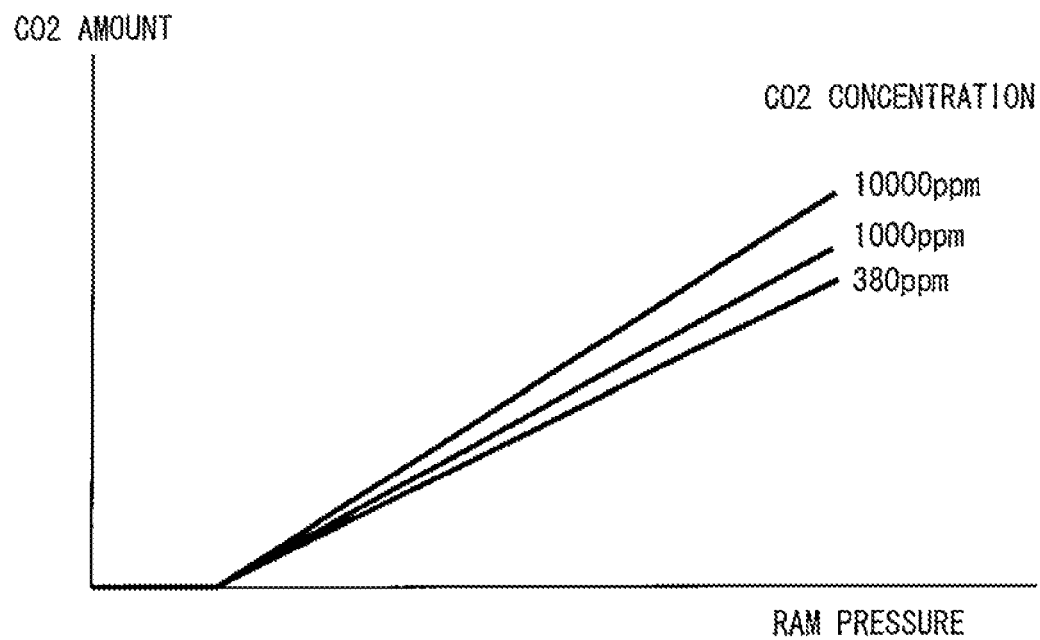
FIG. 34 is a characteristic diagram illustrating a relationship between the ram pressure and the CO₂ amount per unit time flowing into the CO₂ reclaimer 18 for each CO₂ concentration.

In the routine illustrated in FIG. 33, the ECU 200 obtains a vehicle speed by the vehicle speed sensor 176 (Step 416) and calculates a ram pressure on the basis of the obtained vehicle speed (Step 418). The processing at Steps 416 and 418 is the same processing as Steps 400 and 402 in FIG. 30.

Subsequently, the ECU 200 obtains a $CO_2$ concentration in the atmospheric air sucked through the atmospheric air inlet 88 by the $CO_2$ sensor 98 (Step 420). Subsequently, the ECU 200 calculates a $CO_2$ amount per unit time flowing into the $CO_2$ reclaimer 18 from the ram pressure calculated at Step 418 and the $CO_2$ concentration obtained at Step 420 (Step 422). FIG. 34 is a characteristic diagram illustrating a relationship between the ram pressure and the $CO_2$ amount per unit time flowing into the $CO_2$ reclaimer 18 for each $CO_2$ concentration. In FIG. 34, the $CO_2$ amount becomes zero in the low ram pressure area because a pressure loss is considered. At this Step 422, the $CO_2$ amount per unit time flowing into the $CO_2$ reclaimer 18 is calculated by referring to map data made from the characteristic diagram illustrated in FIG. 34.

Subsequently, the ECU 200 calculates an electrolytic solution amount to be sent to the electrolytic solution tank 20 from the $CO_2$ amount calculated at Step 422 (Step 424). Subsequently, the ECU 200 executes the same processing as Steps 410 and 412 in FIG. 30 (Steps 426 and 428). As a result, the atmospheric air sucked through the atmospheric air inlet 88 is introduced into the electrolytic solution in the $CO_2$ reclaimer 18, and the electrolytic solution having absorbed $CO_2$ in the atmospheric air is sent to the electrolytic solution tank 20 from the $CO_2$ reclaimer 18 (Step 430).

As described above, according to the routine illustrated in FIG. 33, the $CO_2$ recovery control using the ram pressure can be executed while the $CO_2$ concentration in the atmospheric air is directly measured by the $CO_2$ sensor 98. Therefore, since the $CO_2$ amount per unit time flowing into the $CO_2$ reclaimer 18 can be estimated with high accuracy, the effect that the $CO_2$ recovery amount can be made stable can be also obtained in addition to the effects similar to the above-described embodiment 5.

In this embodiment, the electrolytic solution tank 20 corresponds to the "absorbing liquid storing means" in the ninth invention, and the $CO_2$ sensor 98 corresponds to the "carbon dioxide concentration obtaining means" in the ninth invention, respectively. Moreover, in this embodiment, the "liquid sending amount control means" in the above-described ninth invention is realized by execution of the processing at Steps 422 and 424 in FIG. 33 by the ECU 200.

Embodiment 7

Subsequently, an embodiment 7 of the present invention will be described by referring to FIG. 35. In this embodiment, differences from the above-described embodiment 1 will be mainly described, and explanations of the similar matters will be simplified or omitted.

[Description of Configuration of Vehicle]

Figure 35:
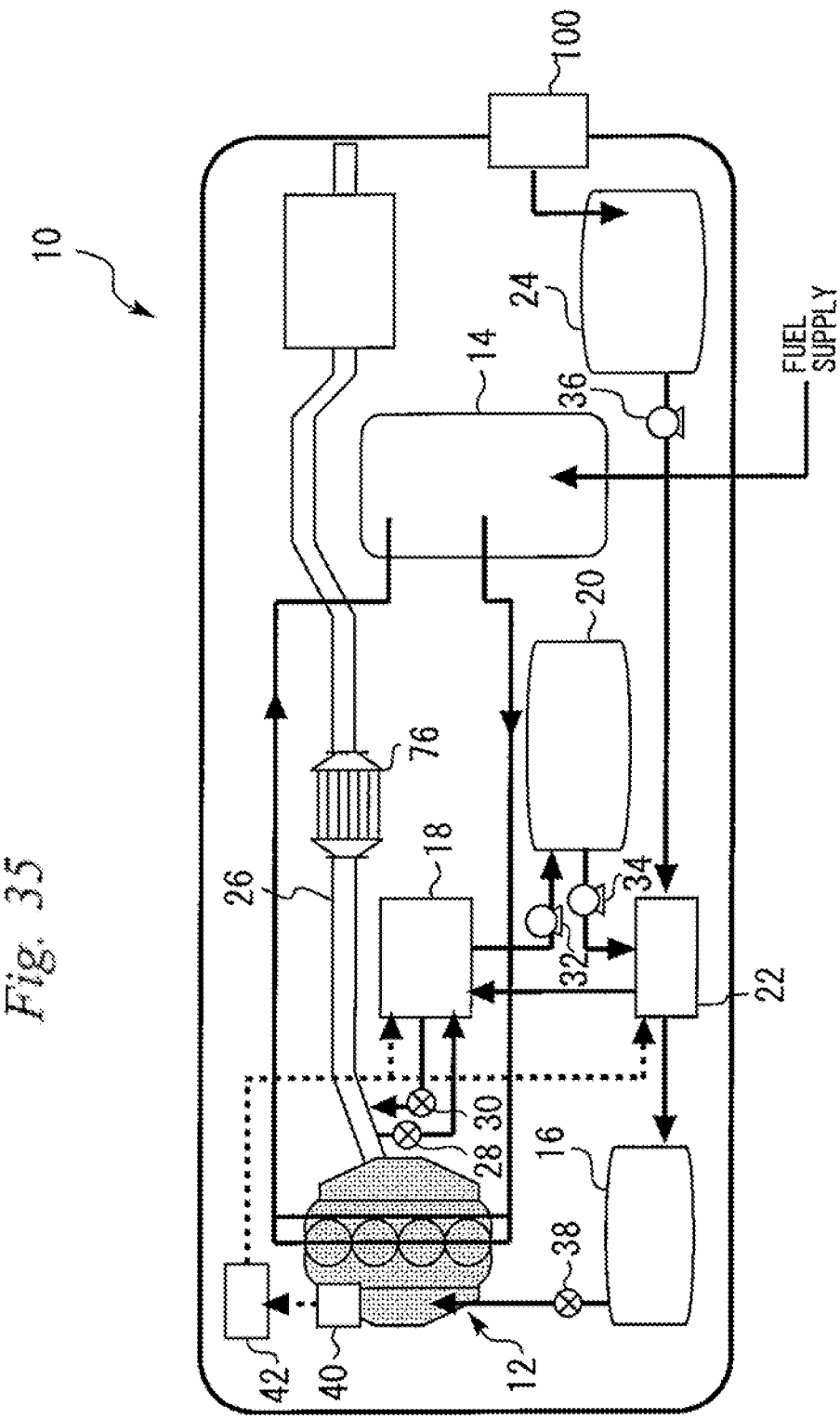
FIG. 35 is an entire configuration diagram illustrating a configuration of a vehicle in a seventh embodiment.

FIG. 35 is an entire configuration diagram illustrating a configuration of a vehicle in this embodiment. As illustrated in FIG. 35, the vehicle 10 is provided with a rain water collector 100 for collecting rain water. The rain water collector 100 is connected to the water tank 24 through a processing device (not shown) capable of removing chemical substances contained in rain water. Thus, rain water falling on the rain water collector 100 flows through the processing device and is automatically replenished into the water tank 24. Excessive rain water exceeding the storing capacity of the rain water collector 100 is discharged to the outside of the vehicle 10.

In the above-described embodiment 1, the water in the water tank 24 is supplied to the electrolyser 22, and $H_2$ and CO are generated by consuming this water (See the above-described formulas (1) to (3)). Thus, water needs to be replenished periodically to this water tank 24 from the outside, and there is a problem of labor. Moreover, if water to be replenished into the water tank 24 is river water, its nature cannot be necessarily guaranteed and it might deteriorate electrolysis performance in the electrolyser 22. In this regard, since rain water collected by the rain water collector 100 can be automatically supplied to the water tank 24 in this embodiment, periodic replenishment can be omitted. Moreover, since the nature of rain water is relatively cleaner than river water, the deterioration of the electrolysis performance in the electrolyser 22 can be suppressed.

In this embodiment, the rain water collector 100, the water tank 24, and the water pump 36 correspond to the "rain water supply means" in the above-described tenth invention.

Embodiment 8

Subsequently, an embodiment 8 of the present invention will be described by referring to FIG. 36. In this embodiment, differences from the above-described embodiment 7 will be mainly described, and explanations of the similar matters will be simplified or omitted.

[Description of Configuration of Vehicle]

Figure 36:
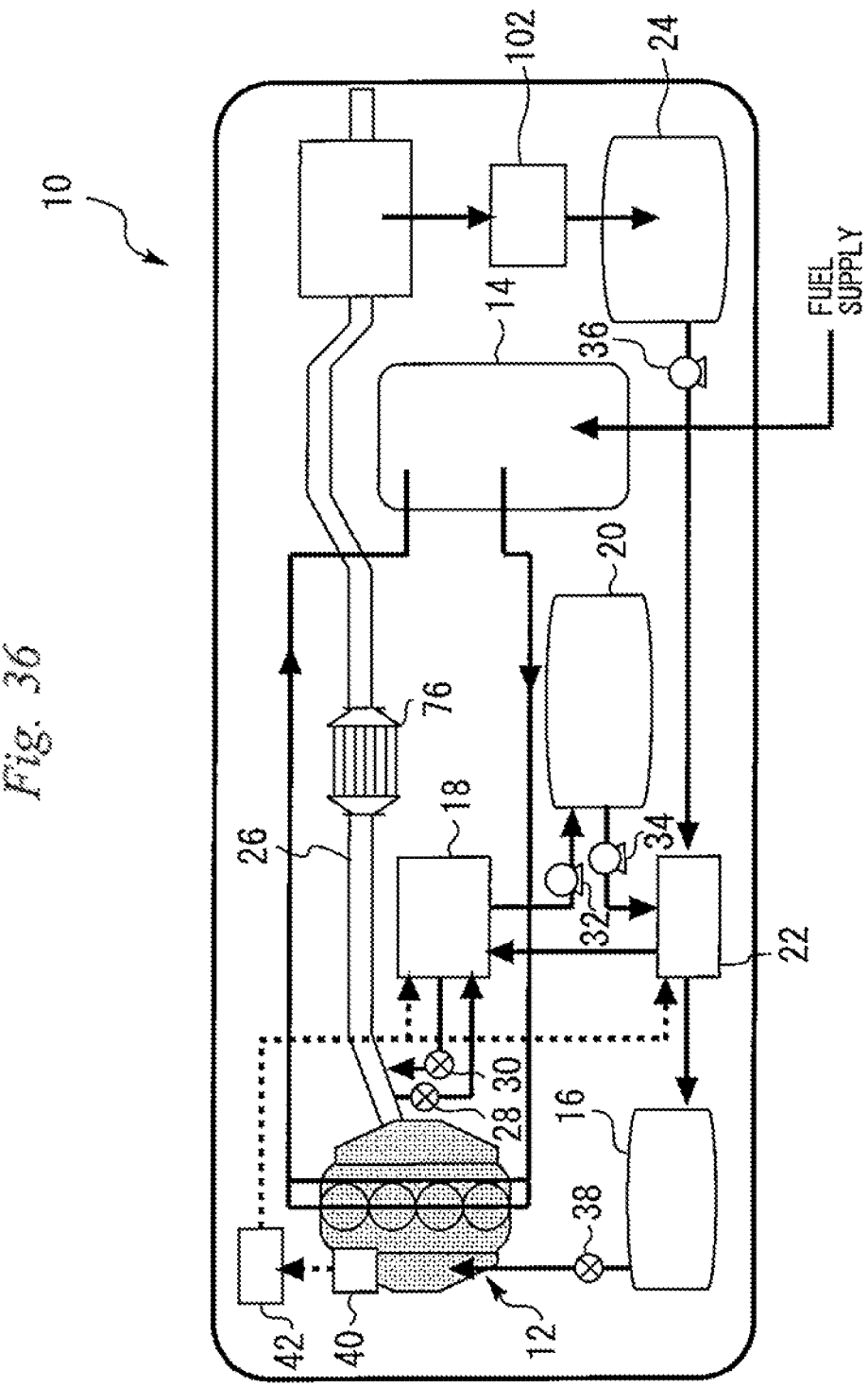
FIG. 36 is an entire configuration diagram illustrating a configuration of a vehicle in an eighth embodiment.

FIG. 36 is an entire configuration diagram illustrating a configuration of a vehicle in this embodiment. As illustrated in FIG. 36, the vehicle 10 is provided with an $H_2O$ condenser 102 capable of condensing steam in the exhaust gas. To the downstream of the $H_2O$ condenser 102, the water tank 24 is connected. In the exhaust passage 26 on the downstream side of the exhaust purification catalyst 76, the exhaust gas branches from the exhaust passage 26 and passes through the $H_2O$ condenser 102 and at that time, steam contained in the exhaust gas is condensed so as to become condensed water. As the $H_2O$ condenser 102, a heat exchanger, for example, can be used. Condensed water is automatically replenished to the water tank 24.

As described in the above-described embodiment 7, there is a problem that the water tank 24 needs to be replenished with water from the outside periodically, which takes a labor. Moreover, if water to be replenished to the water tank 24 is river water, its nature cannot be necessarily guaranteed, and it might deteriorate electrolysis performance in the electrolyser 22. In this regard, in this embodiment, since steam in the exhaust gas condensed by the $H_2O$ condenser 102 can be automatically supplied to the water tank 24, periodic replenishment can be omitted. Moreover, since condensed water is close to pure water and its nature is stable, the deterioration of electrolysis performance of the electrolyser 22 can be suppressed.

In this embodiment, the $H_2O$ condenser 102 and the water pump 36 correspond to the "exhaust-derived condensed water supply means" in the above-described eleventh invention.

Embodiment 9

Subsequently, an embodiment 9 of the present invention will be described by referring to FIG. 37. In this embodiment, differences from the above-described embodiment 8 will be mainly described, and explanations of the similar matters will be simplified or omitted.

[Description of Configuration of Vehicle]

Figure 37:
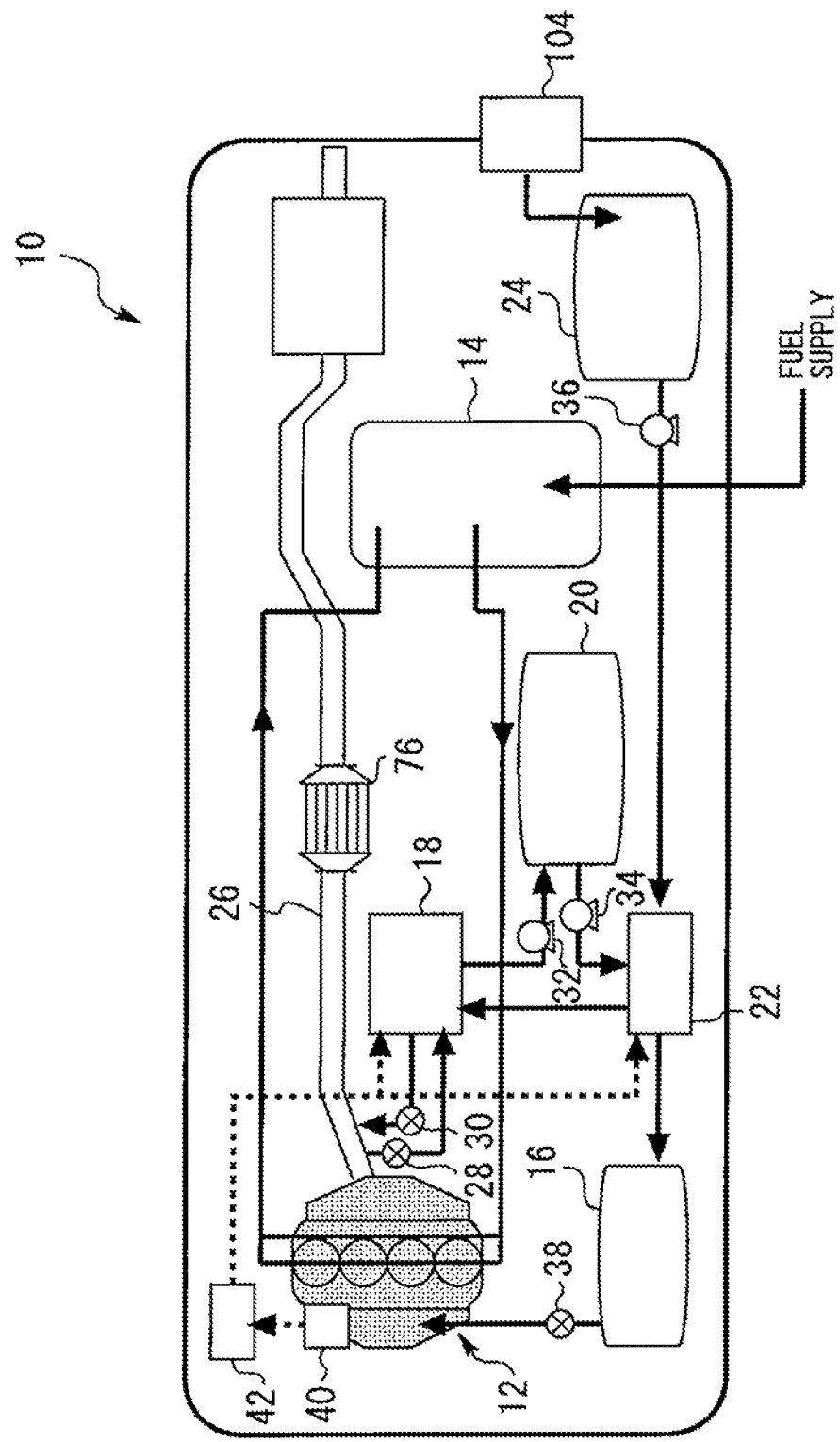
FIG. 37 is an entire configuration diagram illustrating a configuration of a vehicle in a ninth embodiment.

FIG. 37 is an entire configuration diagram illustrating a configuration of a vehicle in this embodiment. As illustrated in FIG. 37, the vehicle 10 is provided with an atmospheric $H_2O$ condenser 104 capable of condensing steam in atmospheric air. To the downstream of the atmospheric $H_2O$ condenser 104, the water tank 24 is connected. As the atmospheric $H_2O$ condenser 104, a heat exchanger, for example, can be used. Condensed water is automatically replenished to the water tank 24.

In the above-described embodiment 8, steam in the exhaust gas is condensed so as to collect condensed water. Thus, while the vehicle 10 is stopped (the engine 12 is not operated) and the exhaust gas is not exhausted, condensed water cannot be obtained. Therefore, if the mixed gas generation control is to be executed while the vehicle 10 is stopped, it is likely that water will become insufficient. In this regard, in this embodiment, water can be ensured from the atmospheric $H_2O$ condenser 104 even while the vehicle 10 is stopped. Particularly, this is effective in a high-temperature and high-humidity area.

In this embodiment, the atmospheric $H_2O$ condenser 104, the water tank 24, and the water pump 36 correspond to the "atmospheric air-derived condensed water supply means" in the above-described twelfth invention.

Embodiment 10

Subsequently, an embodiment 10 of the present invention will be described by referring to FIGS. 38 to 40. In this embodiment, differences from the above-described embodiment 1 will be mainly described, and explanations of the similar matters will be simplified or omitted.

[Description of Configuration of Vehicle]

Figure 38:
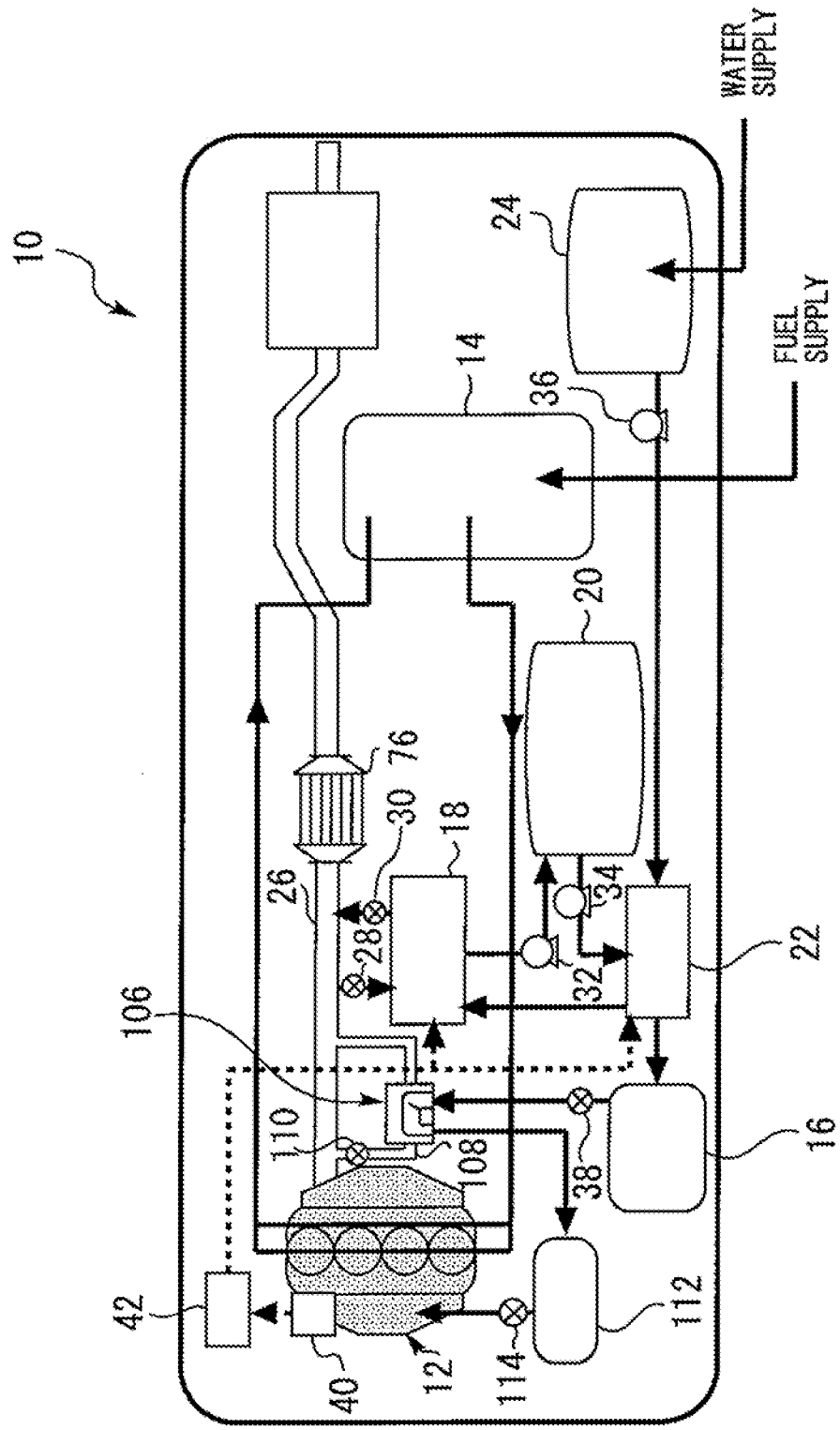
FIG. 38 is an entire configuration diagram illustrating a configuration of a vehicle in a tenth embodiment.

FIG. 38 is an entire configuration diagram illustrating a configuration of a vehicle in this embodiment. The vehicle 10 illustrated in FIG. 38 is provided with an FT synthesizer 106. The FT synthesizer 106 is provided in a bypass passage 108 bypassing a part of the exhaust passage 26. Moreover, on the bypass passage 108 on the upstream side of the position were the FT synthesizer 106 is provided, a bypass valve 110 for switching between opening and closing of the bypass passage 108 is provided. The bypass valve 110 is assumed to be connected to the output side of the ECU 200.

Inside the FT synthesizer 106, an FT catalyst of iron, cobalt, and ruthenium is provided capable of heat exchange with the exhaust gas (not shown). The FT synthesizer 106 is configured capable of synthesizing a fuel of hydrocarbon from the mixed gas (hereinafter referred to as a "synthetic fuel" or "HC") by a catalytic function of the FT catalyst and thermal energy of the exhaust gas.

Here, the synthetic reaction in the FT synthesizer 106 (hereinafter also referred to as an "FT reaction") will be described. The FT reaction can be expressed by the following formula (4):

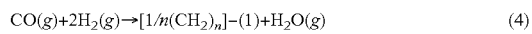

$$CO(g) + 2H_2(g) \rightarrow [1/n(CH_2)_n] - (1) + H_2O(g) \quad (4)$$

In the above-described formula (4), $-[1/n(CH_2)_n]-$ is assumed to express HC.

Returning to FIG. 38, a synthetic fuel tank 112 storing HC synthesized by the FT synthesizer 106 is provided on the downstream side of the FT synthesizer 106. The synthetic fuel tank 112 is connected to the intake system of the engine 12 through a synthetic fuel supply valve 114 composed of an electromagnetic valve and the like. That is, the HC synthesized in the FT synthesizer 106 is temporarily stored in the synthetic fuel tank 112 and is supplied to the intake system of the engine 12 by opening the synthetic fuel supply valve 114. The synthetic fuel supply valve 114 is assumed to be connected to the output side of the ECU 200.

Features of Embodiment 10

In the above-described embodiment 1 and the like, the mixed gas stored in the $H_2$ & CO tank 16 is supplied to the intake system of the engine 12. However, the capacity of the $H_2$ & CO tank 16 is limited, and it is difficult to store a large amount of the mixed gas in the gas state. If the mixed gas in the gas state is compressed, a large amount can be stored, but a device for the compression and power for driving the device are separately needed. On the other hand, as illustrated in above-described formula (4), HC which is a product of the FT reaction can be present in a liquid state.

Thus, in this embodiment, the mixed gas is converted to HC in the liquid state by using the FT reaction (HC synthesis control). HC in the liquid state can be handled more easily than the mixed gas in the gas state and can be stored in a large amount in the synthetic fuel tank 112. Moreover, in this embodiment, since the FT synthesizer 106 is provided in the bypass passage 108, the energy required for progress of the FT reaction can be borne by the thermal energy of the exhaust gas. Thus, HC can be synthesized with high energy efficiency.

Operation of Embodiment 10

Mixed Gas Generation Control

In the mixed gas generation control of this embodiment, similarly to the above-described embodiment 1, the generation ratio of CO and $H_2$ generated on the WE 58 is set to $CO/H_2 = 1/2$. As illustrated in the above-described formula (4), at the FT reaction, CO and $H_2$ are reacted with each other at a substance amount ratio of $CO:H_2 = 1:2$. Thus, in the mixed gas generation control of this embodiment, by setting the generation ratio of CO and $H_2$ generated on the WE 58 at $CO/H_2 = 1/2$, the mixing ratio of the mixed gas in the $H_2$ & CO tank 16 can be made at $CO:H_2 = 1:2$. Thus, in the HC synthesis control which will be described below, the mixed gas in the $H_2$ & CO tank 16 can be made to react without waste.

(HC Synthesis Control)

The HC synthesis control is to convert the mixed gas to HC by introducing the mixed gas stored in the $H_2$ & CO tank 16 into the FT synthesizer 106 during operation of the engine 12. This HC synthesis control will be described by referring to FIGS. 39 and 40. FIG. 39 is a flowchart illustrating the HC synthesis control executed by the ECU 200 in this embodiment. A routine illustrated in FIG. 39 is assumed to be repeatedly executed during operation of the engine 12 similarly to the routines illustrated in FIGS. 4, 9, and 15.

Figure 39:
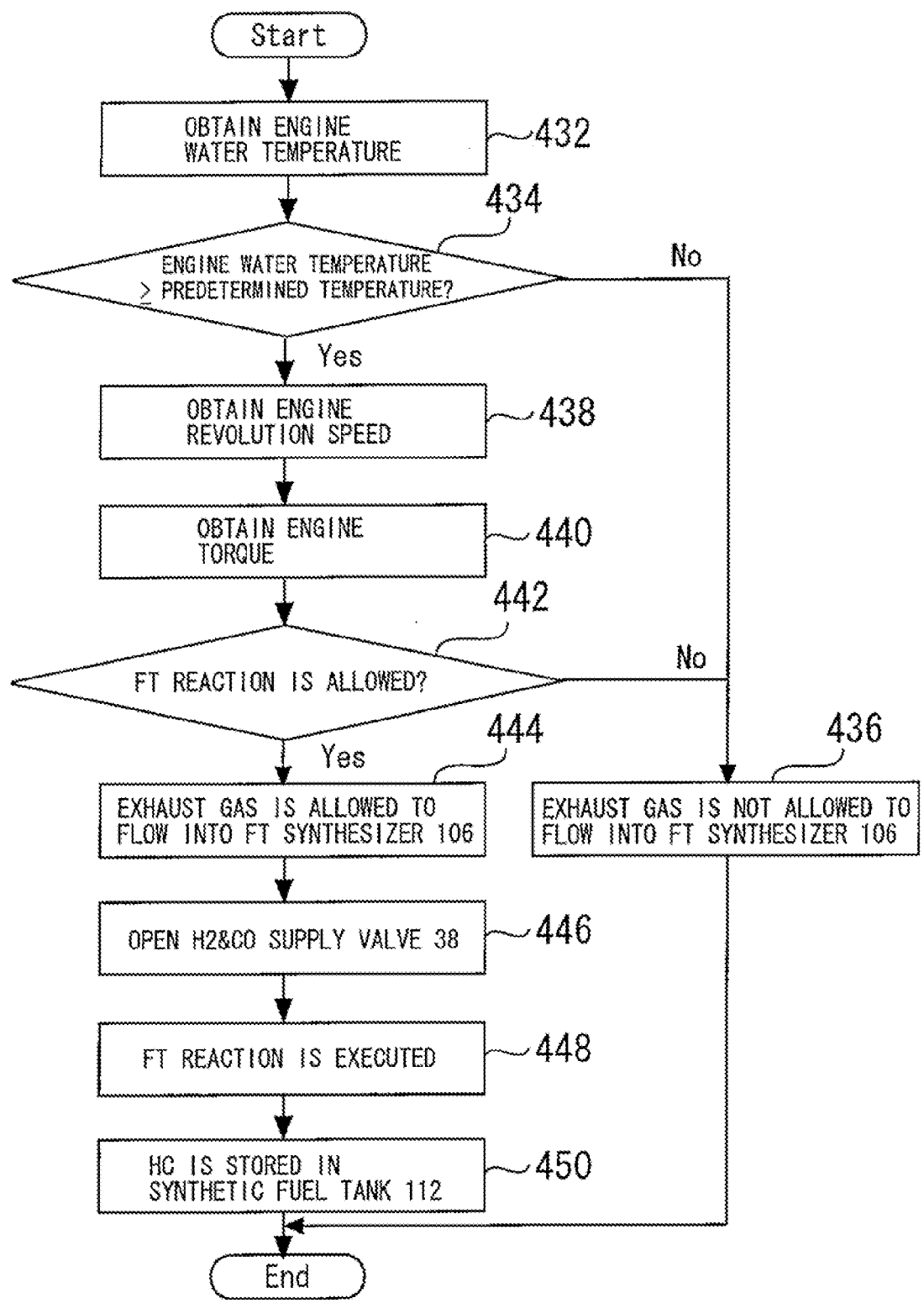
FIG. 39 is a flowchart illustrating the synthesis control executed by the ECU 200 in the tenth embodiment.
Figure 40:
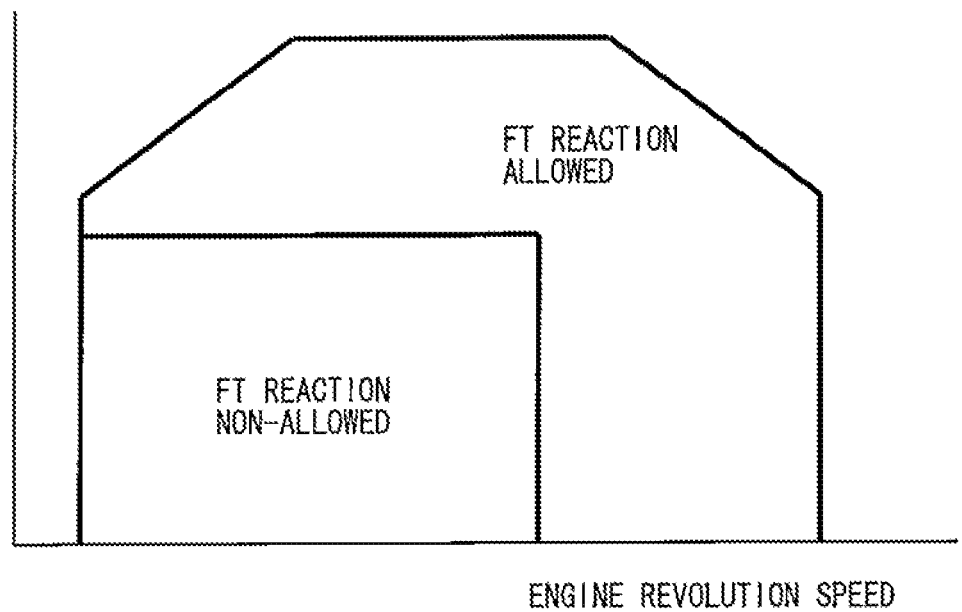
FIG. 40 is a characteristic diagram illustrating a relationship between the FT reaction allowed area and a non-allowed area.

In the routine illustrated in FIG. 39, first, the ECU 200 obtains a temperature of engine cooling water by the water temperature sensor 174 (Step 432). Subsequently, the ECU 200 determines whether or not the engine cooling water temperature obtained at Step 432 is at a predetermined temperature or above (Step 434). If the temperature of the FT catalyst is low, that is, warming-up of the FT catalyst is not sufficient, the FT catalyst is in an inactive state and the FT reaction does not process. Thus, at this Step 434, a lower limit value of the engine cooling water temperature relating to the temperature of the FT catalyst is compared with the engine cooling water temperature obtained at Step 432. The above-described lower limit value is assumed to be acquired separately from experiments and the like and stored in the ECU 200.

At Step 434, if it is determined that the engine cooling water temperature is lower than the above-described lower limit value, the ECU 200 controls the bypass valve 110 so that the exhaust gas does not flow through the bypass passage 108 (Step 436) and this routine is finished. On the other hand, at Step 434, if it is determined that the engine cooling water temperature is at the lower limit value or above, the ECU 200 obtains a revolution speed of the engine 12 (Step 438) and obtains an engine torque (Step 440). The processing at Steps 438 and 440 is the same processing at Steps 300 and 302 in FIG. 4.

Subsequently, the ECU 200 determines whether or not an operation state specified by the engine revolution speed and the engine torque obtained at Steps 438 and 440 is in an FT reaction allowed area (Step 442). FIG. 40 is a characteristic diagram illustrating a relationship between the FT reaction allowed area and a non-allowed area. At this Step 442, it is determined whether or not the operation state is in the FT reaction allowed area, that is, whether or not the operation state is in a temperature area where the temperature of the exhaust gas is sufficient for progress of the FT reaction by referring to map data made from the characteristic diagram illustrated in FIG. 40.

If it is determined that the state is in the FT reaction non-allowed area at Step 442, the ECU 200 controls the bypass valve 110 so that the exhaust gas does not flow through the bypass passage 108 (Step 436) and finishes this routine. On the other hand, if it is determined that the state is in the FT reaction allowed area at Step 442, the ECU 200 controls the bypass valve 110 so that the exhaust gas flows through the bypass passage 108 (Step 444) and opens the $H_2$ & CO supply valve 38 (Step 446). As a result, the FT reaction is executed (Step 448) and HC is stored in the synthetic fuel tank 112 (Step 450).

As described above, according to the routine illustrated in FIG. 39, since the HC synthesis control can be executed, HC in the liquid state can be synthesized during operation of the engine 12. The HC in the liquid state can be handled more easily than the mixed gas in the gas state and can be stored in a large amount in the synthetic fuel tank 112. Moreover, in the HC synthesis control, the energy required for progress of the FT reaction can be borne by the thermal energy of the exhaust gas and thus, HC can be synthesized with high energy efficiency. Additionally, in the HC synthesis control, in case of cold state where the engine cooling water temperature or the exhaust gas temperature is low, a flow of the exhaust gas through the bypass passage 108 can be shut down so as to thermally separate the FT catalyst, and thus, loss of the warming-up performance of the FT catalyst can be prevented.

In this embodiment, the allowableness of the FT reaction is determined on the basis of the estimated temperature of the exhaust gas at Step 442 in FIG. 39, but the allowableness of the FT reaction may be determined on the basis of the temperature of the engine cooling water instead of the temperature of the exhaust gas. Specifically, the allowableness of the FT reaction may be determined by executing the processing at Step 434 in FIG. 39. Moreover, by directly obtaining the temperature of the FT catalyst instead of the temperature of the exhaust gas, the allowableness of the FT reaction may be determined on the basis of this temperature.

In this embodiment, the $CO_2$ reclaimer 18, the electrolytic solution tank 20, the electrolyser 22, the water tank 24, the $CO_2$ inlet valve 28, the $CO_2$ outlet valve 30, the electrolytic solution pumps 32 and 34, and the water pump 36 correspond to the "mixed as generating means" in the above-described fifteenth invention, the FT synthesizer 106 corresponds to the "fuel synthesizing means" in the above-described fifteenth invention, and the synthetic fuel supply valve 114 corresponds to the "synthetic fuel supply means" in the above-described fifteenth invention, respectively.

Moreover, in this embodiment, the bypass valve 110 corresponds to the "bypass passage switching valve" in the above-described sixteenth invention, and the $H_2$ & CO supply valve 38 corresponds to the "mixed gas valve" in the above-described sixteenth invention, respectively. Moreover, in this embodiment, the "catalyst state determining means" in the sixteenth invention is realized by execution of the processing at Step 442 in FIG. 39 by the ECU 200, and the "valve control means" in the sixteenth invention is realized by execution of the processing at Steps 444 and 446 in the same figure by the ECU 200, respectively.

Embodiment 11

Figure 41:
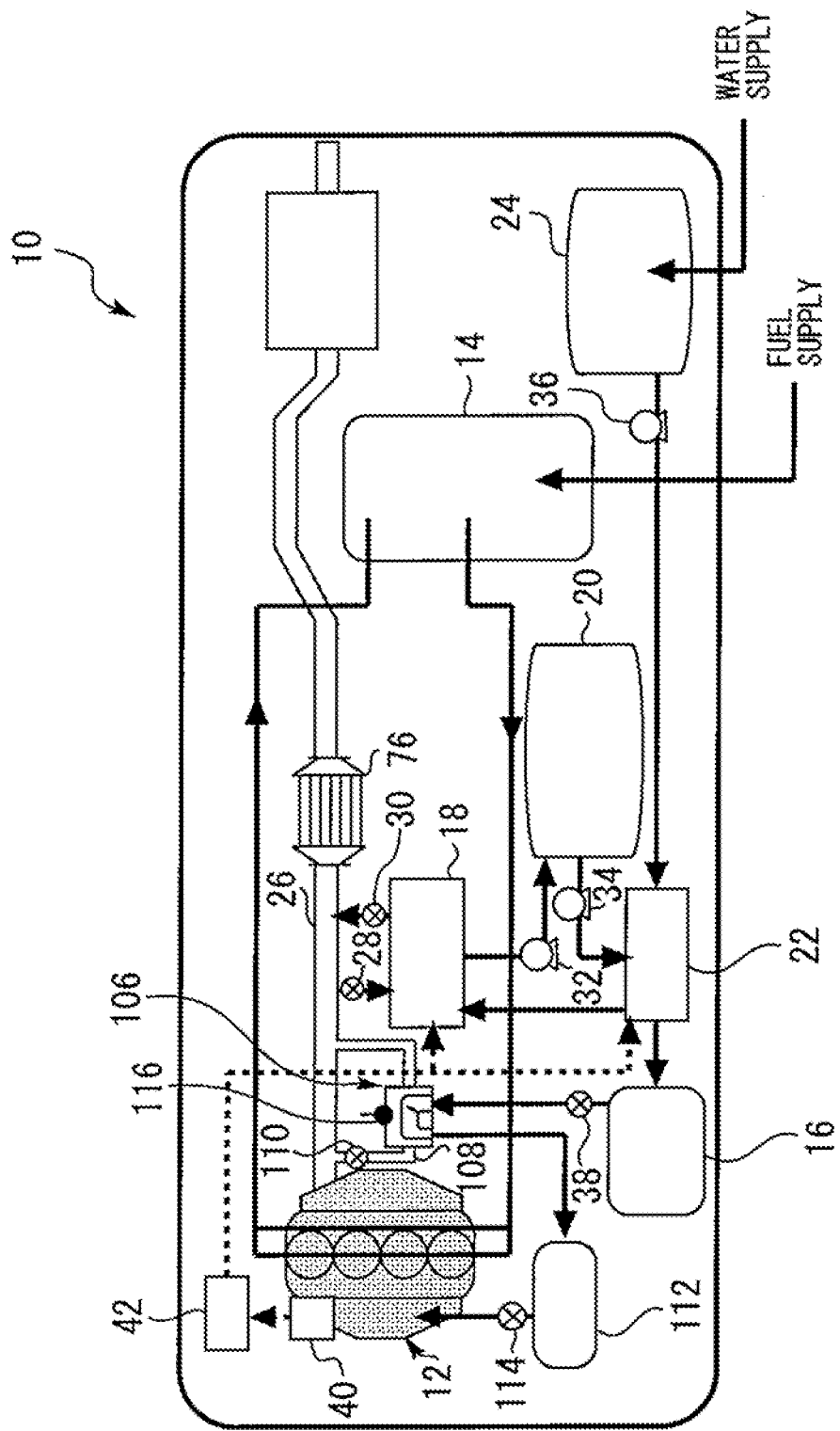
FIG. 41 is an entire configuration diagram illustrating a configuration of a vehicle in an eleventh embodiment.

Subsequently, an embodiment 11 of the present invention will be described by referring to FIGS. 41 to 42. In this embodiment, differences from the above-described embodiment 10 will be mainly described, and explanations of the similar matters will be simplified or omitted.

Features of Embodiment 11

In the above-described embodiment 10, the temperature of the exhaust gas is estimated during operation of the engine 12, and the allowableness of the FT reaction is determined on the basis of the temperature of the exhaust gas. However, residual heat might remain in the bypass passage 108 even after the engine 12 is stopped. Thus, in this embodiment, as illustrated in FIG. 41, a thermometer (thermistor) 116 is provided in the FT synthesizer 106, an actual temperature of the FT catalyst is measured by this thermometer 116 after the engine 12 is stopped, and the allowableness of the FT reaction is determined on the basis of this actual temperature. The thermometer 116 is assumed to be connected to the input side of the ECU 200.

Operation of Embodiment 11

$CO_2$ Recovery Control, Mixed Gas Generation Control, and Mixed Gas Supply Control In the above-described embodiment 10, the $CO_2$ recovery control, the mixed gas generation control, and the mixed gas supply control are executed during operation of the engine 12, but in this embodiment, the HC synthesis control after the engine 12 is stopped is presumed. Thus, the $CO_2$ recovery control, the mixed gas generation control, and the mixed gas supply control are assumed not to be executed.
(HC Synthesis Control)

The HC synthesis control of this embodiment will be described by referring to FIG. 42. FIG. 42 is a flowchart illustrating the HC synthesis control executed by the ECU 200 in this embodiment. A routine illustrated in FIG. 42 is assumed to be repeatedly executed periodically.

Figure 42:
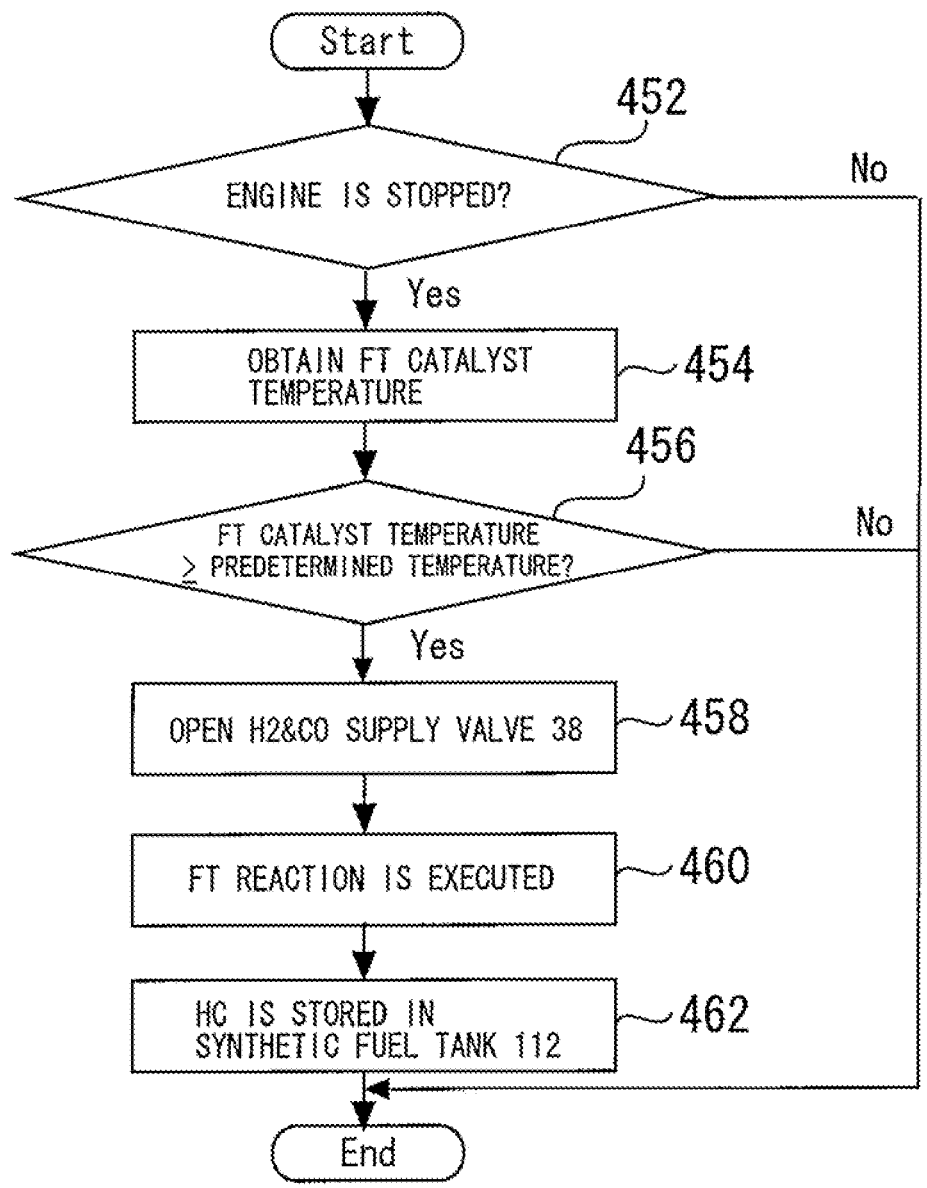
FIG. 42 is a flowchart illustrating the HC synthesis control executed by the ECU 200 in the eleventh embodiment.

In the routine illustrated in FIG. 42, first, the ECU 200 determines whether or not the engine 12 is stopped (Step 452). As a result, if it is determined that the engine 12 is not stopped, the ECU 200 finishes this routine. On the other hand, if it is determined that the engine 12 has been stopped, the ECU 200 obtains an actual temperature of the FT catalyst by the thermometer 116 (Step 454).

Subsequently, the ECU 200 determines whether or not the actual temperature of the FT catalyst obtained at Step 454 is at a predetermined temperature or above (Step 456). As described in the above-described embodiment 10, if warming-up of the FT catalyst is not sufficient, the FT reaction does not progress. Thus, at this Step 456, an allowable lower limit value of the temperature of the FT catalyst is compared with the actual temperature of the FT catalyst obtained at Step 454. The allowable lower limit value is assumed to be acquired separately from experiments and the like and stored in the ECU 200.

At Step 456, if it is determined that the actual temperature of the FT catalyst is lower than the above-described allowable lower limit value, it can be determined that warming-up of the FT catalyst is not sufficient, and the ECU 200 finishes this routine. On the other hand, if it is determined at Step 456 that the actual temperature of the FT catalyst is at the above-described allowed lower limit value or above, the ECU 200 opens the $H_2$ & CO supply valve 38 (Step 458). As a result, the FT reaction is executed (Step 460), and HC is stored in the synthetic fuel tank 112 (Step 462).

As described above, according to the routine illustrated in FIG. 42, since the HC synthesis control can be executed after the engine 12 is stopped, the effects similar to that in the above-described embodiment 10 can be obtained. Moreover, since the HC synthesis control can be executed by using the residual heat after the engine 12 is stopped, energy efficiency can be further improved.

Embodiment 12

Subsequently, an embodiment 12 of the present invention will be described by referring to FIGS. 43 to 46. In this embodiment, differences from the above-described embodiment 10 will be mainly described, and explanations of the similar matters will be simplified or omitted.

Features of Embodiment 12

In the above-described embodiment 10, the FT synthesizer 106 is provided in the exhaust passage 26 so that the FT reaction is made to progress by the thermal energy of the exhaust gas. However, since the thermal energy of the exhaust gas is taken away by the FT synthesizer 106, the temperature of the exhaust purification catalyst 76 located on the downstream side of the FT synthesizer 106 lowers, and exhaust emission deteriorates. Thus, a measure for raising the catalyst temperature by separately adding fuel to the exhaust passage 26 (so-called exhaust addition) or the like needs to be taken. Thus, in this embodiment, as illustrated in FIG. 43, the FT synthesizer 106 is provided in an EGR passage 118 for connecting the exhaust passage 26 and the intake system of the engine 12 so that the FT reaction is made to progress by the thermal energy of the exhaust gas flowing through the EGR passage 118 (hereinafter also referred to as an "EGR gas").

By having the exhaust gas flow through the EGR passage 118, an exhaust gas amount flowing into the exhaust purification catalyst 76 can be decreased, and temperature drop of the exhaust purification catalyst 76 can be suppressed. Thus, since no exhaust addition needs to be carried out, fuel efficiency can be improved. Moreover, since the thermal energy can be taken away by the FT synthesizer 106, the FT synthesizer 106 can function as an EGR cooler. Therefore, since installation of an EGR cooler can be omitted, simplification of the system can be also realized.

Figure 43:
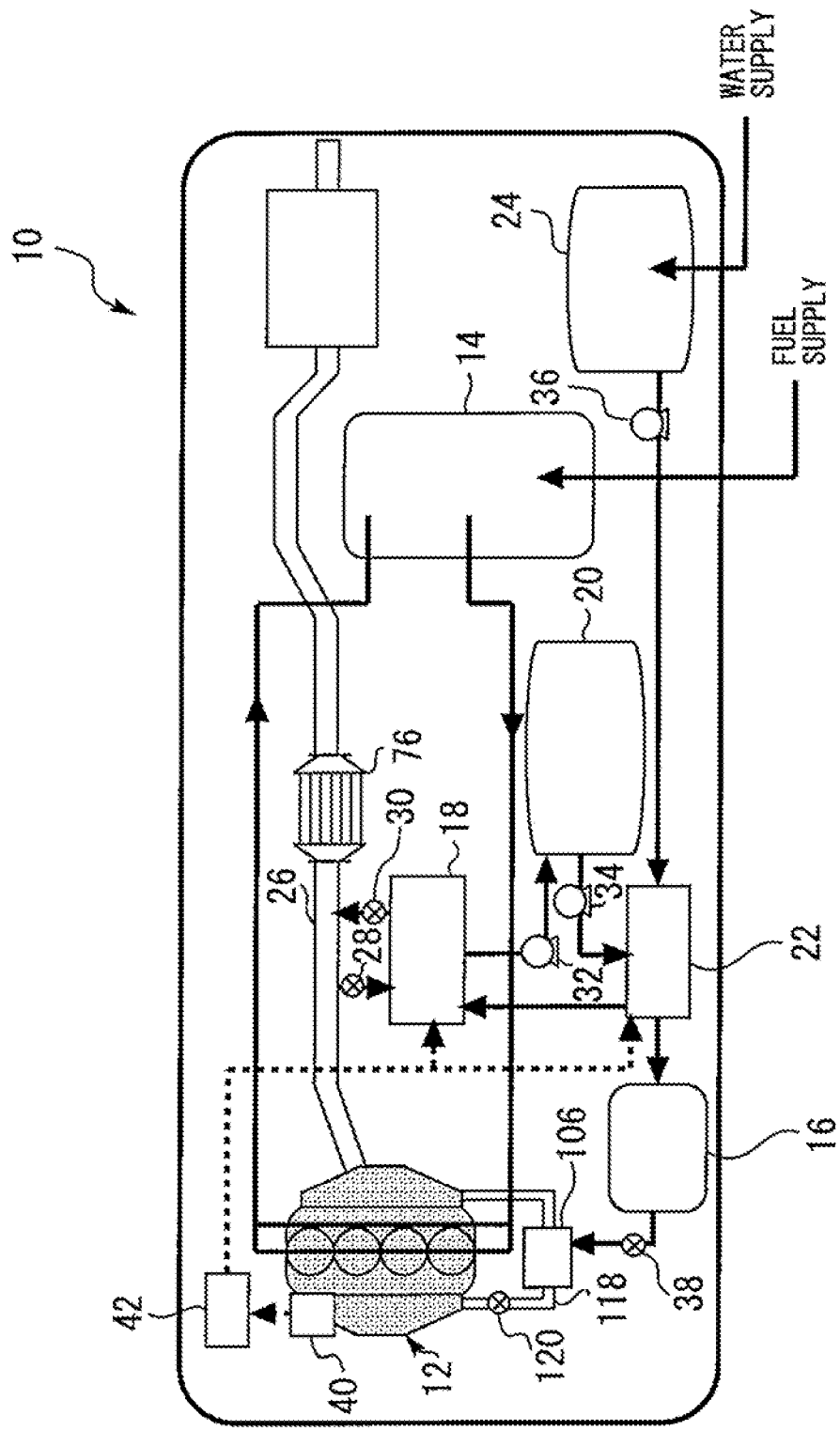
FIG. 43 is an entire configuration diagram illustrating a configuration of a vehicle in a twelfth embodiment.

Moreover, in this embodiment, as illustrated in FIG. 43, an EGR valve 120 is provided on the downstream side of the FT synthesizer 106 so that HC generated by the FT reaction is mixed with the EGR gas and supplied to the engine 12. As a result, since homogeneity of the supply fuel can be improved, generation of NOx or smoke caused by biased concentration of the fuel can be suppressed. Moreover, since installation of various devices (booster pump, synthetic fuel supply valve and the like) for supplying HC to the intake system of the engine 12 becomes unnecessary, cost reduction can be also realized. The EGR valve 120 is assumed to be connected to the output side of the ECU 200.

Operation of Embodiment 12

HC Synthesis Control

Figure 44:
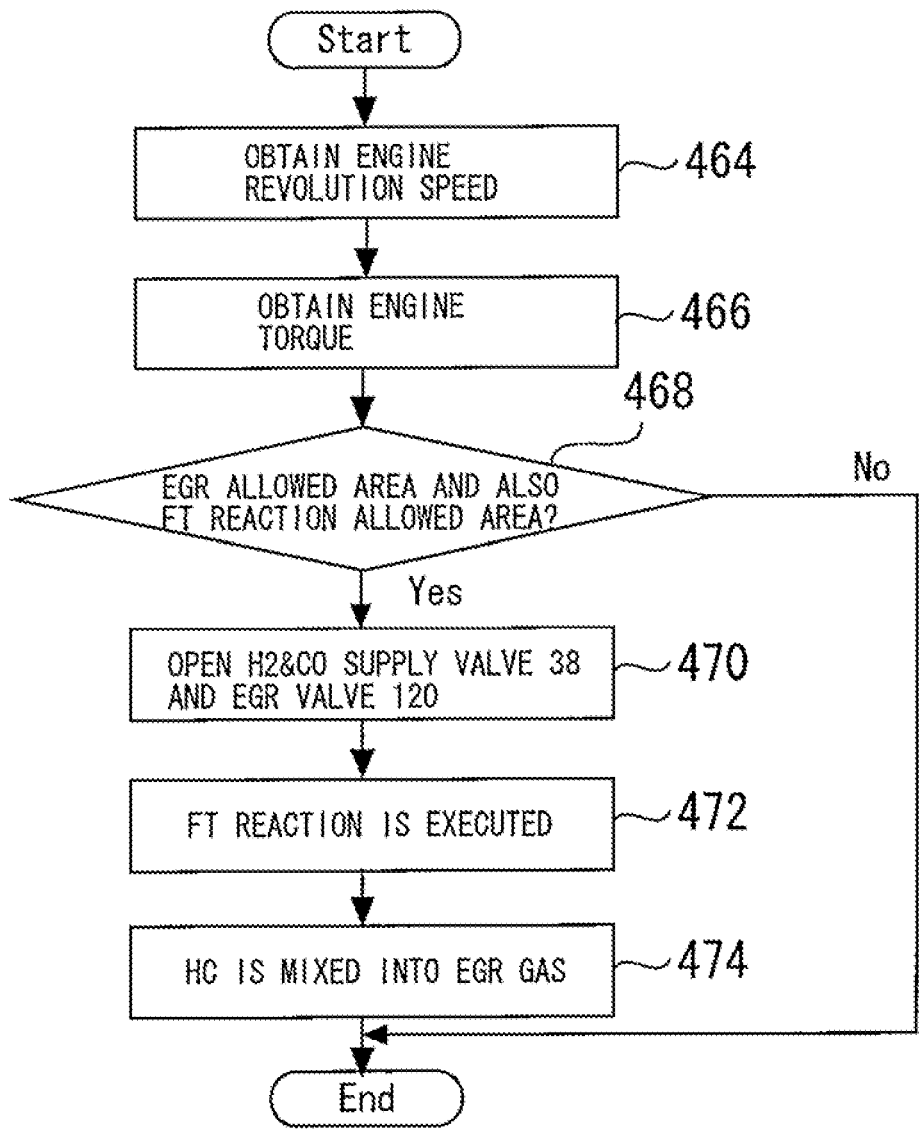
FIG. 44 is a flowchart illustrating the HC synthesis control executed by the ECU 200 in the twelfth embodiment.

The HC synthesis control of this embodiment will be described by referring to FIG. 44. FIG. 44 is a flowchart illustrating the HC synthesis control executed by the ECU 200 in this embodiment. A routine illustrated in FIG. 44 is assumed to be repeatedly executed during operation of the engine 12 similarly to the routine illustrated in FIG. 39.

In the routine illustrated in FIG. 44, first, the ECU 200 obtains a revolution speed of the engine 12 (Step 464) and obtains an engine torque (Step 466). The processing at Steps 464 and 466 is the same processing as Steps 438 and 440 in FIG. 39.

Figure 45:
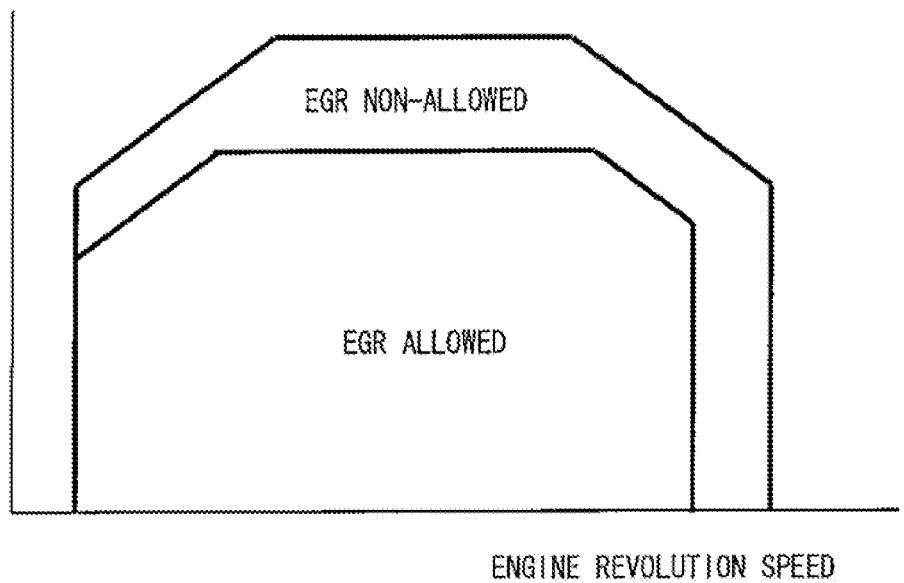
FIG. 45 is a characteristic diagram illustrating a relationship between the EGR allowed area and a non-allowed area.
Figure 46:
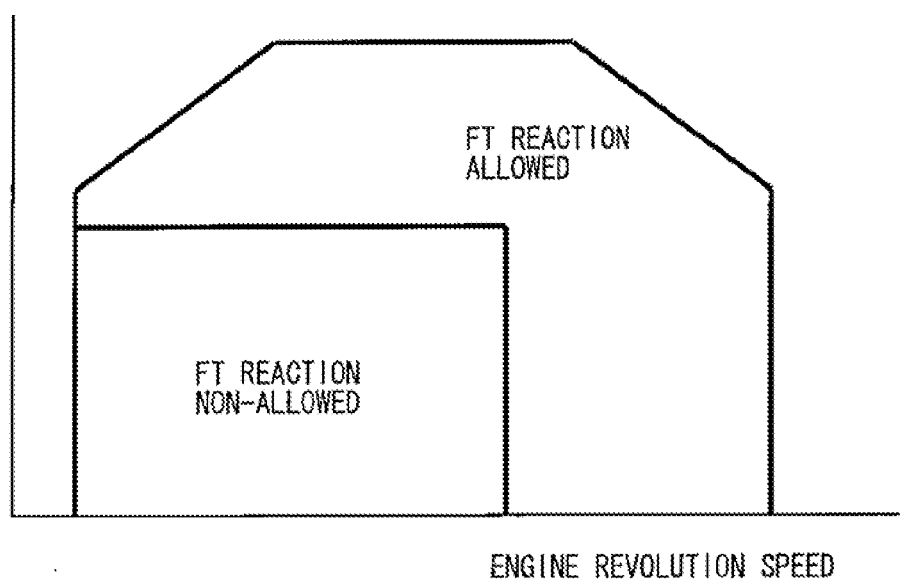
FIG. 46 is a characteristic diagram illustrating a relationship between the FT reaction allowed area and a non-allowed area.

Subsequently, the ECU 200 determines whether or not an operation state specified by the engine revolution speed and the engine torque obtained at Steps 464 and 466 is in an EGR allowed area and also a FT reaction allowed area (Step 468). FIG. 45 is a characteristic diagram illustrating a relationship between the EGR allowed area and a non-allowed area. Moreover, FIG. 46 is a characteristic diagram illustrating a relationship between the FT reaction allowed area and a non-allowed area. At this Step 468, it is determined whether or not the operation state is in the EGR allowed area and also in the FT reaction allowed area by referring to map data made from the characteristic diagrams illustrated in FIGS. 45 and 46, respectively.

If it is determined that the state is not in the EGR allowed area and also in the FT reaction allowed area at Step 468, the ECU 200 finishes this routine. On the other hand, if it is determined that the state is in the EGR allowed area and also in the FT reaction allowed area at Step 468, the ECU 200 opens the $H_2$ & CO supply valve 38 and the EGR valve 120 (Step 470). As a result, the FT reaction is executed (Step 472), and the HC mixed EGR gas flows into the intake system for the engine 12 (Step 474).

As described above, according to the routine illustrated in FIG. 44, since the HC synthesis control can be executed if the state is in the EGR allowed area and also in the FT reaction allowed area, the exhaust gas amount flowing into the exhaust purification catalyst 76 can be decreased during execution of the HC synthesis control, and a temperature drop of the exhaust purification catalyst 76 can be suppressed. Moreover, since the generated HC can be mixed with the EGR gas and supplied to the engine homogeneity of the supply fuel can be improved. Therefore, occurrence of NOx or smoke caused by biased concentration of the fuel can be suppressed.

In this embodiment, the EGR valve 120 corresponds to the "EGR passage switching valve" in the above-described eighteenth invention, and the $H_2$ & CO supply valve 38 corresponds to the "mixed gas valve" in the above-described eighteenth invention, respectively. Moreover, in this embodiment, the "operation condition determining means" in the above-described eighteenth invention is realized by execution of the processing at Step 468 in FIG. 44 by the ECU 200, and the "valve control means" in the above-described eighteenth invention is realized by execution of the processing at Step 470 by the ECU 200 in the same figure, respectively.

Embodiment 13

Subsequently, an embodiment 13 of the present invention will be described by referring to FIG. 47. In this embodiment, differences from the above-described embodiment 10 will be mainly described, and explanations of the similar matters will be simplified or omitted.

[Description of Configuration of Vehicle]

Figure 47:
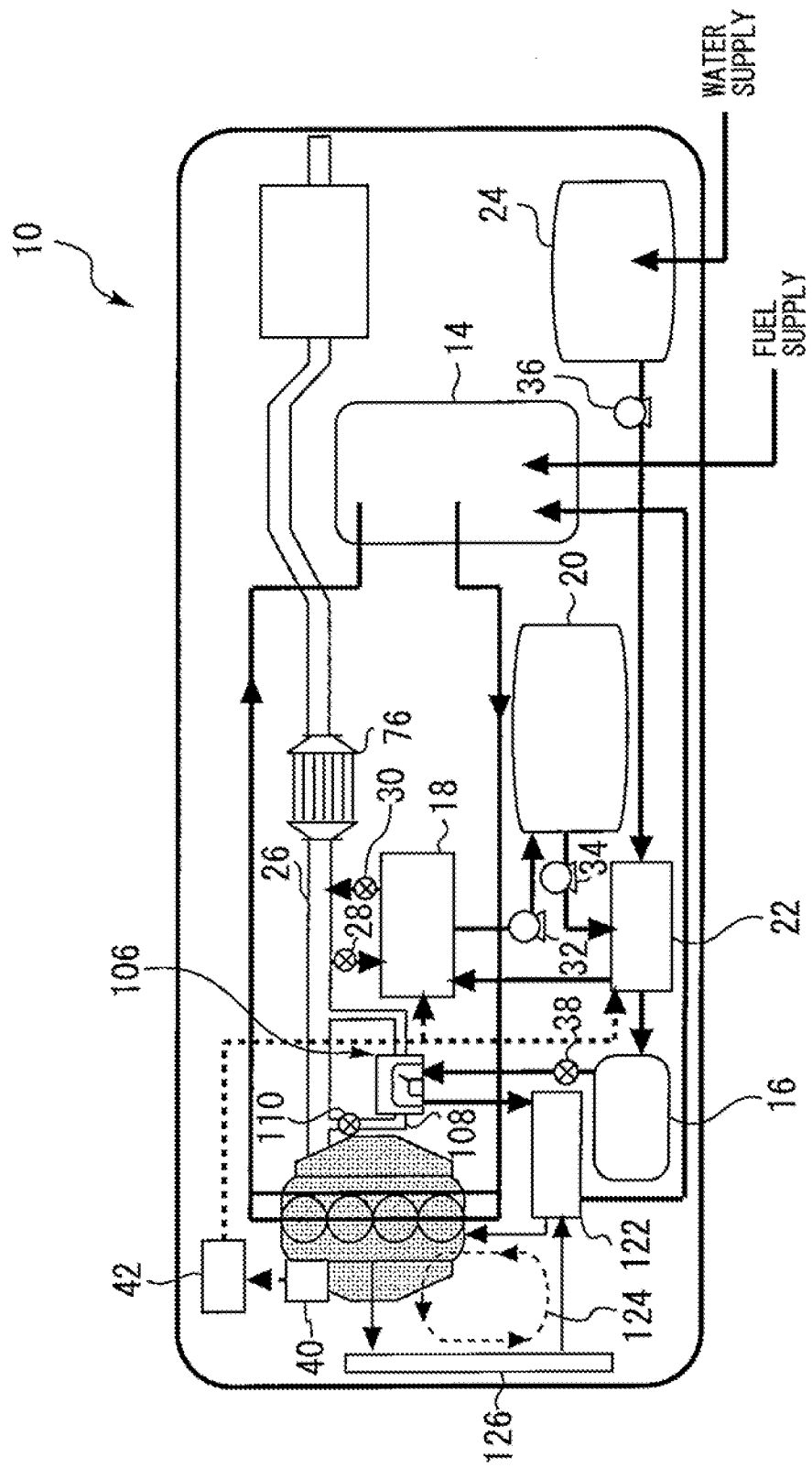
FIG. 47 is an entire configuration diagram illustrating a configuration of a vehicle of a thirteenth embodiment.

FIG. 47 is an entire configuration diagram illustrating a configuration of a vehicle of this embodiment. The vehicle 10 illustrated in FIG. 47 is provided with a heat exchanger 122 instead of the synthetic fuel tank 112 in FIG. 38. The heat exchanger 122 is provided on the downstream side of the radiator 126 and also on the upstream side of the engine 12 in a cooling water circulation passage 124. Moreover, the heat exchanger 122 is connected to the gasoline tank 14, Features of Embodiment 13

Since the HC immediately after synthesis in the FT synthesizer 106 is at a high temperature close to the temperature of the FT catalyst, most of it is present in the gas state. In this regard, in this embodiment, since the heat exchanger 122 is provided on the downstream of the FT synthesizer 106, HC can be cooled. If HC can be cooled, HC can be reliably brought into the liquid state and thus, HC can be stored in the gasoline tank 14. Therefore, since fuel storage or fuel supply can be made by using the existing gasoline tank 14 or an injector for gasoline (not shown), simplification of vehicle configuration or cost reduction can be realized. Moreover, since the heat exchanger 122 is provided in the cooling water circulation passage 124 on the upstream side of the engine 12, the engine, an air conditioner heater and the like can be warmed up by recovered heat.

In the above-described embodiment, the gasoline tank 14 corresponds to the "fuel tank" in the above-described nineteenth invention, and the heat exchanger 122 corresponds to the "heat exchanger" in the above-described nineteenth invention, respectively.

Embodiment 14

Subsequently, an embodiment 14 of the present invention will be described by referring to FIG. 48. In this embodiment, differences from the above-described embodiment 10 will be mainly described, and explanations of the similar matters will be simplified or omitted.

[Description of Configuration of Vehicle]

Figure 48:
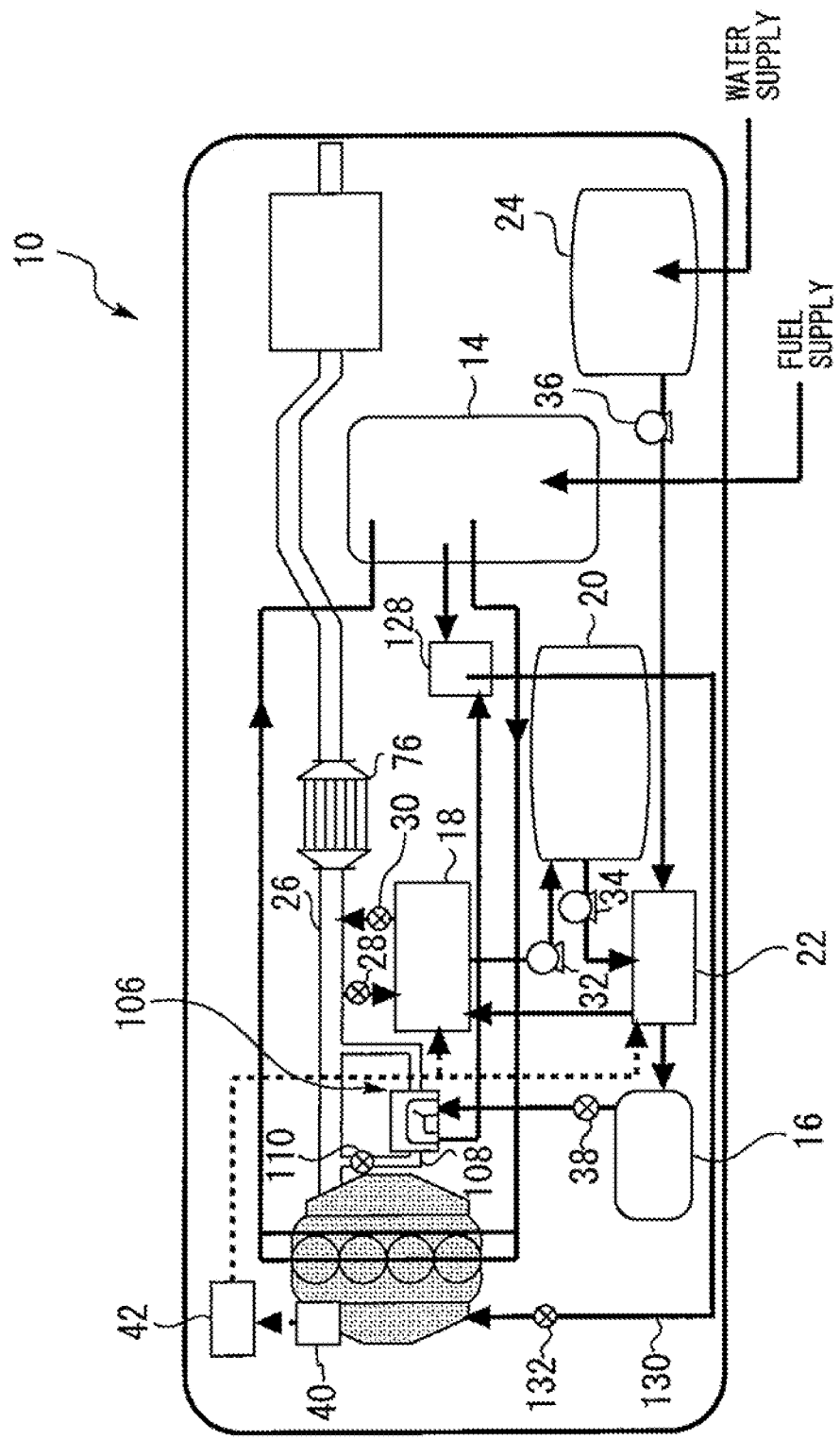
FIG. 48 is an entire configuration diagram illustrating a configuration of a vehicle of a fourteenth embodiment.

FIG. 48 is an entire configuration diagram illustrating a configuration of a vehicle of this embodiment. The vehicle 10 illustrated in FIG. 48 is provided with a canister (adsorbing material) 128 instead of the synthetic fuel tank 112 in FIG. 38. The canister 128 is connected to the FT synthesizer 106 and also connected to the intake system of the engine 12 and the gasoline tank 14. A purge valve 132 is provided in a purge path 130 connecting the intake system of the engine 12 and the canister 128. The gasoline tank 14, the canister 128, the purge path 130, and the purge valve 132 constitute a purge device for processing evaporated gasoline generated in the gasoline tank 14. The purge 132 is assumed to be connected to the output side of the ECU 200.

Features of Embodiment 14

As described in the embodiment 13, since the HC immediately after synthesis in the FT synthesizer 106 is at a high temperature close to the temperature of the FT catalyst, most of it is present in the gas state. Thus, in this embodiment, the canister 128 is provided on the downstream side of the FT synthesizer 106. As a result, HC in the has state can be adsorbed by the canister 128 and purged to the intake system of the engine 12 together with vaporized gasoline from the gasoline tank 14. A purge method is known and is disclosed in Japanese Patent Laid-Open No. 2003-83135, for example. Since the purge method is not an essential part of the present invention, further explanation will be omitted here.

As described above, in this embodiment, since HC in the gas state is adsorbed by the canister 128 and purged to the intake system of the engine 12, installation of various devices for cooling HC are no longer necessary. Moreover, HC can be purged to the intake system of the engine 12 by using the existing purge device. Therefore, simplification of the vehicle configuration and cost reduction can be realized.

Embodiment 15

Figure 49:
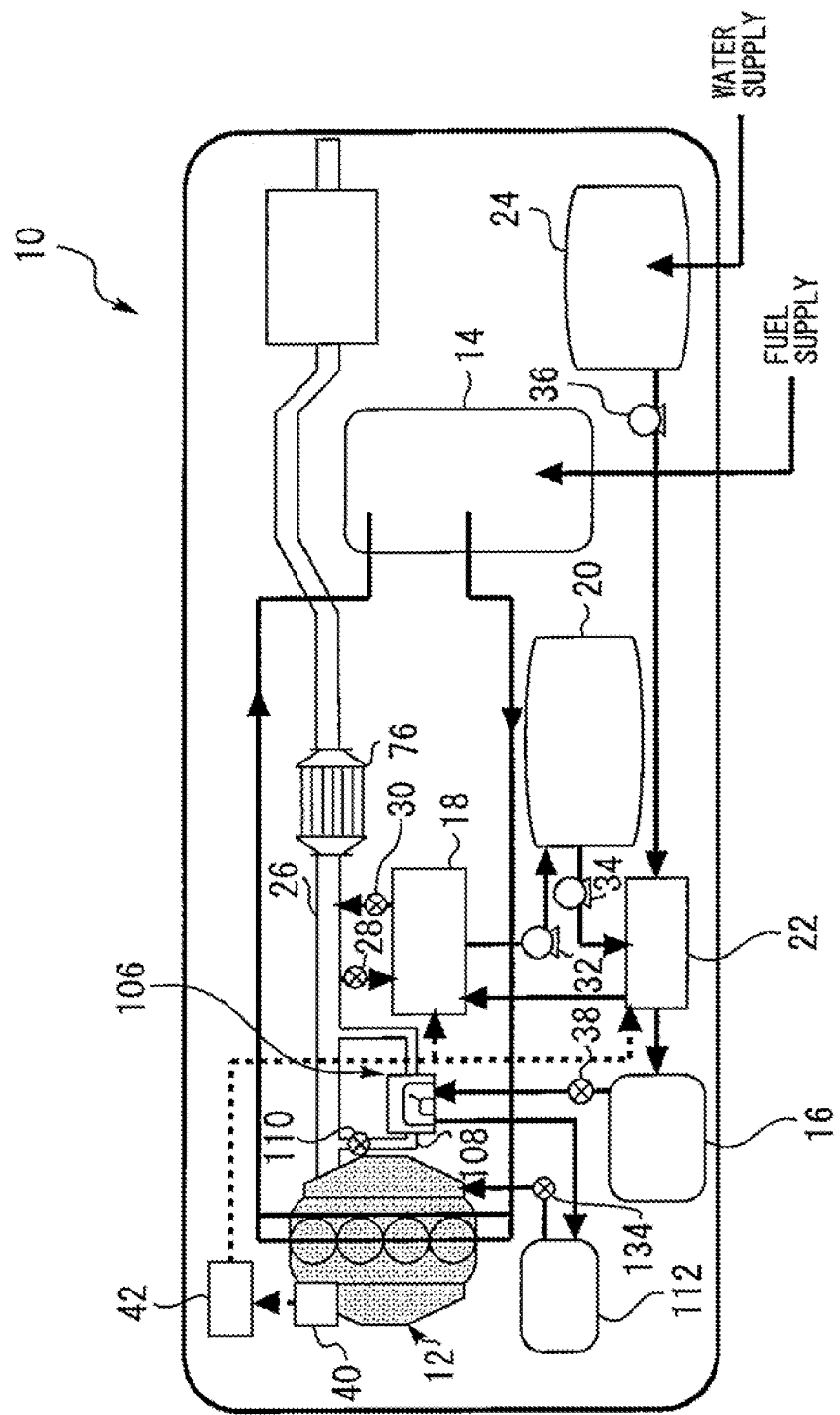
FIG. 49 is an entire configuration diagram illustrating a configuration of a vehicle of a fifteenth embodiment.

Subsequently, an embodiment 15 of the present invention will be described by referring to FIG. 49. In this embodiment, differences from the above-described embodiment 10 will be mainly described, and explanations of the similar matters will be simplified or omitted.
[Description of Configuration of Vehicle]
FIG. 49 is an entire configuration diagram illustrating a configuration of a vehicle of this embodiment. The vehicle 10 illustrated in FIG. 49 is provided with an exhaust adding valve 134 composed of an electromagnetic valve or the like in the exhaust passage 26 on the upstream side of the exhaust purification catalyst 76. The exhaust adding valve 134 is connected to the synthetic fuel tank 112 and configured capable of adding HC into the exhaust gas. The exhaust adding valve 134 is connected to the output side of the ECU 200.

Features of Embodiment 15

As described in the above-described embodiment 12, by providing the FT synthesizer 106 in the exhaust passage 26 and having the FT reaction progress by the thermal energy of the exhaust gas, the temperature of the exhaust purification catalyst 76 on the downstream side lowers. Thus, in this embodiment, if the temperature of the exhaust purification catalyst 76 is low, the ECU 200 executes an exhaust addition control for adding HC into the exhaust gas by opening the exhaust adding valve 134. By executing the exhaust addition control, the added HC can be made to react with the exhaust purification catalyst 76 so as to raise the temperature of the exhaust purification catalyst 76. Therefore, deterioration of exhaust emission can be suppressed. In the exhaust addition control, the temperature of the exhaust purification catalyst 76 may be estimated in accordance with an operation state of the engine 12 or a progress state of the FT reaction or may be directly obtained by a thermometer or the like.

Embodiment 16

Figure 50:
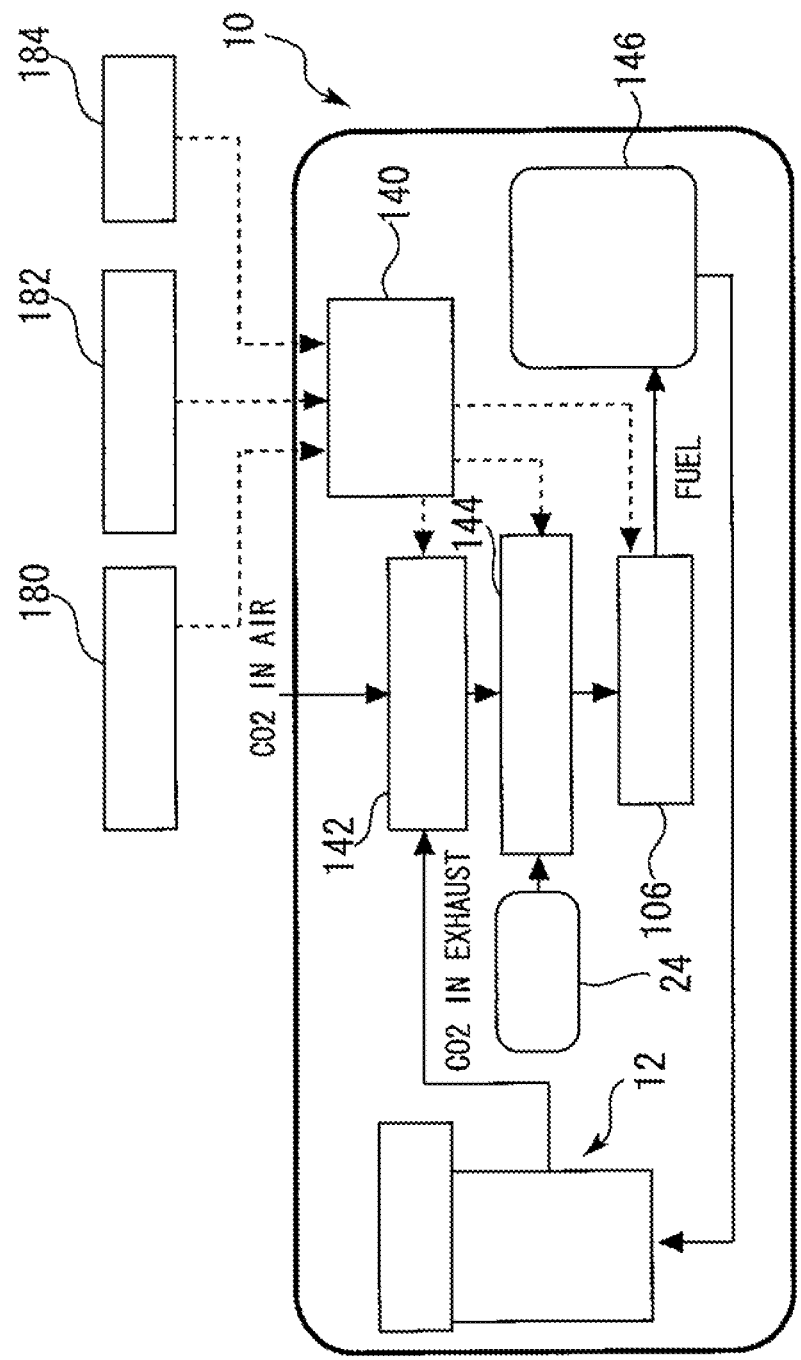
FIG. 50 is an entire configuration diagram illustrating a configuration of a vehicle of a sixteenth embodiment.

Subsequently, an embodiment 16 of the present invention will be described by referring to FIG. 50. In this embodiment, differences from the above-described embodiment 10 will be mainly described, and explanations of the similar matters will be simplified or omitted.
[Description of Configuration of Vehicle]
FIG. 50 is an entire configuration diagram illustrating a configuration of a vehicle of this embodiment. The vehicle 10 illustrated in FIG. 50 is a vehicle capable of taking, power supply from an external power source (propelling generator 180 for household, household solar panel 182, and a transmission line (commercial power supply) 184). The vehicle 10 includes a plug-in hybrid vehicle or a range extender vehicle.

As illustrated in FIG. 50, the vehicle 10 is provided with an external power supply input device 140. The external power supply input device 140 constitutes a connecting mechanism for supplying power from an external power supply to the vehicle 10. Moreover, as illustrated in FIG. 50, the external power supply input device 140 is electrically connected to a $CO_2$ absorbing device 142, a CO and $H_2$ generating device 144, and the FT synthesizer 106.

Moreover, in FIG. 50, the $CO_2$ absorbing device 142 has functions of both the $CO_2$ reclaimer 18 and the electrolytic solution tank 20 in FIG. 38. Moreover, the CO and $H_2$ generating device 144 has a configuration similar to that of the electrolyser 22 in FIG. 38. Moreover, HC synthesized in the FT synthesizer 106 is assumed to be stored in the fuel tank 146 and supplied to the engine 12.

Features of Embodiment 16

In the above-described embodiment 11, controls such as the mixed gas generation control, the mixed gas supply control, and the HC synthesis control are executed during operation of the engine 12. These controls are realized by using power stored in the battery 42 in FIG. 38. In this regard, in this embodiment, the above-described controls are executed while supplying external power supply while the vehicle 10 is stopped. That is, the above-described controls can be realized by using abundant power from the outside. Therefore, since a sufficient amount of HC can be produced, the total $CO_2$ emission (Well To Wheel) including those during power generation at a power plant and when using gasoline in a vehicle can be drastically reduced. Moreover, while the vehicle 10 is stopped, since liquid level oscillation of the electrolytic solution stored inside the electrolytic solution tank 20 or the electrolyser 22 does not occur, the above-described mixed gas generation control can be executed stably.

In the above-described embodiment, the external power supply input device 140 corresponds to the "power receiving means" in the above-described twenty-fifth invention.

Embodiment 17

Figure 51:
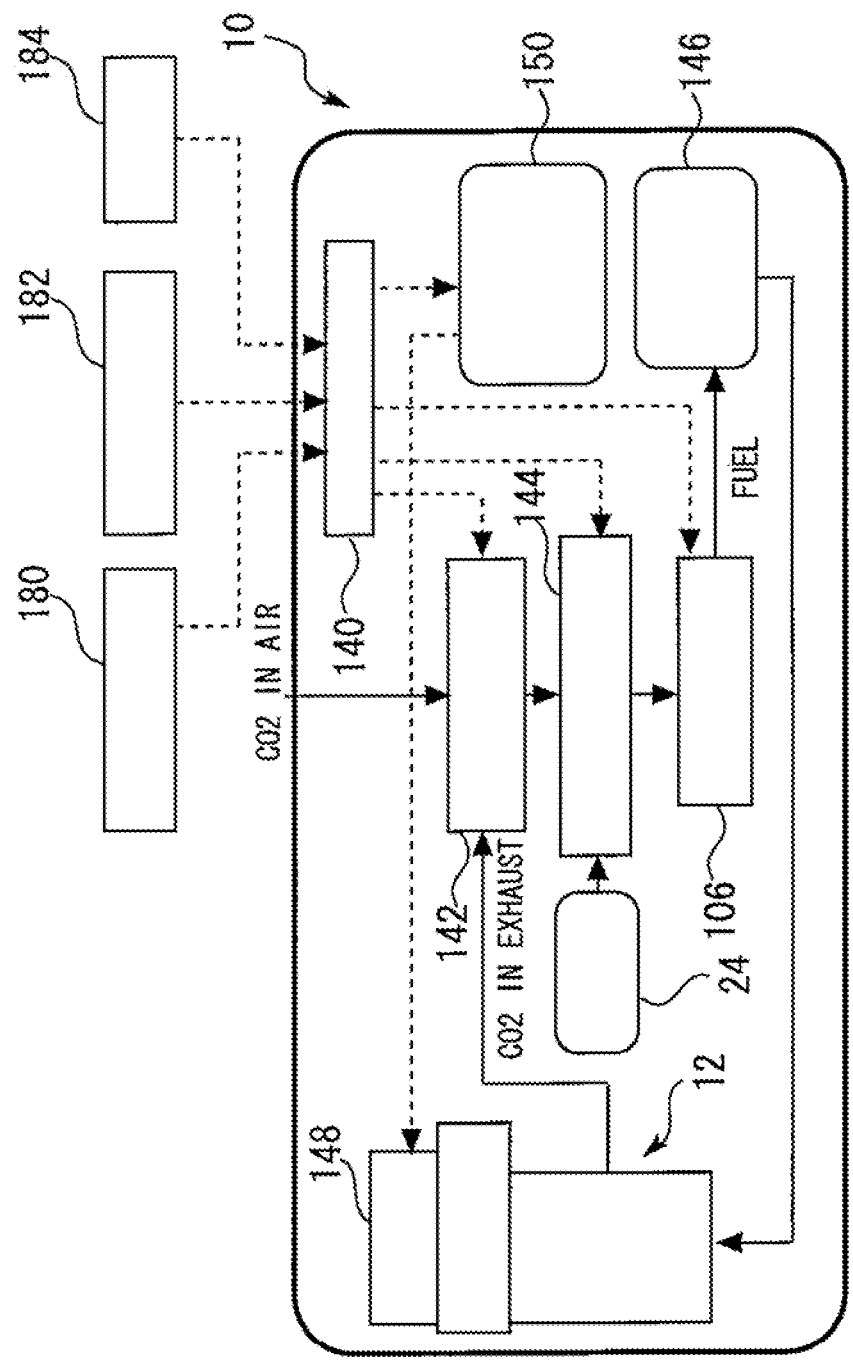
FIG. 51 is an entire configuration diagram illustrating a configuration of a vehicle of a seventeenth embodiment.

Subsequently, an embodiment 17 of the present invention will be described by referring to FIG. 51. In this embodiment, differences from the above-described embodiment 16 will be mainly described, and explanations of the similar matters will be simplified or omitted.
[Description of Configuration of Vehicle]
FIG. 51 is an entire configuration diagram illustrating a configuration of a vehicle of this embodiment. The vehicle 10 illustrated in FIG. 51 is provided with a motor 148 mounted on a crank shaft (not shown) of the engine 12 and functioning as a motor for assisting an output of the engine 12. Moreover, the external power supply input device 140 is electrically connected to a battery 150, and the battery 150 is electrically connected to the motor 148.

Features of Embodiment 17

In the above-described embodiment 16, HC is produced by power from the external power supply while the vehicle 10 is stopped, and this HC and gasoline are used as a power source of the vehicle 10. In this embodiment, HC is synthesized by power from the external power supply while the vehicle 10 is stopped and also, this power is stored in the battery 150. The synthesized HC and electricity in the battery 150 are used as a power source of the vehicle 10. Therefore, since HC produced while the vehicle 10 is stopped and the motor 148 can be combined, vehicle running in which main driving and sub driving are switched between electricity and HC, for, example can be realized.

In the above-described embodiment, the external power supply input device 140 corresponds to the "power receiving means" in the above-described twenty-fourth invention.

Embodiment 18

Subsequently, an embodiment 18 of the present invention will be described by referring, to FIGS. 52 and 53. In this embodiment, differences from the above-described embodiment 17 will be mainly described, and explanations of the similar matters will be simplified or omitted.

[Description of Configuration of Vehicle]

Figure 52:
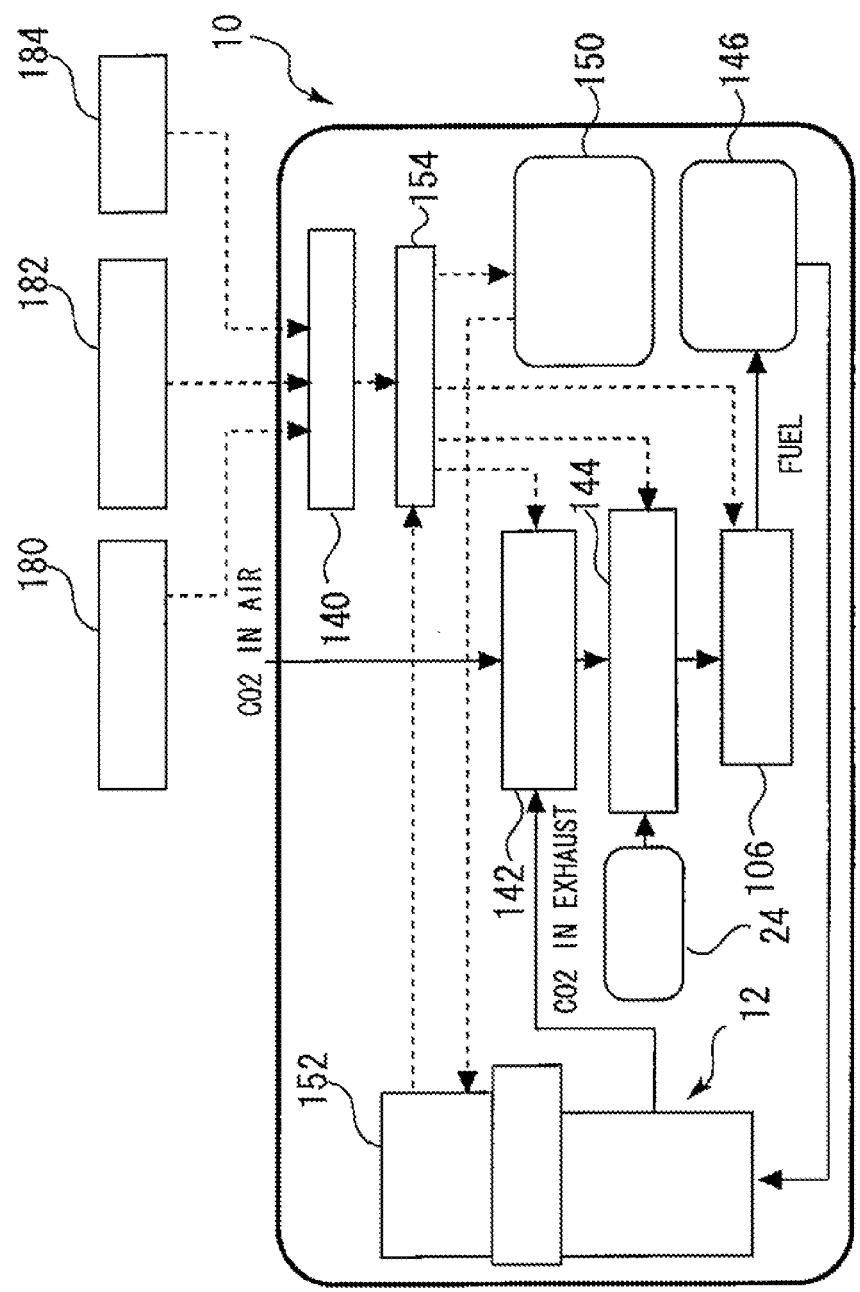
FIG. 52 is an entire configuration diagram illustrating a configuration of a vehicle of an eighteenth embodiment.

FIG. 52 is an entire configuration diagram illustrating a configuration of a vehicle of this embodiment. The vehicle 10 illustrated in FIG. 52 is provided with a motor/generator 152 and a power distributing device 154. The motor/generator 152 has functions of both the motor 148 in FIG. 51 and the alternator 40 in FIG. 38. Specifically, the motor/generator 152 functions as a motor by power from the battery 150. On the other hand, if the motor/generator 152 functions as a generator, it supplies generation power to the power distributing device 154. The power distributing device 154 is electrically connected to the $CO_2$ absorbing device 142, the external power supply input device 140, and the motor/generator 151. The power distributing device 154 distributes and supplies power from the motor/generator 152 and the external power supply input device 140 to the $CO_2$ absorbing device 142 and the like upon receipt of an instruction from the ECU 200 (power distribution control).

Operation of Embodiment 18

Power Distribution Control

Subsequently, the power distribution control in this embodiment will be described by referring to FIG. 53. FIG. 53 is a flowchart illustrating the power distribution control executed by the ECU 200 in this embodiment. A routine illustrated in FIG. 53 is assumed to be executed while the engine 12 is stopped.

Figure 53:
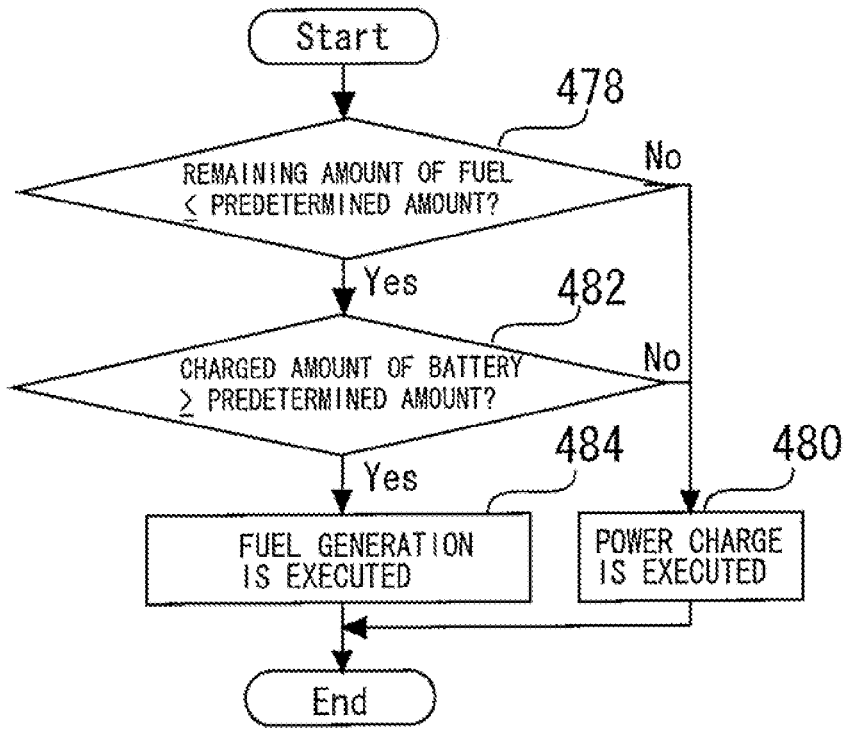
FIG. 53 is a flowchart illustrating the power distribution control executed by the ECU 200 in the eighteenth embodiment.

In the routine illustrated in FIG. 53, first, the ECU 200 determines whether or not a remaining amount of HC in the fuel tank 146 is a predetermined amount or less (Step 478). Here, the above-described predetermined amount is assumed to be stored in the ECU 200 in advance as a threshold value at which HC replenishment is required. Moreover, the remaining amount of the HC may be obtained from a liquid level sensor installed in the fuel tank 146, for example, or may be estimated on the basis of a difference between a consumed amount in the engine 12 and a synthesized amount in the FT synthesizer 106.

If it is determined that the remaining amount of HC is larger than the predetermined amount at Step 478, since it can be determined that HC synthesis is not necessary at the current point of time, the ECU 200 outputs an instruction to the power distributing device 154 so as to charge the battery 150 (Step 480). On the other hand, if it is determined that the remaining amount of HC is the predetermined amount or less at Step 478, the ECU 200 determines whether or not a charged amount of the battery 150 is at a predetermined amount or more (Step 482). Here, the above-described predetermined amount is assumed to be stored in the ECU 200 in advance as a threshold value at which the battery 150 needs to be charged. Moreover, the charged amount of the battery 150 may be obtained from a charged amount sensor (not shown) installed in the battery 150 or may be calculated by integrating the charged/discharged amount of the battery 150.

If it is determined that the charged amount of the battery 150 is smaller than the predetermined amount at Step 482, since it can be determined that the battery 150 needs to be charged, the ECU 200 outputs an instruction to the power distributing device 154 so as to charge the battery 150 (Step 480). On the other hand, if it is determined that the charged amount of the battery 150 is the predetermined amount or more, the ECU 200 outputs an instruction to the power distributing device 154 so as to supply power to the $CO_2$ absorbing device 142, the CO and $H_2$ generating device 144, and the FT synthesizer 106 (Step 484).

As described above, according to the routine illustrated in FIG. 53, if the remaining amount of HC is the predetermined amount or more and also the charged amount of the battery 150 is the predetermined amount or more, HC can be produced by using power from the external power supply and the motor/generator 152. Therefore, as described in the above-described embodiment 17, vehicle running combining HC produced while the vehicle 10 is stopped and the motor 148 is made possible. Moreover, if the remaining amount of HC is less than the predetermined amount or if the charged amount of the battery 150 is less than the predetermined amount, the battery 150 can be charged, and power can be effectively used without waste.

In the above-described embodiment, the power distributing device 154 corresponds to the "mode switching means" in the above-described twenty-seventh invention. Moreover, in the above-described embodiment, the "mode switching control means" in the above-described twenty-seventh invention is realized by execution of the processing at Steps 482, 480, and 484 in FIG. 53 by the ECU 200.

Embodiment 19

Figure 54:
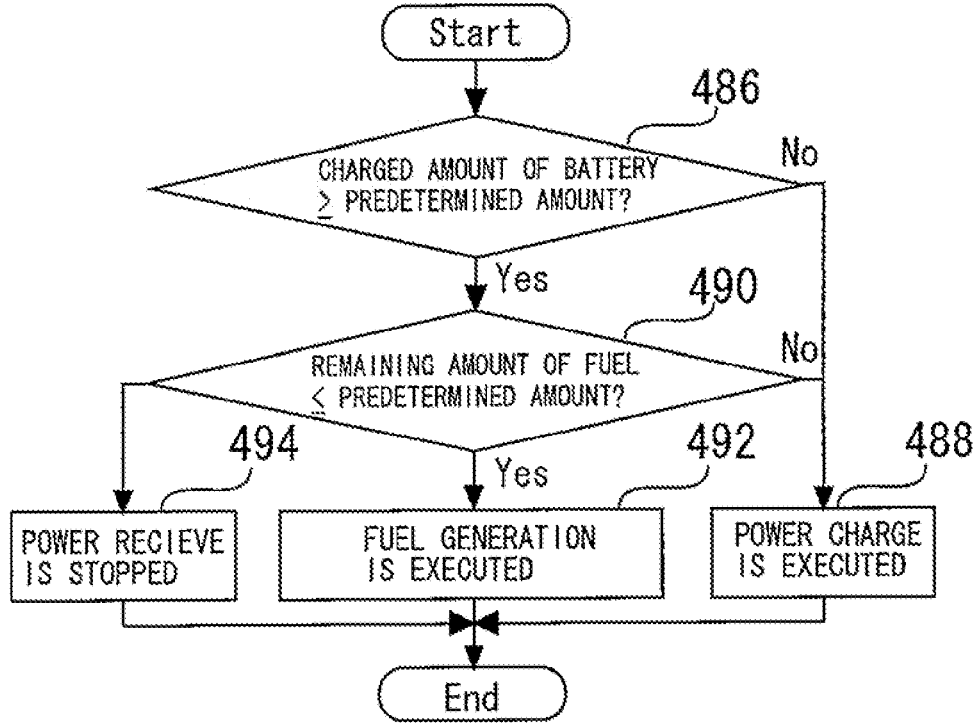
FIG. 54 is a flowchart illustrating the power distribution control executed by the ECU 200 in a nineteenth embodiment.

Subsequently, an embodiment 19 of the present invention will be described by referring to FIG. 54. This embodiment has such a feature that the power distribution control illustrated in FIG. 54 is executed while the vehicle is running in the vehicle configuration in FIG. 52. Thus, differences from the above-described embodiment 18 will be mainly described below, and explanations of the similar matters will be simplified or omitted.

Features of Embodiment 19

In the above-described embodiment 18, by executing the routine in FIG. 52 while the vehicle 10 is stopped, ITC is produced by supplying power from the power distributing device 154. HC is not immediately produced only by supplying power to the $CO_2$ absorbing device 142 and the like. For example, as described in the routine in FIG. 42, the FT reaction is not executed if the temperature of the FT catalyst is not sufficiently raised, and warming-up of other devices is also necessary. The warming-up is carried out by power received from the power distributing device 154.

While the vehicle is stopped, abundant power from the outside can be used. However, while the vehicle is running, power needs to be sorted for driving of the vehicle and the other actuators. Thus, in the power distribution control of this embodiment, if the remaining amount of ITC is sufficient, power supply to warming-up targets stopped. As a result, since power consumed for warming-up can be saved, energy efficiency of HC production can be improved.

Operation of Embodiment 19

Power Distribution Control

The power distribution control in this embodiment will be described by referring to FIG. 54. FIG. 54 is a flowchart illustrating the power distribution control executed by the ECU 200 in this embodiment. A routine illustrated in FIG. 54 is assumed to be repeatedly executed during running of the vehicle 10.

In the routine illustrated in FIG. 54, first, the ECU 200 determines whether or not a charged amount of the battery 150 is a predetermined amount or more (Step 486). This Step 486 is the same as the processing at Step 482 in FIG. 53. If it is determined that the charged amount of the battery 150 is smaller than the predetermined amount at Step 486, the ECU 200 outputs an instruction to the power distributing device 154 so as to charge the battery 150 (Step 488).

On the other hand, if it is determined that the charged amount of the battery 150 is the predetermined amount or more at Step 486, the ECU 200 determines whether or not a remaining amount of HC in the fuel tank 146 is a predetermined amount or less (Step 490). This Step 490 is the same as the processing at Step 478 in FIG. 53. If it is determined that the remaining amount of HC is smaller than the predetermined amount at Step 490, the ECU 200 outputs an instruction to the power distributing device 154 so as to supply power to the $CO_2$ absorbing device 142, the CO and $H_2$ generating device 144, and the FT synthesizer 106 (Step 492). On the other hand, if it is determined that the remaining amount of HC is larger than the predetermined amount, the ECU 200 stops power receiving from the power distributing device 154 and finishes this routine (Step 494).

As described above, according to the routine illustrated in FIG. 54, if the remaining amount of HC is larger than the predetermined amount while the vehicle 10 is running, power receiving from the power distributing device 154 can be stopped. Therefore, since power consumed for warming-up can be saved, energy efficiency of HC production can be improved.

Embodiment 20

Figure 55:
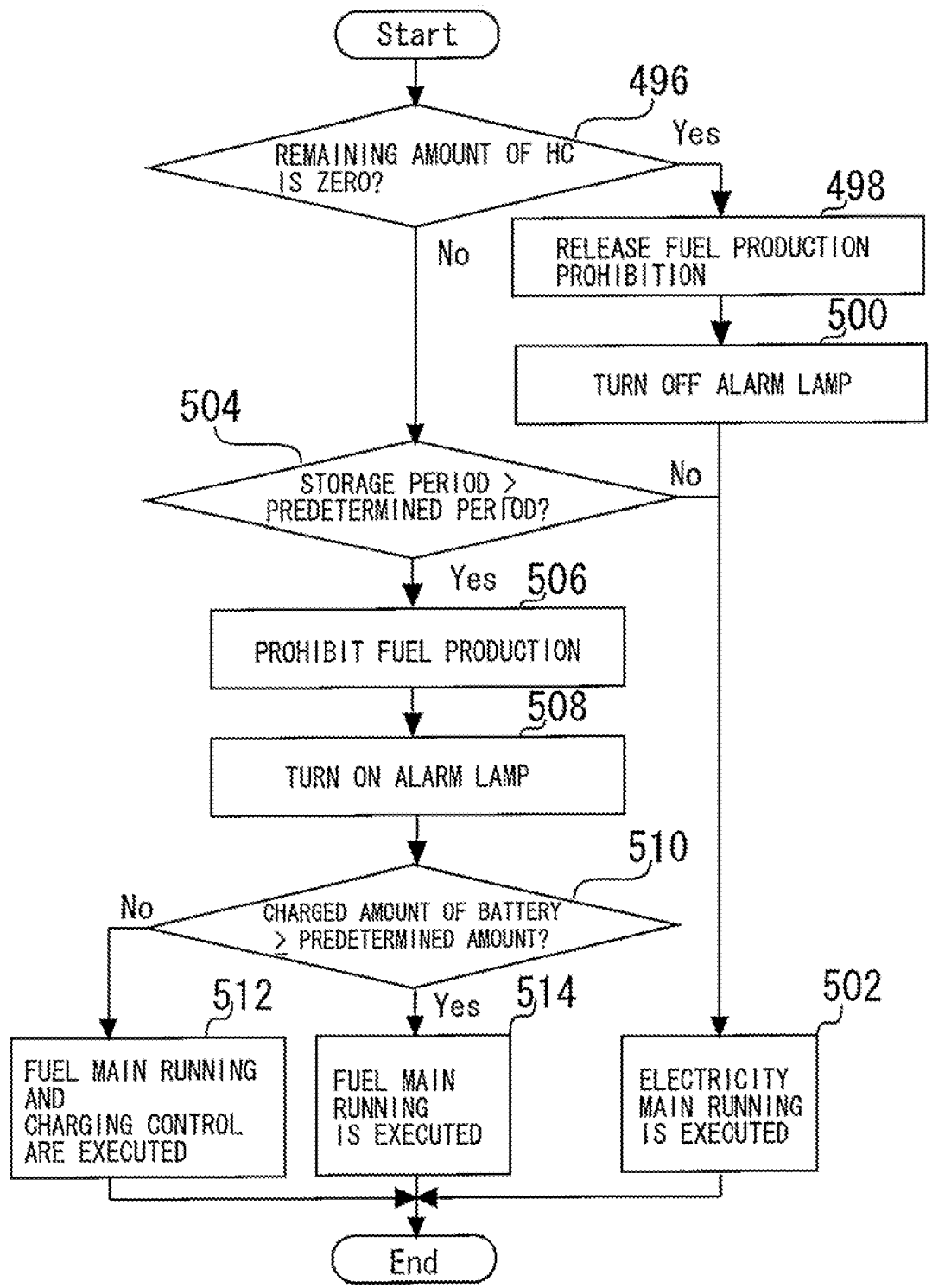
FIG. 55 is a flowchart illustrating the energy source control during running executed by the ECU 200 in a twentieth embodiment.

Subsequently, an embodiment 20 of the present invention will be described by referring to FIG. 55. This embodiment has such a feature that in a configuration in which an alarm lamp (not shown) is provided on an instrument panel of the vehicle in FIG. 52, an energy source control during running illustrated in FIG. 55 is executed. Thus, the explanation in FIG. 52 is used for a basic configuration of the vehicle.

Operation of Embodiment 20

Energy Source Control During Running

The energy source control during running is to execute a mode in which HC in the fuel tank 146 is used up by prohibiting HC production if a storage period of HC in the fuel tank 146 is long (hereinafter also referred to as a "long-term storage fuel processing mode"). Though ITC in the fuel tank 146 has a nature in common with gasoline basically but also contains coarse components and deteriorates easily than gasoline. Thus, in this embodiment, by executing the long-term storage fuel processing mode, further progress of fuel deterioration caused by mixture of additionally produced HG and HC with a long storage period is suppressed. As a result, malfunctions such as a failure of an engine caused by fuel reforming or deterioration of exhaust emission can be prevented.

The long-term storage fuel processing mode is continued until HC in the fuel tank 146 becomes zero once. Thus, during execution of the long-term storage fuel processing mode, an alarm lamp on the instrument panel is lighted so as to notify a driver.

The energy source control during running in this embodiment will be described by referring to FIG. 55. FIG. 55 is a flowchart illustrating the energy source control during running executed by the ECU 200 in this embodiment. A routine illustrated in FIG. 55 is assumed to be repeatedly executed during running of the vehicle 10.

In the routine illustrated in FIG. 55, first, the ECU 200 determines whether or not a remaining amount of HC in the fuel tank 146 is zero (Step 496). This Step 496 is basically the same as the processing at Step 478 in FIG. 53 though a threshold value is different. If it is determined that the remaining amount of HC is zero at Step 496, the ECU 200 releases fuel production prohibition (Step 498), turns off the alarm lamp (Step 500), and outputs an instruction to the battery 150 so as to execute electricity main running (Step 502).

On the other hand, if it is determined that the remaining amount of HC is not zero at Step 496, the ECU 200 determines whether or not a storage period of HC in the fuel tank 146 is a predetermined period or more (Step 504). Here, the storage period of HC in the fuel tank 146 can be obtained by counting elapsed time after the previous execution of the long-term storage fuel processing mode, for example. On the other hand, the above predetermined period is assumed to be calculated in advance through experiments and the like and stored in the ECU 200. If it is determined that the storage period is less than the predetermined period at Step 504, since it can be determined that the long-term storage fuel processing mode does not have to be executed, the routine proceeds to Step 502. On the other hand, if it is determined that the storage period is the predetermined period or more at Step 504, the ECU 200 prohibits fuel production (Step 506) and turns on the alarm lamp (Step 508).

Subsequently, the ECU 200 determines whether or not a charged amount of the battery 150 is a predetermined amount or more (Step 510). This Step 510 is the same as the processing at Step 482 in FIG. 53. If it is determined that the charged amount of the battery 150 is the predetermined amount or more at Step 510, the ECU 200 outputs an instruction to the battery 150 so as to execute fuel main running (Step 512).

On the other hand, if it is determined that the charged mount of the battery 150 is less than the predetermined amount at Step 510, the ECU 200 outputs an instruction to the battery 150 so as to execute fuel main running and also outputs an instruction to the power distributing device 154 so as to execute a charging control to the battery 150 (Step 514). As a result, a minimum battery charged amount required for running immediately after HC with a long storage period is used up can be ensured while the HC with the long storage period is being used up.

As described above, according to the routine illustrated in FIG. 55, if the storage period of HC in the fuel tank 146 is long, since the long-term storage fuel processing mode can be executed, further progress of fuel deterioration caused by mixture of the additionally produced HC and HC with a long storage period can be suppressed. Moreover, if the charged amount of the battery 150 is less than the predetermined amount, the charging control to the battery 150 can be executed in parallel with execution of the long-term storage fuel processing mode. Therefore, the minimum battery charged amount required for running immediately after the HC with a long storage period is used up can be ensured.

In this embodiment, the "elapsed time determining means" in the above-described twenty-sixth invention is realized by execution of the processing at Step 504 in FIG. 55 by the ECU 200.

Embodiment 21

Figure 56:
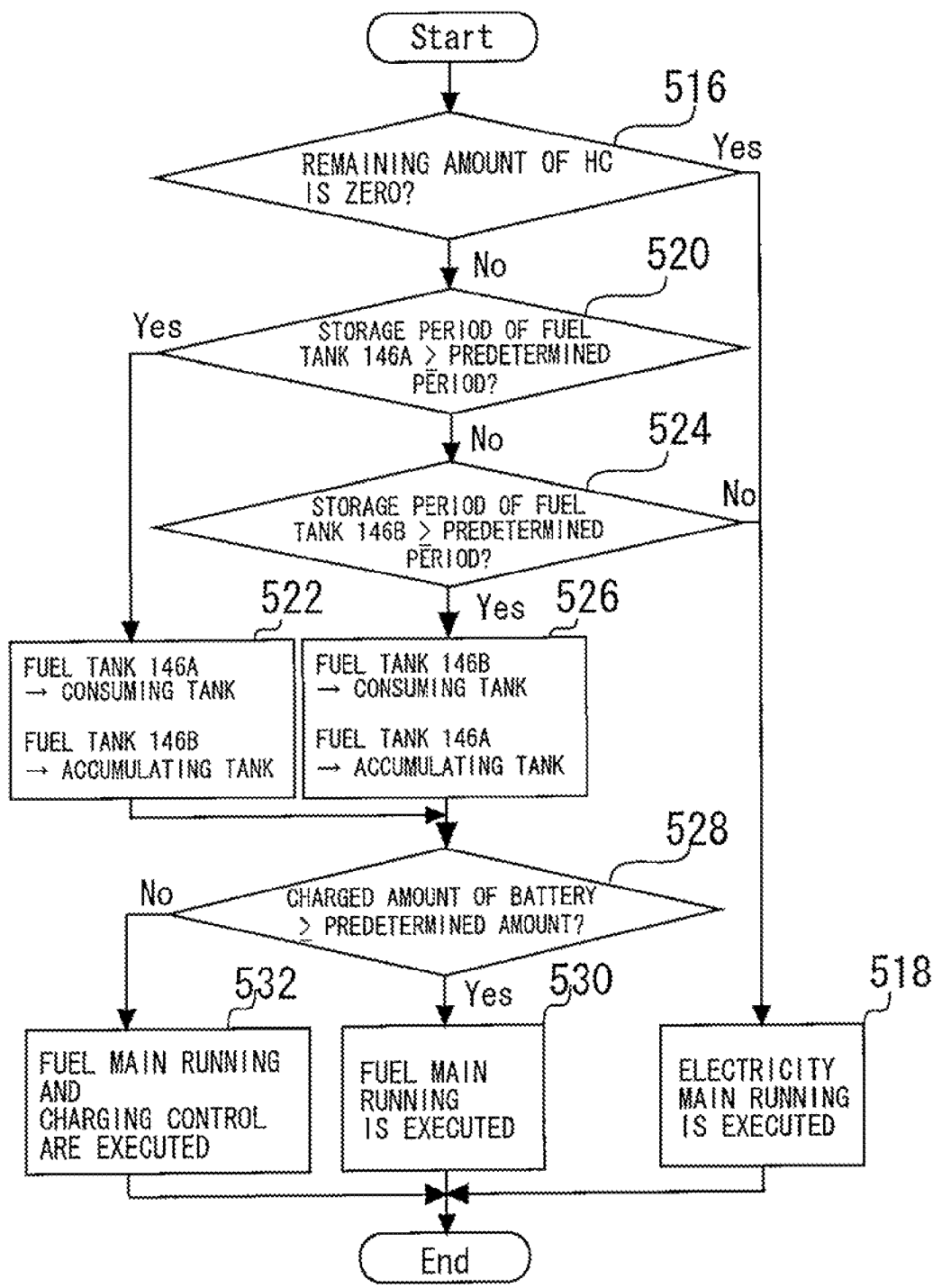
FIG. 56 is a flowchart illustrating the energy source control during running executed by the ECU 200 in a twenty-first embodiment.

Subsequently, an embodiment 21 of the present invention will be described by referring to FIG. 56. This embodiment has such a feature that, in a configuration in which two fuel tanks 146 in FIG. 52 are provided, the energy source control during running illustrated in FIG. 56 is executed. Thus, the explanation in FIG. 52 is used for a basic configuration of the vehicle. In order to discriminate the two fuel tanks 146 from each other, they are explained below as the fuel tanks 146A and 146B.

Operation of Embodiment 21

Energy Source Control During Running

In the above-described embodiment 20, the energy source control during running is executed by using one fuel tank 146. In this embodiment, the fuel tanks 146A and 146B are provided, and if there is a tank with a long HC storage period, the long-term storage fuel processing mode is executed for the tank. As a result, the effect substantially similar to the above-described embodiment 20 can be obtained. In addition, if the long-term storage fuel processing mode is executed for one of the tanks, the other tank is held in a state where HC is stored. Therefore, since the other tank can be handled as a preliminary tank, the energy source control during running with allowance in a fuel remaining amount can be realized.

The energy source control during running in this embodiment will be described by referring to FIG. 56. FIG. 56 is a flowchart illustrating the energy source control during running executed by the ECU 200 in this embodiment. A routine illustrated in FIG. 56 is assumed to be repeatedly executed during running of the vehicle 10.

In the routine illustrated in FIG. 56, first, the ECU 200 determines whether or not remaining amounts of HC in the fuel tanks 146A and 146B are both zero (Step 516). This Step 516 is the same as the processing at Step 496 in FIG. 55. If it is determined that the remaining amount of HC is zero at Step 516, the ECU 200 outputs an instruction to the battery 150 so as to execute electricity main running (Step 518).

On the other hand, if it is determined that the remaining amount of HC is not zero at Step 516, the ECU 200 determines whether or not a storage period of HC in the fuel tank 146A is a predetermined period or more (Step 520). This Step 520 is the same as the processing at Step 504 in FIG. 55. If it is determined that the storage period is the predetermined period or more at Step 520, the ECU 200 sets the fuel tank 146A to a consuming tank and the fuel tank 146B to an accumulating tank, respectively (Step 522).

On the other hand, if it is determined that the storage period is less than the predetermined period at Step 520, the ECU 200 determines whether or not a storage period of HC in the fuel tank 146B is the predetermined period or more (Step 524). If it is determined that the storage period is the predetermined period or more at Step 524, the ECU 200 sets the fuel tank 146B to a consuming tank and the fuel tank 146A to an accumulating tank, respectively (Step 526). If it is determined that the storage period is less than the predetermined period at Step 524, since it can be determined that the long period storage fuel processing mode does not have to be executed, the routine proceeds to Step 518.

Subsequently to Steps 522 and 526, the ECU 200 determines whether or not a charged amount of the battery 150 is a predetermined amount or more (Step 528). This Step 528 is the same as the processing at Step 510 in FIG. 55. If it is determined that the charged amount of the battery 150 is the predetermined amount or more at Step 528, the routine proceeds to Step 530, while if it is determined that the charged amount of the battery 150 is less than the predetermined amount, the routine proceeds to Step 532. The processing at Steps 528 to 532 is the same as the processing at Steps 510 to 514 in FIG. 55.

As described above, according to the routine illustrated in FIG. 56, if there is a tank with a long HC storage period, since the long-term storage fuel processing mode can be executed for the tank, further progress of fuel deterioration caused by mixture of the additionally produced HC with the HC having a long storage period can be prevented. Moreover, similarly to the case of the routine in FIG. 55, the minimum battery charged amount required for running immediately after the HC with a long storage period is used up can be ensured. Moreover, if the long-term storage fuel processing mode is executed for one of the tanks, the other tank can be used as an accumulating tank and thus, the energy source control during running with allowance in the fuel remaining amount can be realized.

REFERENCE SIGNS LIST 10 vehicle
12 engine
14 gasoline tank
16 $H_2$ & CO tank
18 $CO_2$ reclaimer
20 electrolytic solution tank
22 electrolyser
24 water tank
26 exhaust passage
28 $CO_2$ inlet valve
30 $CO_2$ outlet valve
32, 34 electrolytic solution pump
36 water pump
38 $H_2$ & CO supply valve
40 alternator
42 battery
50 electrolytic bath
52 cathode chamber 54 anode chamber
56 diaphragm
58 working electrode
60 reference electrode
62 counter electrode
64 potentiostat
70 turbine
72, 108 bypass passage
74 waste gate valve
76 exhaust purification catalyst
86 solar cell
88 atmospheric air inlet
90 radar
92 preceding vehicle
94 tail pipe
96 processing device
98 $CO_2$ sensor
100 rain water collector
102 $H_2O$ condenser
104 atmospheric $H_2O$ condenser
106 FT synthesizer
110 bypass valve
112 synthetic fuel tank.
114 synthetic fuel supply valve
116 thermometer
118 EGR passage
120 EGR valve
122 heat exchanger
124 cooling water circulation passage
126 radiator
128 canister
130 purge path
132 purge valve
134 exhaust adding valve
140 external power supply input device
142 $CO_2$ absorbing device
144 CO and $H_2$ generating device
146 fuel tank
148 motor
150 battery
152 motor/generator
154 power distributing device
170 crank angle sensor
172 accelerator opening sensor
174 water temperature sensor
176 vehicle speed sensor
180 propelling generator for household
182 household solar panel
184 transmission line
200 ECU

The invention claimed is:

1. A vehicle with a fuel producing system comprising:
an internal combustion engine capable of using a hydrocarbon synthetic fuel synthesized from a mixed gas composed of carbon monoxide and hydrogen as an engine fuel;
a mixed gas generating unit for generating said mixed gas by electrolyzing carbon dioxide contained in an exhaust from said internal combustion engine and/or atmospheric air and water, respectively;
a fuel synthesizing unit provided in a bypass passage bypassing a part of an exhaust passage of said internal combustion engine and containing a Fischer-Tropsch catalyst capable of converting said mixed gas generated by said mixed gas generating unit to said synthetic fuel;
a synthetic fuel supply unit connected to said fuel synthesizing unit and supplying said synthetic fuel generated by said fuel synthesizing unit to said internal combustion engine;
a bypass passage switching valve for switching opening/closing of said bypass passage;
a mixed gas valve for connecting or shutting off said mixed gas generating unit and said fuel synthesizing unit;
a catalyst state determining unit for determining whether or not said Fischer-Tropsch catalyst is in a predetermined active state; and
a valve control unit for controlling said bypass passage switching valve so as to open said bypass passage and for controlling said mixed gas valve so as to connect said mixed gas generating unit and said fuel synthesizing unit when it is determined that said Fischer-Tropsch catalyst is in said predetermined active state.

2. A vehicle with a fuel producing system comprising:
an internal combustion engine capable of using a hydrocarbon synthetic fuel synthesized from a mixed gas composed of carbon monoxide and hydrogen as an engine fuel;
a mixed gas generating unit for generating said mixed gas by electrolyzing carbon dioxide contained in an exhaust from said internal combustion engine and/or atmospheric air and water, respectively;
a fuel synthesizing unit provided in a bypass passage bypassing a part of an exhaust passage of said internal combustion engine and containing a Fischer-Tropsch catalyst capable of converting said mixed gas generated by said mixed gas generating unit to said synthetic fuel;
a synthetic fuel supply unit connected to said fuel synthesizing unit and supplying said synthetic fuel generated by said fuel synthesizing unit to said internal combustion engine;
a bypass passage switching valve for switching opening/closing of said bypass passage;
a mixed gas valve for connecting or shutting off said mixed gas generating unit and said fuel synthesizing unit;
a catalyst state determining unit for determining whether or not said Fischer-Tropsch catalyst is in a predetermined active state while said internal combustion engine is stopped; and
a valve control unit for controlling said mixed gas valve so as to connect said mixed gas generating unit and said fuel synthesizing unit when it is determined that said Fischer-Tropsch catalyst is in said predetermined active state.

3. A vehicle with a fuel producing system comprising:
an internal combustion engine capable of using a hydrocarbon synthetic fuel synthesized from a mixed gas composed of carbon monoxide and hydrogen as an engine fuel;
a mixed gas generating unit for generating said mixed gas by electrolyzing carbon dioxide contained in an exhaust from said internal combustion engine and/or atmospheric air and water, respectively;
a fuel synthesizing unit provided in an EGR passage connecting an intake passage and an exhaust passage of said internal combustion engine and containing a Fischer-Tropsch catalyst capable of converting said mixed gas generated by said mixed gas generating unit to said synthetic fuel;
a synthetic fuel supply unit connected to said fuel synthesizing unit and supplying said synthetic fuel generated by said fuel synthesizing unit to said internal combustion engine;

an EGR passage switching valve for switching opening/closing of said EGR passage;

a mixed gas valve for connecting or shutting off said mixed gas generating unit and said fuel synthesizing unit;

an operation condition determining unit for determining whether or not an operation condition of said internal combustion engine is in a predetermined exhaust reflux area and a predetermined high-exhaust temperature area; and a valve control unit for controlling said EGR passage switching valve so as to open said EGR passage and for controlling said mixed gas valve so as to connect said mixed gas generating unit and said fuel synthesizing unit when it is determined that said operation condition is in said predetermined exhaust reflux area and said predetermined high-exhaust temperature area.

4. The vehicle with a fuel producing system according to claim 1, further comprising:

a fuel tank provided between said fuel synthesizing unit and said synthetic fuel supply unit and storing said synthetic fuel generated by said fuel synthesizing unit; and a heat exchanger provided between said fuel synthesizing unit and said fuel tank and performing heat-exchange between said synthetic fuel generated by said fuel synthesizing unit and cooling water for cooling said internal combustion engine.

5. The vehicle with a fuel producing system according to claim 1, further comprising:

a gasoline tank for storing gasoline; and a canister provided between said fuel synthesizing unit and said synthetic fuel supply unit and also connected to said gasoline tank, the canister storing said synthetic fuel generated by said fuel synthesizing unit and vaporized gasoline vaporized from the gasoline in said gasoline tank.

6. The vehicle with a fuel producing system according to claim 1, further comprising:

an exhaust purification catalyst provided in an exhaust passage of said internal combustion engine and purifying exhaust from said internal combustion engine, wherein said synthetic fuel supply unit is configured to be capable of adding said synthetic fuel generated by said fuel synthesizing unit to said exhaust passage on the upstream side of said exhaust purification catalyst.

7. The vehicle with a fuel producing system according to claim 1, further comprising:

a generator for generating power using an output of said internal combustion engine; and a battery capable of storing electric power of said generator, wherein by power fed from said battery, said mixed gas generating unit generates said mixed gas and said fuel synthesizing unit converts said mixed gas to said synthetic fuel.

8. The vehicle with a fuel producing system according to claim 7, further comprising:

an on-board generating device for converting at least one of solar light, solar heat, exhaust heat, and wind power to electric power, wherein said battery is configured to be capable of storing electric power of said on-board generating device.

9. The vehicle with a fuel producing system according to claim 7, further comprising:

a power receiving unit capable of receiving electric power from a power supply outside the vehicle, wherein said battery is configured to be capable of storing electric power received by said power receiving unit.

10. The vehicle with a fuel producing system according to claim 1, further comprising:

a power receiving unit capable of receiving electric power from a power supply outside the vehicle, wherein by electric power fed from said power receiving unit while the vehicle is stopped, said mixed gas generating unit generates said mixed gas and said fuel synthesizing unit converts said mixed gas to said synthetic fuel.

11. The vehicle with a fuel producing system according to claim 7, further comprising:

an elapsed time determining unit for determining whether or not elapsed time after production of said synthetic fuel exceeds a predetermined allowable time, wherein if said elapsed time exceeds said predetermined allowable time, power fed to said mixed gas generating unit and said fuel synthesizing unit is prohibited.

12. The vehicle with a fuel producing system according to claim 1, further comprising:

a generator for generating electric power by using an output of said internal combustion engine;

a power receiving unit capable of receiving electric power from a power supply outside the vehicle;

a battery capable of storing electric power of said generator and electric power received by said power receiving unit;

a mode switching unit for switching a mode between a battery storing mode for storing electric power received by said power receiving unit in said battery and a fuel production mode for feeding electric power received by said power receiving unit to said mixed gas generating unit and said fuel synthesizing unit; and a mode switching control unit for controlling said mode switching unit so as to switch to said battery storing mode if a stored power amount of said battery is smaller than a predetermined amount, and to said fuel production mode if said stored power amount is larger than the predetermined amount.

* * * * *